(12) United States Patent
Kim et al.

(10) Patent No.: US 11,702,830 B2
(45) Date of Patent: Jul. 18, 2023

(54) SINK CABINET APPARATUS

(71) Applicant: LG ELECTRONICS INC., Seoul (KR)

(72) Inventors: Jong Seok Kim, Seoul (KR); Inhyung Yang, Seoul (KR); Daeyun Park, Seoul (KR); Jin Hyeon Jeon, Seoul (KR); Jeongyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 411 days.

(21) Appl. No.: 16/760,113

(22) PCT Filed: Nov. 1, 2018

(86) PCT No.: PCT/KR2018/013213
§ 371 (c)(1),
(2) Date: Apr. 29, 2020

(87) PCT Pub. No.: WO2019/088745
PCT Pub. Date: May 9, 2019

(65) Prior Publication Data
US 2020/0256044 A1    Aug. 13, 2020

(30) Foreign Application Priority Data

Nov. 1, 2017 (KR) .......................... 10-2017-0144968
Nov. 6, 2017 (KR) .......................... 10-2017-0146980
(Continued)

(51) Int. Cl.
*E03C 1/326* (2006.01)
*G07C 9/37* (2020.01)
(Continued)

(52) U.S. Cl.
CPC .............. *E03C 1/326* (2013.01); *A47K 10/06* (2013.01); *G07C 9/00309* (2013.01); *G07C 9/00563* (2013.01); *G07C 9/37* (2020.01)

(58) Field of Classification Search
CPC ...................................... A47B 88/43
(Continued)

(56) References Cited

U.S. PATENT DOCUMENTS

2022/0178122 A1\*  6/2022  Grybush ................ A47B 77/18
2022/0192463 A1\*  6/2022  White-Petteruti ...... A47J 47/00
2022/0248934 A1\*  8/2022  Welling .............. A47L 15/4293

FOREIGN PATENT DOCUMENTS

JP    H04-132511 A    5/1992
JP    2004-024766 A   1/2004
(Continued)

OTHER PUBLICATIONS

Extended European Search Report, dated Sep. 10, 2021, issued by the European Patent Office in Patent Application No. EP 18874254 (9 pages).

*Primary Examiner* — Lori L Baker
(74) *Attorney, Agent, or Firm* — Birch, Stewart, Kolasch & Birch, LLP

(57) ABSTRACT

A wash basin cabinet apparatus in which a wash basin cabinet used in a bathroom space is converted into a home appliance. The wash basin cabinet apparatus includes a wash basin including a faucet; a frame including a front frame that supports a lower portion of the wash basin and having an independently closed loop shape, a rear frame having an independently closed loop shape, and a bottom frame connecting the front frame and the rear frame; a base plate forming the bottom surface of the frame; and a dryer (Continued)

disposed above the base plate, the front frame and the rear frame each having longitudinal members of the same shape at both sides thereof.

10 Claims, 61 Drawing Sheets

(30) Foreign Application Priority Data

| Nov. 6, 2017 | (KR) | ......................... 10-2017-0146981 |
| Nov. 15, 2017 | (KR) | ......................... 10-2017-0152520 |
| Nov. 15, 2017 | (KR) | ......................... 10-2017-0152523 |
| Nov. 16, 2017 | (KR) | ......................... 10-2017-0153365 |
| Jun. 14, 2018 | (KR) | ......................... 10-2018-0068108 |

(51) Int. Cl.
*A47K 10/06* (2006.01)
*G07C 9/00* (2020.01)

(58) Field of Classification Search
USPC .... 4/630, 619, 631, 517, 625; 312/228, 281, 312/313, 351
See application file for complete search history.

(56) References Cited

FOREIGN PATENT DOCUMENTS

| JP | 2006-187408 A | 7/2006 |
| JP | 2012-135568 A | 7/2012 |
| KR | 20-0279019 Y1 | 6/2002 |
| KR | 2003-0094161 A | 12/2003 |
| KR | 20-0340758 Y1 | 2/2004 |
| KR | 20-2010-0007609 U | 7/2010 |
| KR | 20-2013-0005154 U | 8/2013 |

\* cited by examiner

SINK CABINET APPARATUS

TECHNICAL FIELD

The present disclosure relates to a sink cabinet apparatus utilizing a space below a wash basin.

BACKGROUND

Various types of convenience products such as electric toothbrushes, electric shavers, and hair dryers are used in bathroom spaces in which wash basins, bathtubs, and shower booths are disposed. Examples of bathroom furniture include a wall cabinet (or a mirror cabinet) attached to the wall and a sink cabinet including a wash basin.

Bathroom furniture and the facility device used in bathroom have been considered as separate components. Electrical appliances are powered through power outlets disposed on the bathroom wall and are stored in the bathroom furniture.

The sink cabinet in the related art merely supports a wash basin or provides an accommodation space for bathroom products; however, there is a restriction on accommodation of various types of electronic devices that provide convenience. Particularly, when the electronic components accommodated in the sink cabinet contact water, there is a fear that incorrect operation or malfunction may occur, and when a short circuit occurs, there is a risk of safety accidents which may result in an electric shock to the user.

Meanwhile, a technology for accommodating electronic devices that provide convenience in the sink cabinet, performing a watertight function, facilitating assembly or disassembly for internal repair, and sharing components to minimize a number of components has not been developed, and thus, the technology is needed to be developed to resolve the above problems.

SUMMARY

The present disclosure provides a bathroom facility device that integrates various types of facility devices used in the bathroom with the bathroom furniture. The present disclosure also provides a modular rail and the modular rail includes a modularized rail disposed in the cabinet to easily dispose the rail in the cabinet and a rail module that supports the frame that forms a structure of the cabinet to reinforce rigidity of the frame.

In addition, a drawer or a towel dryer may be disposed in an accommodating space inside the sink cabinet disposed in the bathroom to accommodate objects used in the bathroom. Generally, the drawer or the towel dryer is retracted into the accommodation space and may be pulled out from the accommodation space and used when needed.

When the drawer is pulled out from the accommodation space, objects accommodated in the drawer may be moved to or foreign objects may be introduced to the accommodation space. In general, as the cabinet merely provides an accommodation space, a drawer may be separated to remove objects or foreign objects that have moved from the drawer.

However, the cabinet does not allow for easier removal of foreign objects or objects that have entered the accommodation space due to a structure thereof to have a difficulty in separating the drawer.

In addition, when electronic devices are mounted inside the cabinet, the electronic devices mounted inside the cabinet may be damaged if the water flowing into the cabinet through the accommodation space is not blocked.

The present disclosure provides a sink cabinet apparatus having a watertight structure of a drawer to prevent foreign objects from entering the inside space of the cabinet when the drawer is pulled out from an inside of the cabinet.

The present disclosure further provides a sink cabinet apparatus that includes an L-shaped drawer disposed in the cabinet in which pipes and electric parts are disposed to utilize the space inside the cabinet without causing interference with the pipe and the electric parts during the retraction of and pulling out of the drawer.

The present disclosure further provides a cabinet apparatus that defines a secret space to accommodate the objects desired to be stored secretly.

Technical Problem

The present disclosure provides a sink cabinet apparatus configured as a home appliance used in a bathroom.

The present disclosure also provides a sink cabinet apparatus capable of using common components, which may be manufactured with various sizes.

The present disclosure provides a sink cabinet apparatus that may easily accommodate electric components that perform various types of convenience functions, perform an internal watertight function, facilitate assembly or disassembly for internal repair, and share components to minimize a number of components.

The present disclosure provides a modular rail in which the rail may be easily disposed in or removed from the cabinet using the modularized rail.

The present disclosure provides a modular rail in which the modularized rail is disposed in the cabinet and a pair of disposed rails has a perfectly symmetrical structure to improve installation qualities of the rail.

The present disclosure provides a modular rail that may change a shape of the rail module to easily dispose and remove the rail module in and from the cabinet.

The present disclosure provides a modular rail in which a modularized rail disposed in the cabinet supports a frame that forms a skeleton of the cabinet to reinforce the rigidity of the frame.

The present disclosure provides a sink cabinet apparatus that may prevent objects or foreign objects from entering an accommodation space defined in a cabinet through a rear portion of a pulled-out drawer and block an inside of the cabinet.

The present disclosure provides a sink cabinet apparatus that may prevent permeation of water into the cabinet equipped with electronic devices.

The present disclosure provides a sink cabinet apparatus that prevents lateral swing of drawers with greater height ratio than width, allows for easier attachment and detachment of the drawer to and from the cabinet, and prevents the drawer from being pushed into the accommodation space when the drawer is completely retracted.

The present disclosure provides a sink cabinet apparatus that may define an inner space of a cabinet in which a pipe or an electric portion is disposed as an accommodation space.

The present disclosure provides a sink cabinet apparatus that may reinforce the rigidity of an L-shaped drawer and measure a size of the object that may be accommodated in the accommodation space.

The present disclosure provides a sink cabinet apparatus that may partition the accommodation space and easily change the partitioned space.

The present disclosure provides a sink cabinet apparatus that defines a secret space where other people may not easily open or use it.

The present disclosure provides a sink cabinet apparatus that may define an inner space of a cabinet in which the pipe or the electric portion is disposed as the accommodation space.

The present disclosure provides a sink cabinet apparatus that may reinforce the rigidity of the L-shaped drawer and measure the size of the object that may be accommodated in the accommodation space.

The present disclosure provides a sink cabinet apparatus that may maintain cleanliness of the floor of a space in which the sink cabinet apparatus is disposed and the floor therearound. The present disclosure also provides a sink cabinet apparatus that may dry an inner space of the sink cabinet apparatus using an air flow and may dry the bathroom using the air flow.

TECHNICAL SOLUTION

According to the present disclosure, a sink cabinet apparatus includes a wash basin configured to include a faucet; a frame configured to include a front frame to support a lower portion of the wash basin and having an independently closed loop shape, a rear frame having an independently closed loop shape, and a bottom frame to connect the front frame and the rear frame; a base plate configured to form a bottom surface of the frame; and a dryer disposed above the base plate, where the front frame and the rear frame each has longitudinal members of the same shape on both sides thereof.

In this case, the longitudinal member has an upper bending portion and a lower bending portion bent in a transverse direction and each of the upper bending portion and the lower bending portion may be overlapped with and coupled to an additional horizontal member.

In addition, the base plate may be configured to include a central plate to place the dryer, side plates to couple to both sides of the central plate in a width direction, and a support leg to couple to an outer edge of the side plate.

In this case, the support legs have fitting protrusions on adjacent surfaces and all four support legs may preferably use the same component.

One of the fitting protrusions of the support leg may be fitted to a support bar connecting the both side support legs disposed at deeper positions and the other fitting protrusion may be fitted to the side plate.

Meanwhile, the dryer may include a blowing fan that suctions air under the base plate and discharges the air toward a front side and a heater that heats the air discharged from the blowing fan.

In this case, the dryer may include a flow path case that surrounds a discharge outlet of the heater and defines a plurality of discharge outlets, a switching vane disposed inside the flow path case, and an actuator that adjusts a direction of the switching vane.

According to the present disclosure, the sink cabinet apparatus includes a wash basin configured to include a faucet; a sink cabinet body disposed below the wash basin; and an inner case mounted inside the sink cabinet body and partitioned to be watertight and configured to define a space where a drawer type module is retracted in or pulled out.

According to the present disclosure, a modular rail includes a pair of rails configured to couple to a drawer that is retracted in or pulled out from a frame that forms a skeleton of a cabinet and a bracket fixed to a pair of rails and disposed on the frame.

According to the present disclosure, the modular rail includes the pair of rail fixing brackets fixed to a pair of rails and the pair of frame fixing brackets fixed to the frame and the coupled rail fixing brackets and frame fixing brackets have a quadrangular shape.

According to the present disclosure, the modular rail includes the bracket and the bracket includes the rail fixing bracket and the frame fixing bracket coupled using a hinge.

According to the present disclosure, the modular rail has a structure in which the bracket is supported by the frame by two or more points and coupled to the frame and the bracket defines a plurality of fastening holes needed to be fastened to the frame.

According to the present disclosure, the sink cabinet apparatus includes a drawer configured to include a front plate, a lower supporter, and a rear plate and retract in or pull out from the drawer space and in which an opening of a drawer space is blocked by the rear plate as the drawer is pulled out from the drawer space.

According to the present disclosure, the sink cabinet apparatus includes a packing member at the opening of the drawer space to provide a watertight structure between the rear plate and the drawer.

According to the present disclosure, the sink cabinet apparatus includes a pair of movement prevention guides disposed at both sides of the drawer space and disposed at deeper positions. The movement prevention guide includes a stop member, a transition member, and a move member at deeper positions to limit the movement of the drawer for each section.

According to the present disclosure, the sink cabinet apparatus includes a drawer that defines an accommodation space and retracted in and pulled out from an inner space of the cabinet and having a rear surface disposed lower than a bottom surface of a dead zone where a pipe or an electric portion is disposed.

According to the present disclosure, the sink cabinet apparatus includes a reinforcing pipe configured to fix to each of a rear portion and a front portion of the drawer. The reinforcing pipe is configured to include a rear portion fixed to the rear plate and disposed below the dead zone and a front portion extending from the rear portion and fixed to a front plate.

According to the present disclosure, the sink cabinet apparatus includes a partition plate fixed to the reinforcing pipe to partition the accommodation space.

According to the present disclosure, the sink cabinet apparatus includes a cabinet body, a secret box configured to include a lock device, a sensor, a database, and a controller. The sensor may identify user biometric information or an unlock signal input from the user. Database may also include user biometric information or user unlock information.

According to the present disclosure, the sink cabinet apparatus includes a drawer that defines an accommodation space and may be retracted in or pulled out from the inner space of the cabinet and having a rear surface disposed lower than the bottom surface of the dead zone in which the pipe or the electric portion is disposed.

According to the present disclosure, the sink cabinet apparatus includes a reinforcing pipe fixed to each of the rear portion and the front portion of the drawer. The reinforcing pipe includes the rear portion fixed to the rear plate and disposed below the dead zone and the front portion extending from the rear portion and fixed to the front plate.

According to the present disclosure, the sink cabinet apparatus includes: a wash basin body, a cabinet body that supports the wash basin body and defines an inner space below the wash basin body; and a blower device disposed below the wash basin body and configured to supply air to an inner space defined by the panel, and the cabinet body is configured to define a panel inner space having cavities, a panel inlet hole to communicate the inner space defined by the panel with the panel inner space, and a panel discharge hole opened downward to communicate the panel inner space with an outside at a side of the sink cabinet body and may use the space below the wash basin body as a sink cabinet apparatus and may force the air to flow into the inner space of the sink cabinet apparatus and the space below the sink cabinet apparatus.

The panel includes an interior panel that supports a left side and a right side of the wash basin body to define the inner space and an exterior panel spaced apart from the interior panel, disposed outside the interior panel, and defines appearance of the sink cabinet apparatus, and the interior panels disposed on the left side and the right side and define the panel inlet holes on surfaces facing each other and the inner space of the panel is defined between the interior panel and the exterior panel, thereby strengthening the strength of the sink cabinet apparatus using the interior panel and exterior panel, and simultaneously utilizing the space between the panels to allow air flow.

The panel further includes a partition panel that partitions the inner space defined by the panel and vertically coupled to the panel and a vertical partition panel is disposed between the panels disposed on the left side and the right side, thereby strengthening the strength of a portion below the wash basin body.

The panel defines a space where appliances are mounted and the sink cabinet apparatus further includes a functional module and that dries the appliances disposed inside due to air discharged from the blower device and a partition panel that partitions into a space in which the functional module is disposed and a space in which the blower device is disposed, to dry the appliances used in the bathroom.

The inner space defined by the panel is divided into an insertion space into which the functional module is inserted and a communication space defined at a rear side of the insertion space and to communicate the functional module with the panel inner space and the panel inlet hole is defined in the panel disposed in the communication space to flow the air discharged from the functional module into the panel inner space.

The functional module is movable forward in the insertion space and suctions the air discharged from the blower device and discharges the air into the communication space to flow the air discharged from the functional module into the panel inner space.

The blower device includes an air blowing fan housing that defines an appearance, and a suction inlet opened downward to introduce the external air; a blowing fan disposed inside the blowing fan housing to allow air flow; a blower motor that operates the blowing fan; and a heater that heats the air flowing by the blowing fan to flow the air at the lower portion of the sink cabinet apparatus and includes the heater to improve the drying function.

The blower device includes an exhaust duct to selectively flow the air discharged from the blower device to the inner space defined by the panel or to flow the air forward and downward the sink cabinet device and may adjust a direction of the air discharged according to user's selection.

Advantageous Effects

According to the present disclosure, a sink cabinet apparatus includes a wash basin configured to comprise a faucet; a frame including a front frame that supports a lower portion of the wash basin and having an independently closed loop shape, a rear frame having an independently closed loop shape, and a bottom frame to connect the front frame and the rear frame; a base plate to form the bottom surface of the frame; and a dryer disposed above the base plate, where the front frame and the rear frame each has longitudinal members of the same shape on both sides thereof.

In this case, the longitudinal member has an upper bending portion and a lower bending portion bent in a transverse direction and each of the upper bending portion and the lower bending portion may be overlapped with and coupled to an additional horizontal member.

In addition, the base plate may include a central plate to place the dryer, side plates coupled to both sides of the central plate in a width direction, and a support leg coupled to an outer edge of the side plate.

In this case, the support leg includes a fitting protrusion on a surface adjacent to each other and all four support legs may preferably use the same component.

One of the fitting protrusions of the support leg may be fitted to a support bar that connects the both side support legs disposed at deeper positions and the other fitting protrusion may be fitted to the side plate.

Meanwhile, the dryer may include a blowing fan that suctions air under the base plate and discharges the air toward a front side and a heater that heats air discharged from the blowing fan.

In this case, the dryer may include a flow path case that surrounds a discharge outlet of the heater and defines a plurality of discharge outlets, a switching vane disposed inside the flow path case, and an actuator that adjusts a direction of the switching vane.

According to the present disclosure, the sink cabinet apparatus includes a wash basin configured to include a faucet; a sink cabinet body disposed under the wash basin; and an inner case that is mounted inside the sink cabinet body and is partitioned to be watertight and defines a space where a drawer type module is retracted in or pulled out.

According to the present disclosure, a modular rail includes a pair of rails coupled to a drawer that is retracted in and pulled out from a frame that forms a skeleton of the cabinet and a bracket fixed to the pair of rails and disposed on the frame.

According to the present disclosure, the modular rail includes a pair of rail fixing brackets fixed to a pair of rails and a pair of frame fixing brackets fixed to the frame, and the coupled rail fixing brackets and frame fixing brackets have a quadrangular shape.

According to the present disclosure, the modular rail includes the bracket and the bracket includes the rail fixing bracket and the frame fixing bracket coupled using a hinge.

According to the present disclosure, the modular rail has a structure in which the bracket is supported by the frame by two or more points and coupled to the frame and the bracket defines a plurality of fastening holes needed to be coupled to the frame.

According to the present disclosure, the sink cabinet apparatus includes a drawer that includes a front plate, a lower supporter, and a rear plate and may be retracted into or pulled out from the drawer space, and in which an opening of the drawer space is blocked by the rear plate as the drawer is pulled out from the drawer space.

According to the present disclosure, the sink cabinet apparatus includes a packing member at the opening of the drawer space to provide the watertight structure between the rear plate and the drawer.

According to the present disclosure, the sink cabinet apparatus includes a pair of movement prevention guides disposed at both sides of the drawer space and disposed at deeper positions. The movement prevention guide includes a stopper, a transition member, and a move member along the depth direction to limit the movement of the drawer for each section.

According to the present disclosure, the sink cabinet apparatus includes the drawer that defines an accommodation space and may be retracted into and pulled out from the inner space of the cabinet and having a rear portion disposed lower than a lower surface of a dead zone in which a pipe or an electric portion is disposed.

According to the present disclosure, the sink cabinet apparatus includes a reinforcing pipe fixed to each of the rear portion and the front portion of the drawer. The reinforcing pipe includes a rear portion fixed to the rear plate and disposed below the dead zone and a front portion extending from the rear portion and fixed to the front plate.

According to the present disclosure, the sink cabinet apparatus includes a partition plate fixed to the reinforcing pipe to partition the accommodation space. According to the present disclosure, the sink cabinet apparatus includes a cabinet body, a secret box including a lock device, a sensor, a database, and a controller. The sensor may identify user biometric information or an unlock signal input from the user. In addition, the database may include user biometric information or user unlock information.

According to the present disclosure, the sink cabinet apparatus includes the drawer that defines an accommodation space and may be retracted in and pulled out from the inner space of the cabinet and having a rear portion disposed lower than the bottom surface of the dead zone in which the pipe or the electric portion is disposed.

According to the present disclosure, the sink cabinet apparatus includes the reinforcing pipe fixed to each of the rear portion and the front portion of the drawer. The reinforcing pipe includes the rear portion fixed to the rear plate and disposed below the dead zone and the front portion extending from the rear portion and fixed to the front plate.

According to the present disclosure, the sink cabinet apparatus includes: a wash basin body, a cabinet body configured to support the wash basin body and define an inner space under the wash basin body; and a blower device disposed below the wash basin body and configured to supply air to an inner space defined by the panel, and the cabinet body is configured to define a panel inner space having cavities, a panel inlet hole to communicate the inner space defined by the panel with the panel inner space, and a panel discharge hole opened downward to communicate the panel inner space with an outside and the space below the wash basin body may be used as a sink cabinet apparatus at a side thereof and the air may be forced to flow into the inner space of the sink cabinet apparatus and a space below the sink cabinet apparatus.

The panel includes an interior panel that supports a left side and a right side of the wash basin body and defines the inner space; and an exterior panel disposed outside the interior panel, spaced apart from the interior panel, and configured to define appearance of the sink cabinet apparatus, and the interior panels disposed at both sides are configured to define the panel inlet holes on surfaces facing each other, and the panel inner space is defined between the interior panel and the exterior panel, thereby strengthening the strength of the sink cabinet apparatus using the interior panel and exterior panel and simultaneously utilizing the space between the panels to allow air flow.

The panel further includes a partition panel that partitions the inner space defined by the panel and vertically coupled to the panel and the vertical partition panels are disposed between the panels disposed at both sides to reinforce the strength of a portion below the wash basin body.

The panel defines a space where the appliances are mounted and the sink cabinet apparatus further includes the functional module that dries the appliances mounted inside due to the air discharged from the blower device and a partition panel that partitions into a space where the functional module is disposed and a space where the blower device is disposed and may dry the appliances used in the bathroom.

The inner space defined by the panel is divided into an insertion space into which the functional module is inserted and a communication space defined at a rear portion of the insertion space and that communicates the functional module with the panel inner space and the pane inlet hole is defined in the panel disposed in the communication space to flow the air discharged from the functional module into the panel inner space.

The functional module is movable forward from the insertion space and suctions the air discharged from the blower device and discharges the air into the communication space to flow the air discharged from the functional module into the panel inner space.

The blower device includes a blowing fan housing that defines an appearance and a suction inlet opened downward to introduce the external air; a blowing fan disposed inside the blowing fan housing to allow air flow; a blower motor that operates the blowing fan; and a heater that heats the air flowing by the blowing fan and flows the air below the sink cabinet apparatus and includes the heater to improve a drying function.

The blower device includes an exhaust duct that selectively flows the air discharged from the blower device to the inner space defined by the panel or a space forward and downward the sink cabinet apparatus and may adjust a direction of the air discharged according to the user's selection.

DETAILED DESCRIPTION

Configurations shown in embodiments and drawings described herein are merely the most preferred embodiments of the present disclosure and do not represent all of the technical ideas of the present disclosure. It can be understood that various equivalents and variations that may replace them can be made at the time of filing the present disclosure. In addition, terms used herein are defined in consideration of functions in the present disclosure, which may vary according to the intentions or customs of users and operators. Therefore, the definitions of these terms should be made based on the overall description set forth herein.

A sink cabinet apparatus according to an embodiment of the present disclosure is described below with reference to accompanying drawings.

Figure 1:
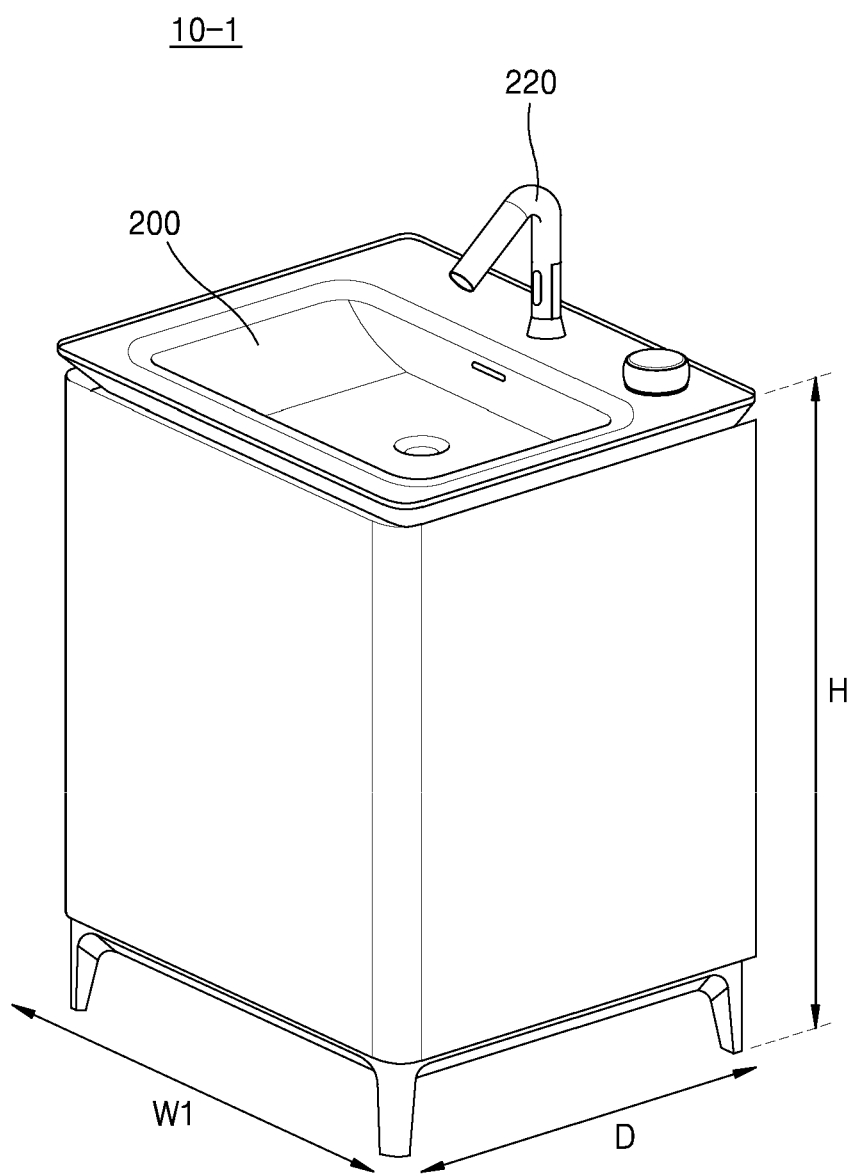
FIG. 1 is a perspective view showing a sink cabinet apparatus according to a first embodiment of the present disclosure.
Figure 2:
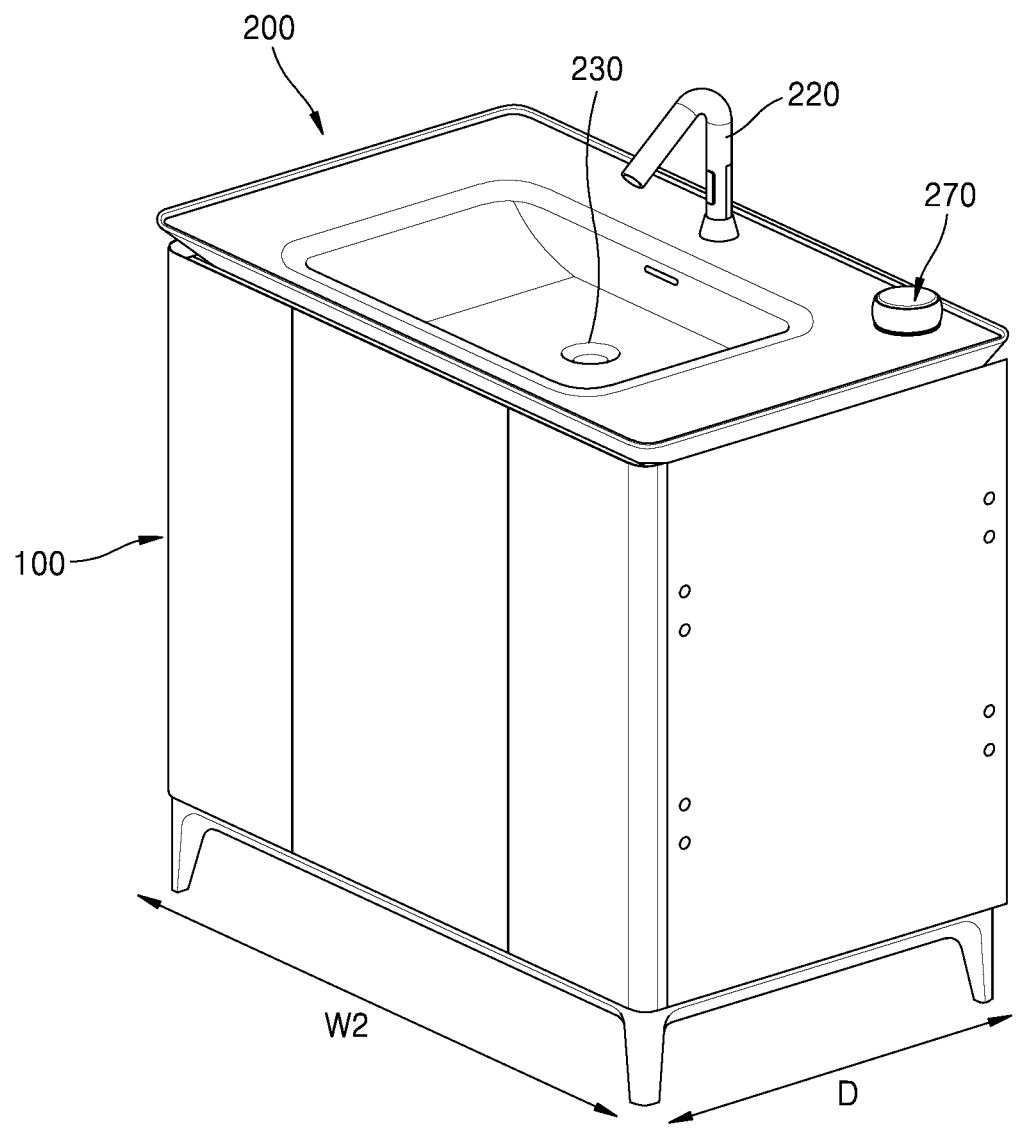
FIG. 2 is a perspective view showing a sink cabinet apparatus according to a second embodiment of the present disclosure.

FIG. 1 is a perspective view showing a sink cabinet apparatus according to a first embodiment of the present disclosure and FIG. 2 is a perspective view showing a sink cabinet apparatus according to a second embodiment of the present disclosure.

FIGS. 1 and 2 are perspective views showing sink cabinet apparatuses having different sizes.

The sink cabinet apparatus includes a wash basin 200 and the wash basin 200 includes a faucet 220 on a top plate. A space below the wash basin 200 is a space for pipe maintenance, may be simply closed, and may also be used as an accommodation space.

According to the present disclosure, the sink cabinet apparatus may include a functional module that performs various functions.

For example, the sink cabinet apparatus may be manufactured with various sizes according to forms and sizes of installation sites.

The sink cabinet apparatus has an approximately rectangular parallelepiped shape. The sizes of the sink cabinet apparatus may be determined as widths W1 and W2, a depth D, and a height H.

Changes in size of the sink cabinet apparatus refer to changes in each of the widths W1 and W2. Even if the width is changed, the depth D and the height H remain constant.

It can be seen that a sink cabinet apparatus 10-1 in FIG. 1 has a width W1 of a bottom surface different from width W2 of a bottom surface of a sink cabinet apparatus 10-2 in FIG. 2 and the sink cabinet apparatus 10-1 in FIG. 1 and the sink cabinet apparatus 10-2 in FIG. 2 have the same depth D and height H.

For example, even when the size of the sink cabinet apparatus is changed, the depth D and the height H remain the same, and only the width is changed.

According to the present disclosure, the sink cabinet apparatus may use a lot of components in common even if the size thereof is changed.

If the sink cabinet apparatus is manufactured by cutting and assembling natural wood, stone, and the like, common use of components is not needed. The common use of components is not significant because a board is assembled by cutting to meet the specification, attaching, and coupling.

When the sink cabinet apparatus is manufactured with an electronic product including various types of functional products, the common use of the components has a significant meaning in a process of manufacturing the product and reduction in manufacturing cost.

The sink cabinet apparatus in FIG. 1 is a basic model and the sink cabinet apparatus in FIG. 2 may be an extended model including functional drawers at both sides.

If the sink cabinet apparatus is the extended model, the sink cabinet apparatus may include a drawer type towel management unit that stores and heats the towels using the functional drawer. The drawer type towel management unit performs a function for receiving air from a dryer described below and heating and drying the stored towels.

Another example of functional drawer includes a drawer type console including a power supply and an accommodator for small home appliances.

Figure 3:
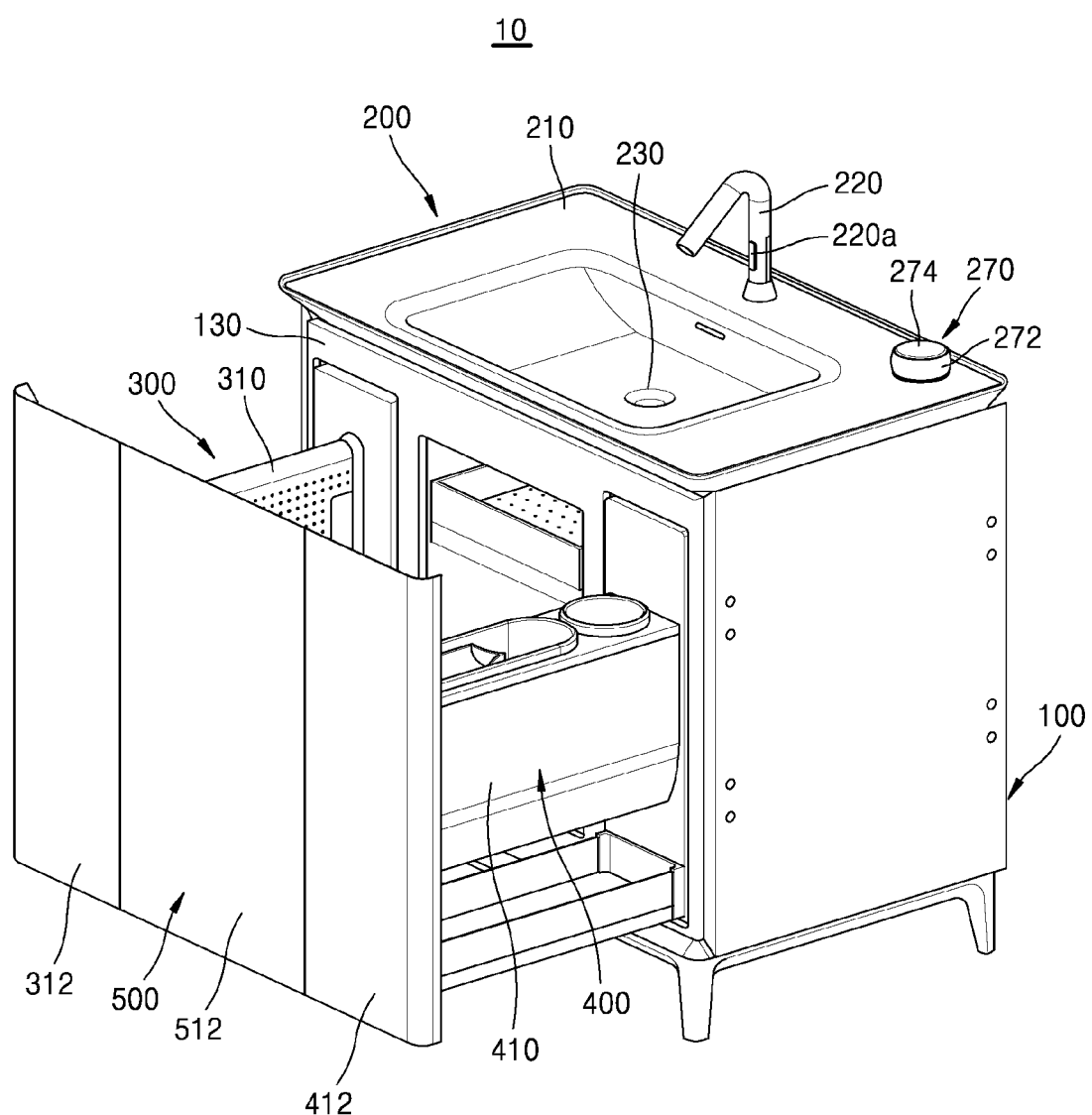
FIG. 3 is a perspective view showing a frame assembly structure according to a first embodiment of the present disclosure.
Figure 4:
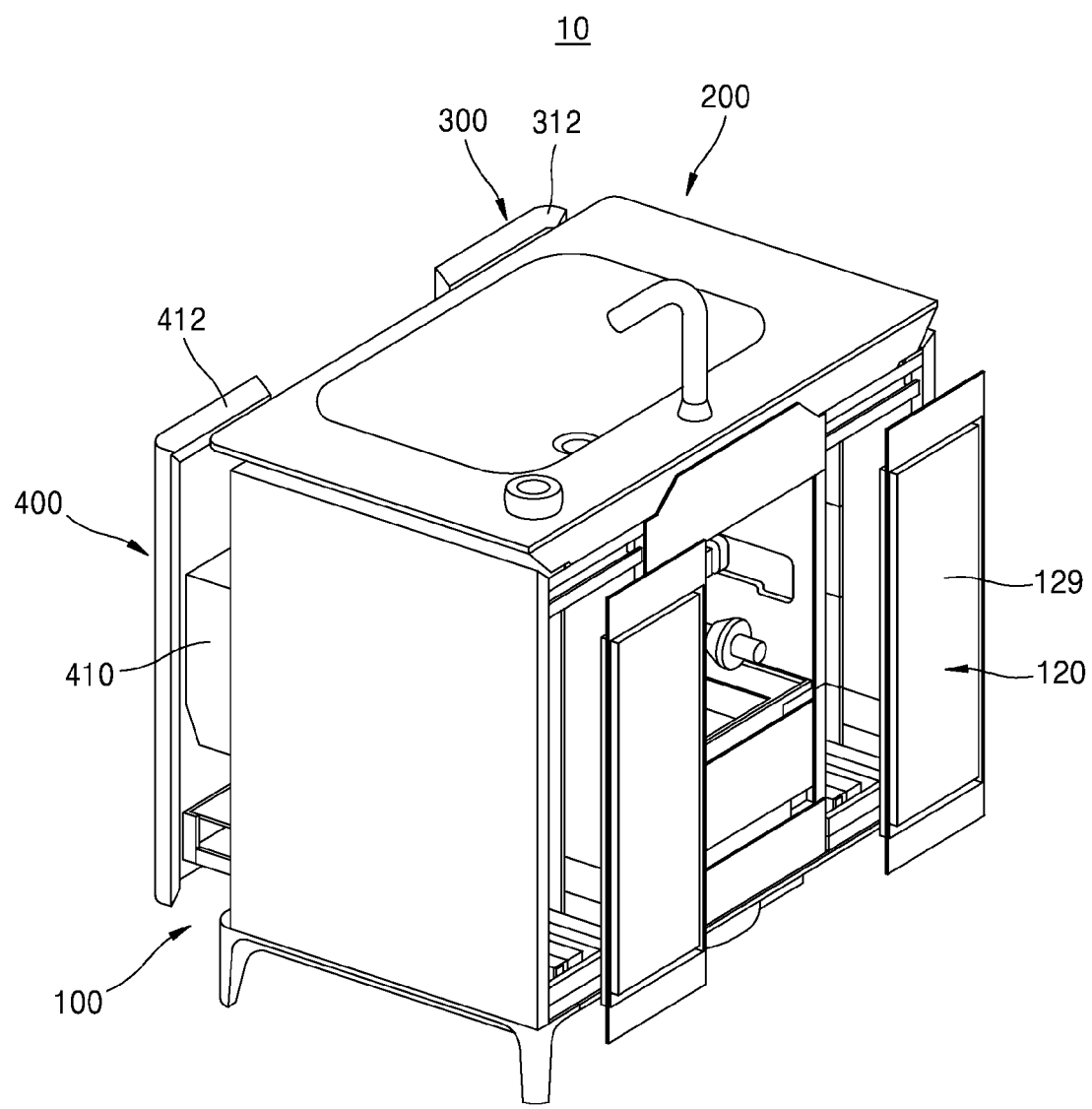
FIG. 4 is a perspective view showing a frame assembly structure according to a second embodiment of the present disclosure.

FIG. 3 is a perspective view showing an opened drawer type module of a sink cabinet apparatus according to a second embodiment of the present disclosure. FIG. 4 is a perspective view showing a rear panel separated from a sink cabinet apparatus according to a second embodiment of the present disclosure.

As shown, according to an embodiment of the present disclosure, a sink cabinet apparatus 10 is a facility device disposed in a bathroom and may include a wash basin 200, a sink cabinet body 100, and an inner case 120.

The sink cabinet body 100 provides structural strength and defines an appearance and a wash basin 200 including a faucet 220 to supply water may be disposed thereon.

In addition, the wash basin 200 may include an integrated operation switch 270 at one side thereof to control electrical operation.

The wash basin 200 includes a wash basin body 610 having a reservoir to contain water and a faucet 220 at one side of the wash basin body 610 to supply the water. A pop-up valve 230 may also be disposed at a bottom of the wash basin body 210 to discharge the stored water. Further, the faucet 220 of the wash basin 200 is connected to a water supply pipe and the pop-up valve 230 is connected to the drain pipe.

The faucet 220 of the wash basin 200 is connected to the water supply pipe and the water supply pipe may include a cold water pipe and a hot water pipe.

A heater may be connected to one side of the water supply pipe connected to the faucet 220. The heater may heat the water supplied to the faucet 620 through the water supply pipe.

In particular, the heater may control the temperature of the water discharged from the faucet 620 to be constant by heating the water supplied to the faucet 620 at the beginning of water supply. For example, low-temperature water remaining in the hot water pipe may be supplied to the faucet 220 of the wash basin 200 at the beginning of the water supply and the low-temperature water is instantaneously heated by the heater and the water at a temperature set by the user may be supplied.

The faucet 220 may include an electronic valve. The electronic valve may manipulate a temperature of water and an amount of water supplied through the faucet 220, which may be performed by the integrated operation switch.

Figure 5:
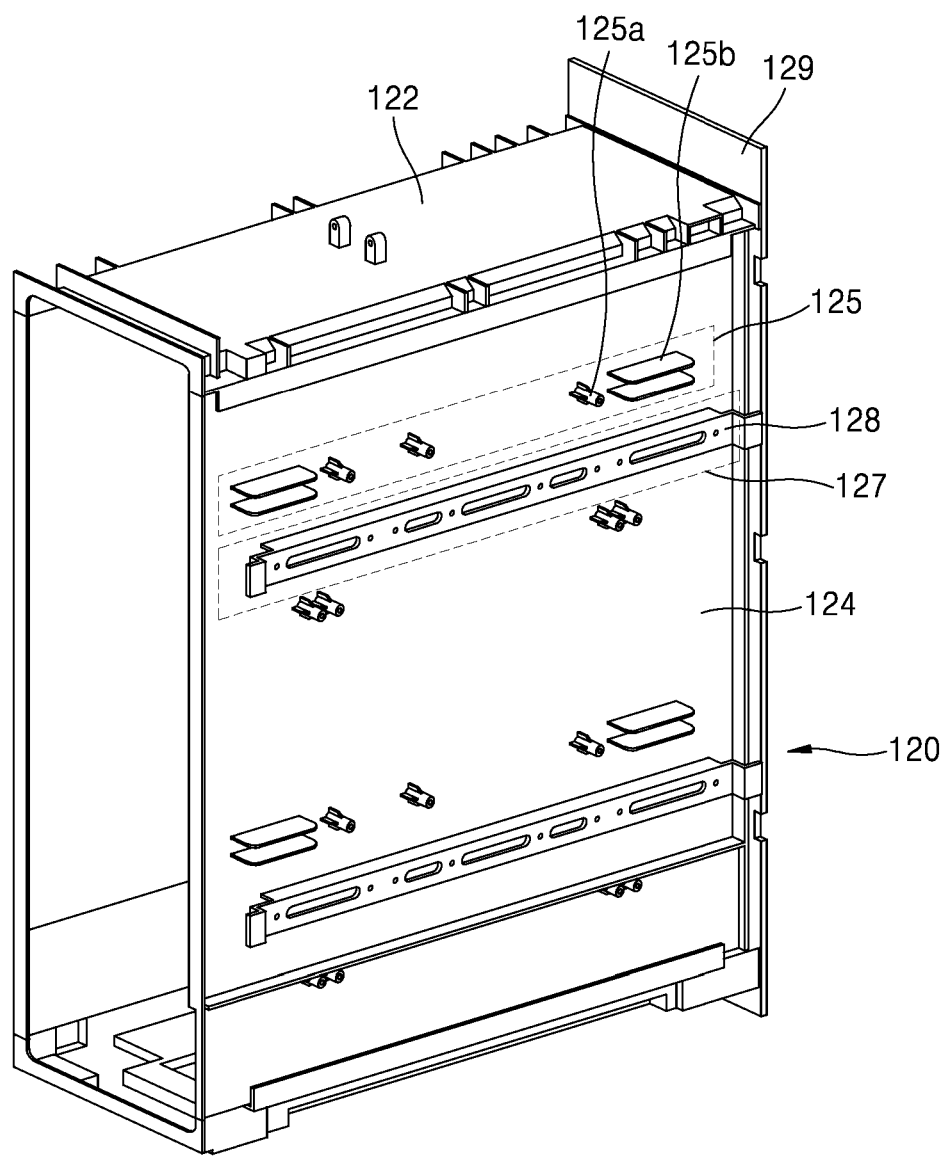
FIG. 5 is a perspective view showing a base plate of a sink cabinet apparatus according to a first embodiment of the present disclosure.
Figure 6:
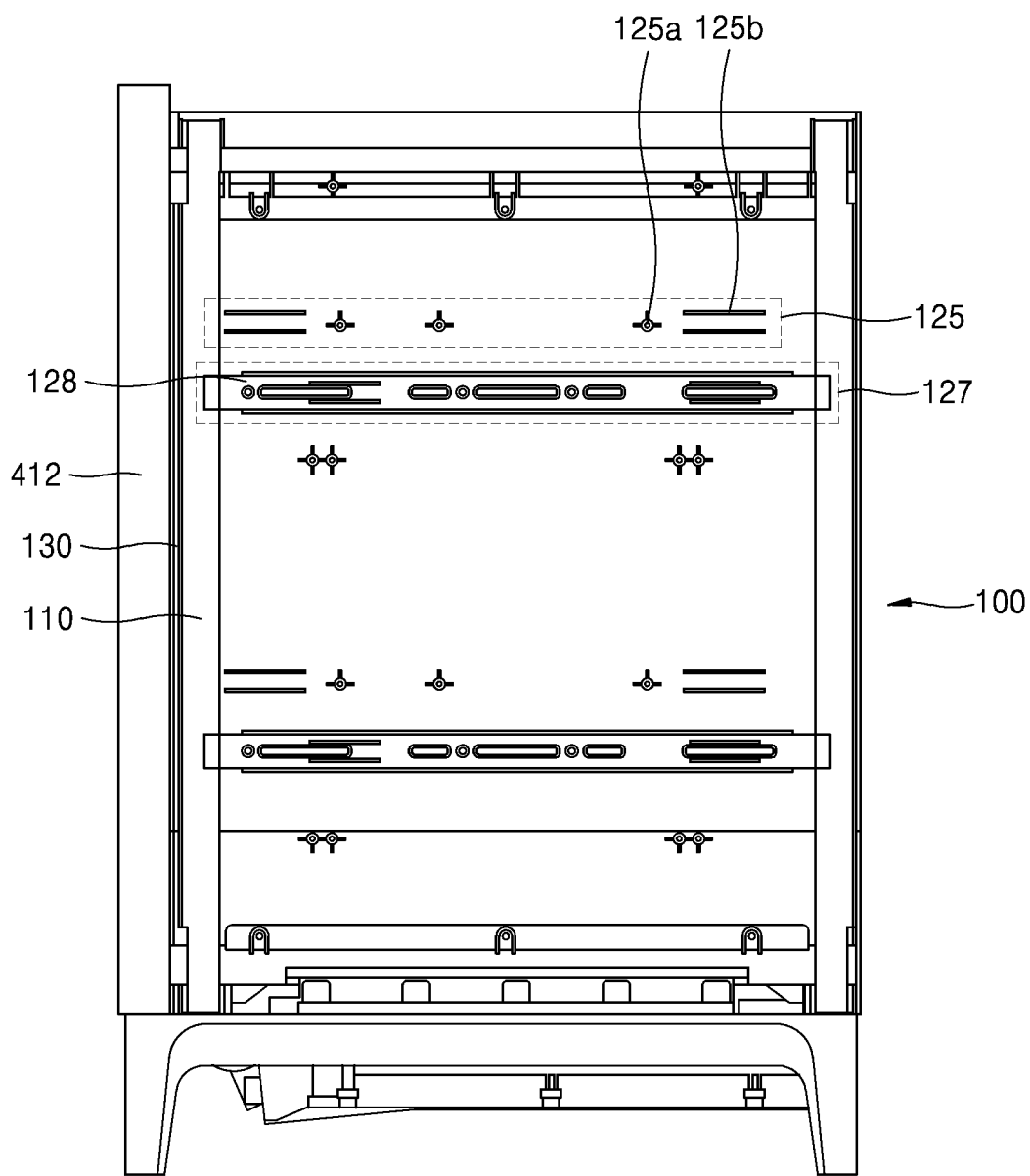
FIG. 6 is a perspective view showing a base plate of a sink cabinet apparatus according to a second embodiment of the present disclosure.
Figure 7:
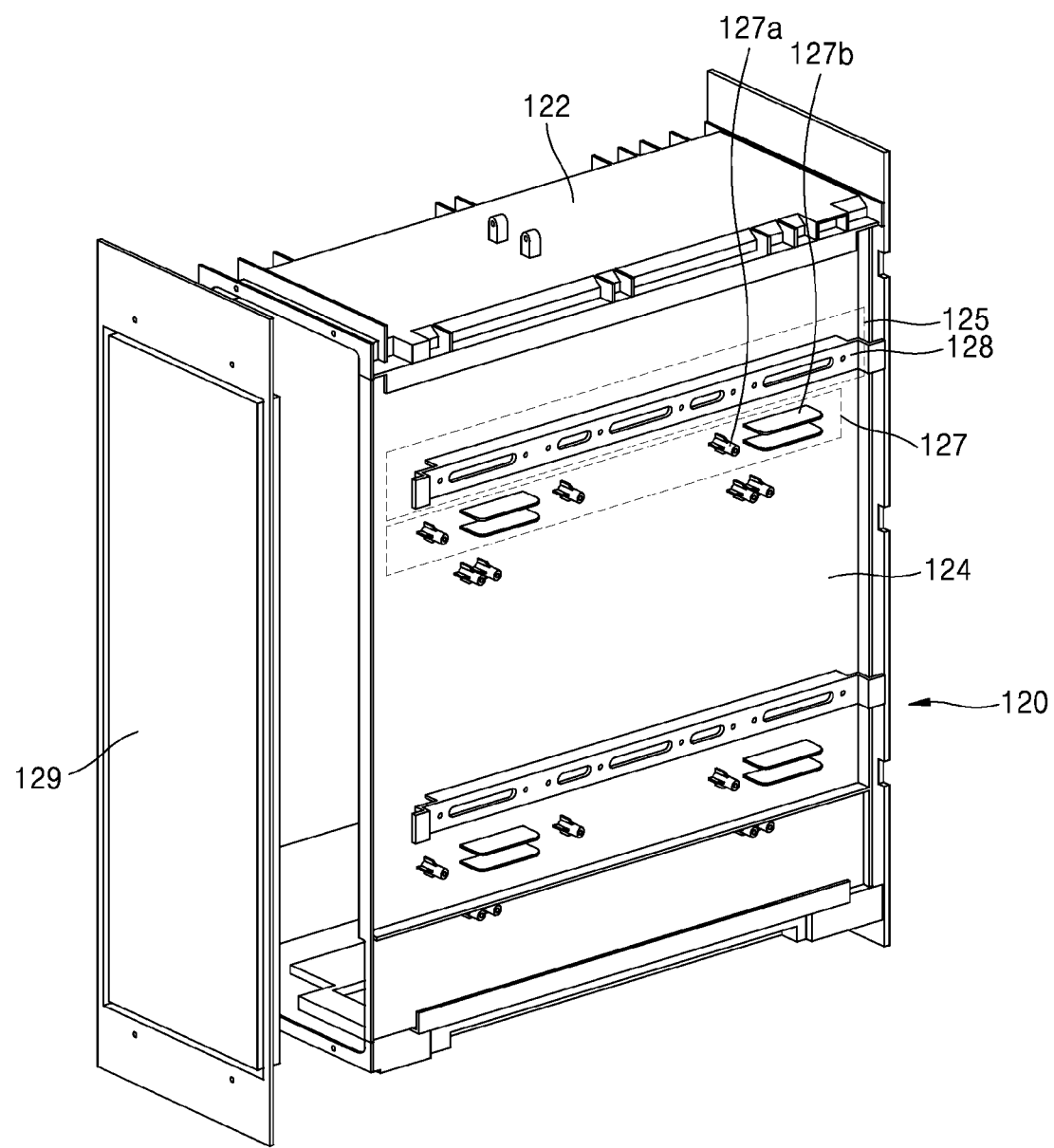
FIGS. 7 and 8 are cross-sectional views showing changing flow path of a sink cabinet apparatus according to a first embodiment of the present disclosure.
Figure 8:
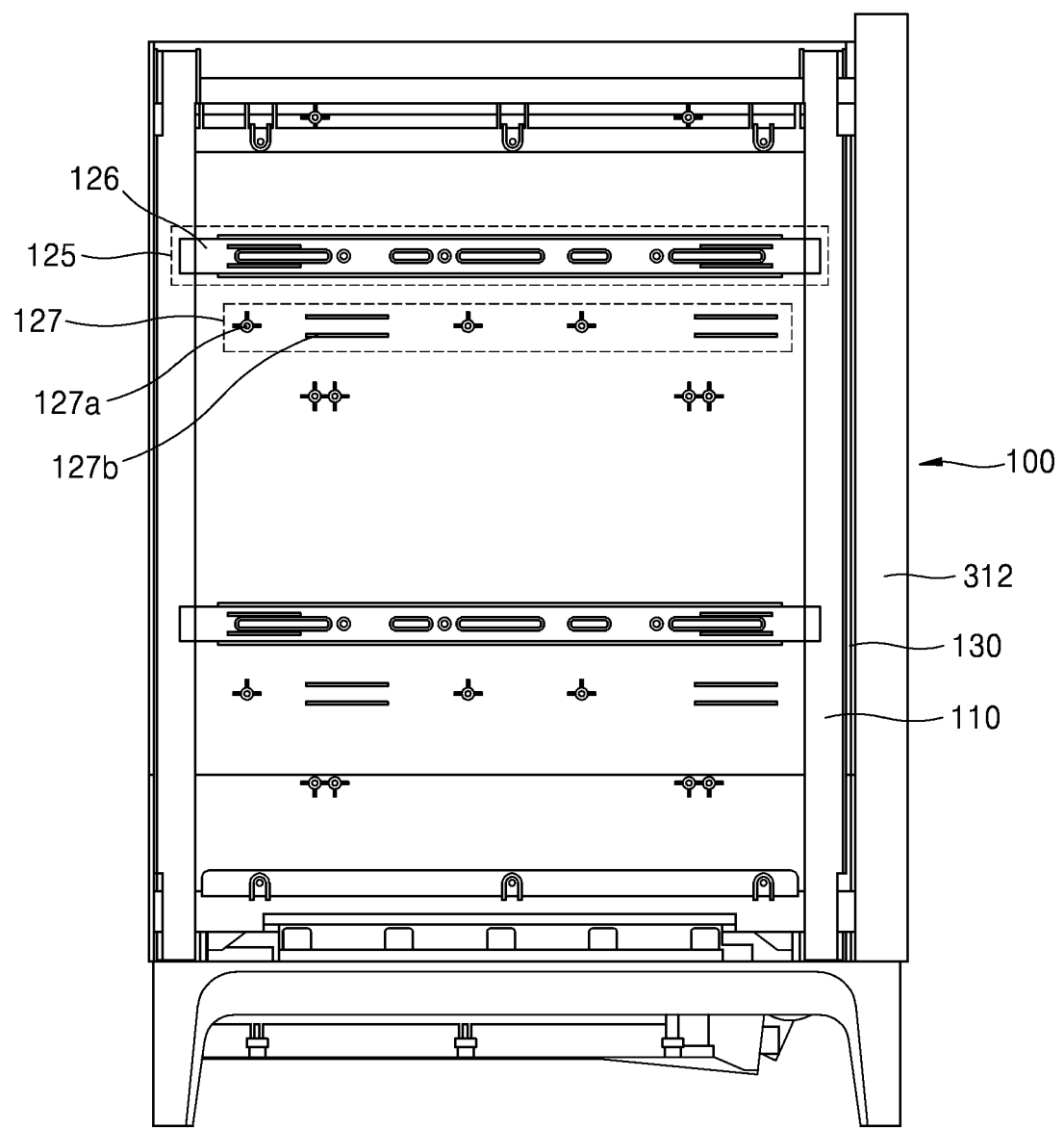

FIG. 5 is a side view showing an inner case mounted at a side of a sink cabinet apparatus according to a second embodiment of the present disclosure. FIG. 6 is a perspective view showing a separated inner case mounted at a side of a sink cabinet apparatus according to a second embodiment of the present disclosure. FIG. 7 shows an inner case mounted on the other side of a sink cabinet apparatus according to a second embodiment of the present disclosure. FIG. 8 is a perspective view showing a separated inner case mounted on the other side of a sink cabinet apparatus according a second embodiment of the present disclosure.

Referring to the drawings, a cabinet body may be supported on a base plate disposed on the bathroom floor. The sink cabinet body 100 may include a frame 110 and an exterior panel 130 may be coupled to an outside of the frame 110 to define an appearance. The sink cabinet body 100 may define a space to accommodate bathroom products such as towels or hair dryers. Various types of electronic components such as heaters and blowers may be disposed in the sink cabinet body 100.

Preferably, the sink cabinet body 100 may include an inner case 120 having a watertight structure to protect electronic components from water or the like and to prevent electric leakage.

The inner case 120 may be detachably mounted to the sink cabinet body 100. The inner case 120 may have the watertight structure and may define a space in which a drawer type module is retracted in or pulled out.

For example, the drawer type module may include at least one of a drawer type towel management unit 300 that heats and dries the stored towels or a drawer type console 400 that accommodates small home appliances.

The drawer type towel management unit 300 may include a towel management unit body 310 that may support towels and a first drawer cover 312 disposed in the front of the sink cabinet body 100. In addition, the drawer type console 400 may include a console body 410 and a second drawer cover 412 disposed in the front of the sink cabinet body 100.

A longitudinal drawer module 500 may also be disposed at a central region of the cabinet body 100 and may be pulled out to define an inner accommodation space. The longitudinal drawer module 500 may include a drawer body that defines an inner accommodation space and a door cover 512 at the front portion of the sink cabinet body 100.

Figure 9:
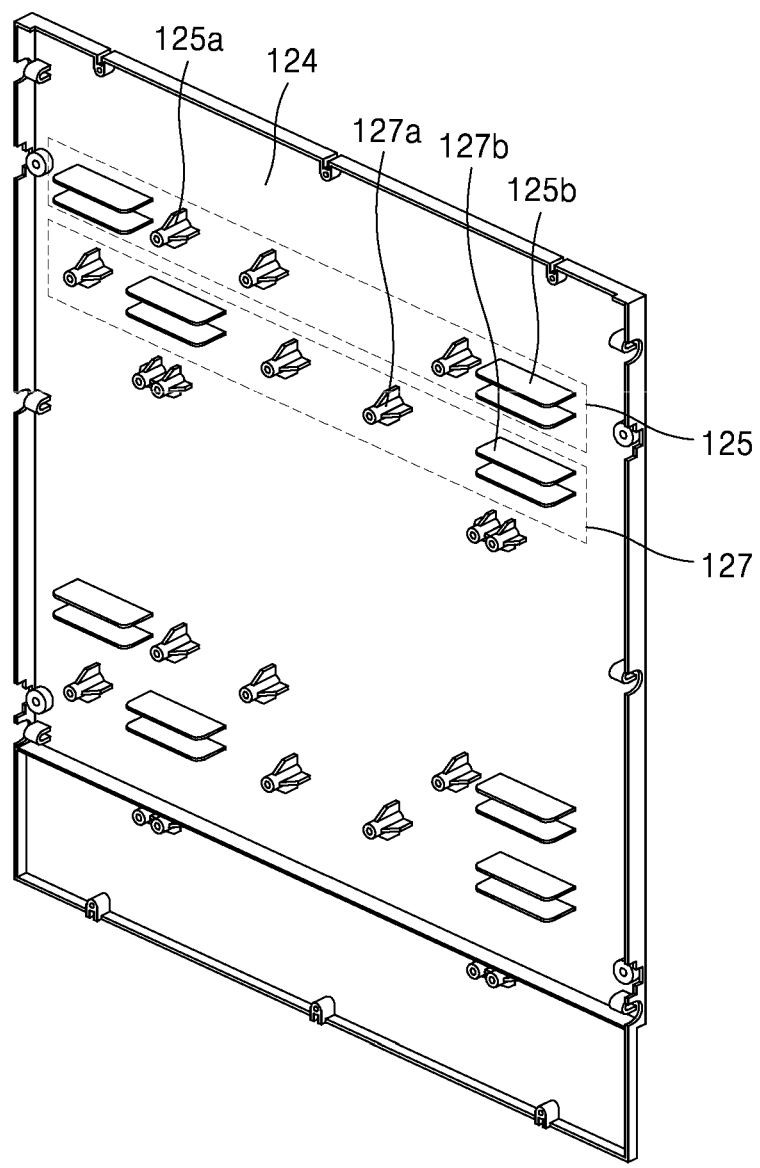
FIGS. 9 and 10 are cross-sectional views showing changing of flow path of a sink cabinet apparatus according to a second embodiment of the present disclosure.
Figure 10:
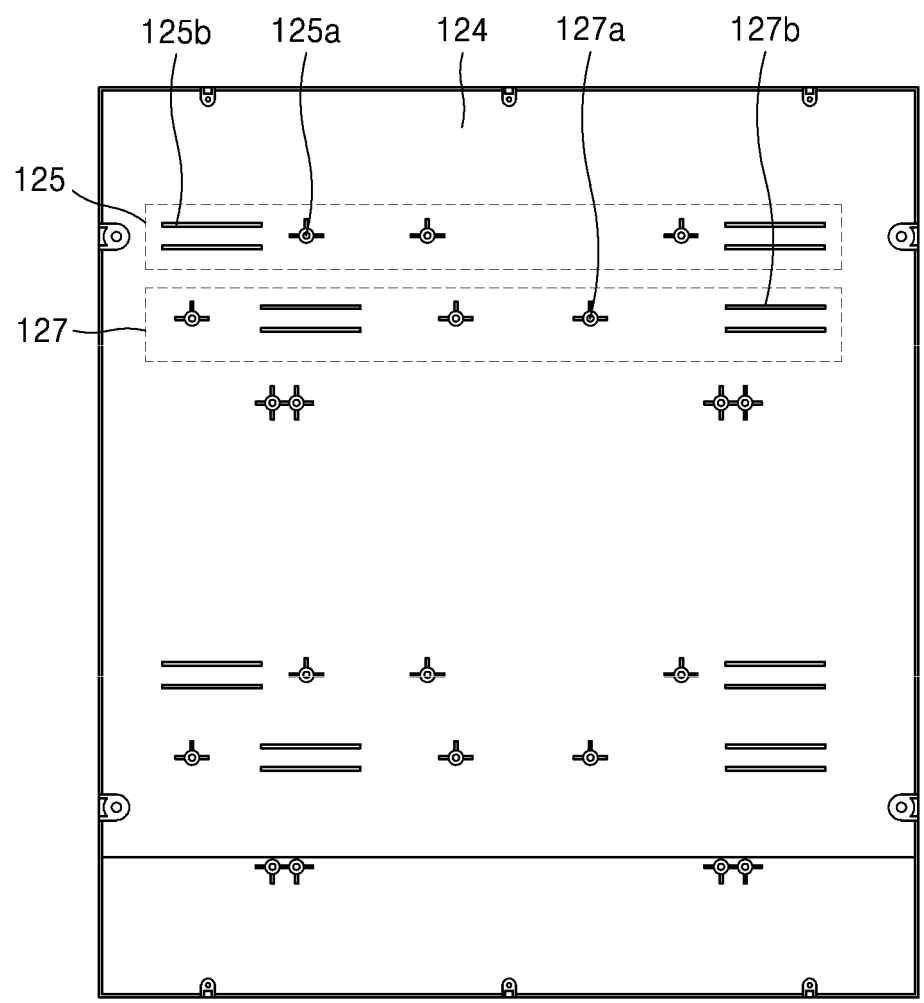

In addition, FIG. 9 is a perspective view showing a side panel coupled to an inner case of a sink cabinet apparatus according to a second embodiment of the present disclosure. FIG. 10 is a front view showing a side panel coupled to an inner case of a sink cabinet apparatus according to an embodiment of the present disclosure.

Referring to FIGS. 9 and 10, an inner case 120 may include a panel body 122 and a side panel 124 disposed at both sides of the panel body 122. Further, the inner case 120 may include a rear panel 129 on a rear surface to block the inside.

The panel body 122 includes a blocked portion at an upper portion thereof and may be coupled to be watertight by the side panel 124 and the rear panel 129 coupled to both sides and the rear surface, respectively.

A plurality of electronic components may be disposed inside the inner case 120, and for example, electronic components may be disposed at a lower portion thereof. A blower, a heater, or a cooler may be disposed as examples of the electronic components.

The panel body 122 may define an opening at a lower portion thereof. As the panel body 122 defines the opening at the lower portion thereof, dry air may be supplied by the operation of electronic components such as the blowers or the heaters and cold air may be supplied into the panel body 122 based on the operation of the cooler. Preferably, the panel body 122 may supply the dry air or the cold air supplied from downward to a drawer type module, for example, the drawer type towel management unit 300, or the drawer type console 400. The drawer type towel management unit 300 may dry stored towels as the dry air is supplied. The cold air may be supplied to the drawer type console 400 and beverages stored in the console body 410 may be cooled.

In this embodiment, the inner case 120 may be mounted on the sink cabinet body 100. To this end, the sink cabinet body 100 may define a space in which the inner case 120 is mounted. The inner case 120 may be fixed to the frame 110 of the sink cabinet body 100 via a fastening member such as a bolt, or may be fixed by welding.

Preferably, the inner case 120 of this embodiment may be detachably coupled to the sink cabinet body 100. The inner case 120 may be easily removed from the sink cabinet body 100 for repair or replacement when internal repair and the like is needed.

Specifically, the sink cabinet body 100 defines a space in which the inner case 120 is mounted and the inner case 120 may be inserted into and may be mounted in that space.

The side panels 124 at both sides are mounted in the mounting space of the sink cabinet body 100 and the inner case 120 may be coupled.

To this end, the sink cabinet body 100 may be provided to partition a space where the inner case 120 is mounted by the frame 100 disposed at both sides of the inner case 120. Further, the inner case 120 may be provided to insert the both side panels 124 of the inner case 120 into both side inner surfaces of the space partitioned by the frame 100, and thus, the inner case 120 may be mounted in the sink cabinet body 100.

Specifically, the both side panels 124 have the same shape, are bilaterally symmetrical, and may be exchanged and mounted at both sides of the inner case 120.

The side panel 124 may be coupled to protrude forward by a predetermined distance when being mounted on the sink cabinet body 100. Preferably, a drawer pulled out forward the sink cabinet body 100, for example, the drawer type towel management unit 300 or the drawer type console 400 may be mounted in the inner case 120.

The inner case 120 includes the panel body 122 and the side panel 124. The panel body 122 and the side panel 124 each has a thickness different from that of the exterior panel 300 of the drawer and each has a protruding distance different from that of the exterior panel 300. The coupler mounted on the sink cabinet body 100 may include an asymmetric coupling structure in which the side panels 124 may be used in common at both sides. The side panels 124 may be replaced at the left side and the right side of the inner case 120 due to the asymmetric coupling structure.

According to the present embodiment, the coupling structures in which the side panel 124 is mounted in the sink cabinet body 100 may be provided in common to use the side panels 124 in common at both sides.

For example, a first coupler 125 mounted at one side of the sink cabinet body 100 and a second coupler 127 mounted at the other side opposite to one side of the sink cabinet body 100 may be disposed in the side panel 124.

The first coupler 125 and the second coupler 127 may also be spaced apart from each other.

Preferably, the first coupler 125 and the second coupler 127 are spaced apart from each other by a predetermined vertical distance and may be spaced apart from each other forward and rearward based on the thickness difference between the exterior panel 130 and each of the covers 114, 312, and 412 of the drawer.

The side panels 124 may also be coupled to one side and the other side of the sink cabinet body 100, respectively, via a fastening member such as a bolt. To this end, a plurality of fastening holes 124a may be defined in the side panel 124 to couple using the fastening member.

More preferably, the inner case 120 may be slidably coupled to the sink cabinet body 100. To this end, the side panels 124 may be disposed at one side and the other side of the sink cabinet body 100 and may further include a first bracket 126 and a second bracket 128 slidably coupled to the sink cabinet body 100.

The first bracket 126 and the second bracket 128 may be coupled to any one of the first coupler 125 and the second coupler 127 via the fastening member such as the bolt according to the position at which the side panel 124 is mounted.

For example, when the side panel 124 is disposed to be mounted at one side of the sink cabinet body 100, the first bracket 126 may be coupled only to the first coupler 125.

In addition, when the side panel 124 is mounted on the other side of the sink cabinet body 100, the second bracket 128 may be coupled to only the second coupler 127 separated from the first coupler 125.

As described above, the first bracket 126 and the second bracket 128 may be selectively coupled to any one of the first coupler 125 and the second coupler 127 separated from each other according to the position at which the side panel 124 is disposed.

The side panel 124 may also have an 'L'-shaped bending portion at a circumferential portion to reinforce the strength.

As the side panel 124 has the bending portion at the circumferential portion, the first coupler 125 and the second coupler 127 may require a structure to stably support the first bracket 126 and the second bracket 128. To this end, in the present embodiment, the first coupler 125 and the second coupler 127 may include a plurality of fastening bosses 125a and 127a that protrude by a thickness corresponding to a protruding thickness of the bending portion of the side panel 124 to support the first bracket 126 and the second bracket 128.

The fastening bosses 125a and 127a may protrude from the side surface of the side panel 124 to contact the first bracket 126 and the second bracket 128 and a fastening hole 124a into which the fastening member such as the bolt is inserted may be defined at a central region.

In addition, the side panel 124 may further include a plurality of guide protrusions 125b and 127b to support the first bracket 126 and the second bracket 128, provided between the fastening bosses 125a and 127a.

For example, the guide protrusions 125b and 127b may be provided as protruding members having heights corresponding to heights of the fastening bosses 125a and 127a and having 'l' shape or 'U' shape, may be integrated with the side panel 125 at a side, and may also be provided as an additional member and may be coupled to a side of the side panel 124 by welding or the fastening member.

In this embodiment, the first coupler 125 and the second coupler 127 are separated from each other by a vertical distance. Preferably, each of the first coupler 125 and the second coupler 127 may be disposed at an upper portion and a lower portion of the side panel 124 with a plurality of rows.

Specifically, the first coupler 125 may be disposed in the side panel 124 and spaced apart downward from an upper end by a predetermined distance and the first coupler 125 and the second coupler 127 may include fastening bosses 125a and 127a into which the fastening members such as the bolts are inserted and guide protrusions 125b and 127b disposed between the fastening bosses 125a and 127a.

The second coupler 127 may also be disposed in the side panel 124 and may be spaced apart below the first coupler 125 by a predetermined distance.

The first coupler 125 may also be disposed in the side panel 124 and may be spaced apart upward from a lower end by a predetermined distance and the second coupler 127 may be disposed below the first coupler 125 by a predetermined distance and may spaced apart from the first coupler 125.

As described above, according to the present embodiment, the side panel 124 may include the first coupler 125 and the second coupler 127 having the same arrangement at the upper portion and the lower portion and may be mounted to the sink cabinet body 100 by the first bracket 126 and the second bracket 128 coupled to the first coupler 125 and the second coupler 127, respectively.

Meanwhile, a first guide rail to which the first bracket 126 is slidably mounted may be disposed at one side of the sink cabinet body 100. A second guide rail on which the second bracket 128 is slidably mounted may be disposed on the other side opposite to one side of the sink cabinet body 100.

The drawer type towel management unit 300 or the drawer type console 400 or the like may be coupled to the inner case as described above and a drawer that only provides an accommodation space may also be coupled. Electronic components such as a heater for internal heating or a blowing fan that circulates air may be mounted in the drawer type towel management unit 300 or the drawer type console 400.

As the inner case 120 includes the upper panel, the lower panel, and the side panel 124 coupled to one another to be watertight, the inner case 120 may prevent contact of the electronic components inside the inner case 120 with water to thereby prevent short circuit or failure.

In this embodiment, it is described that the inner case 120 is inserted into an inner space at one side and a space at the other side of the sink cabinet body 100 and one side may refer to a left side of the sink cabinet body 100 and the other side may refer to a right side of the sink cabinet body 100. In addition, the sink cabinet body 100 includes the frame 110 and may further include an interior panel that blocks the space between the frames 110.

The operation of the sink cabinet apparatus 10 configured as described above is as follows.

The inner case 120 having the watertight structure is manufactured by coupling the panel body 122, the side panel 124, and the rear panel 129. In this case, the side panels 124 are coupled to both sides of the inner case 120 regardless of both sides.

The brackets 126 and 128 are selected and coupled to any one of the first coupler 125 or the second coupler 127 according to the position at which the side panel 124 is mounted at one side or the other side of the sink cabinet body 100.

For example, the first bracket 126 is coupled to the first coupler 125 in the side panel 124 coupled to one side of the sink cabinet body 100 and the second bracket 128 is coupled to the second coupler 127 spaced apart from the first coupler 125 in the side panel 124 coupled to the other side of the sink cabinet body 100.

The first bracket 126 and the second bracket 128 are selected according to a position mounted to the sink cabinet body and are coupled to the inner case 120 by fastening members such as bolts inserted into the fastening bosses 125a and 127a.

In this case, the first bracket 126 and the second bracket 128 are coupled to the first coupler 125 and the second coupler 127 spaced apart from each other, respectively, to have a distance difference corresponding to the thickness difference from the exterior panel 130 of the drawer. The first bracket 126 and the second bracket 128 coupled to the first coupler 125 and the second coupler 127, respectively, protrude forward by a predetermined distance and the inner case 120 having an asymmetric structure is coupled.

The operator couples the first bracket 126 only to the first coupler 125 and does not couple the bracket to the second coupler 127 in the side panel 124 coupled to one side of the inner case 120. In addition, the operator performs different coupling of the bracket at the other side of the inner case 120. For example, the operator may not couple the bracket to the first coupler 125 in the side panel 124 coupled to the other side of the inner case 120, while the operator couples the second bracket 128 only to the second coupler 127.

Therefore, the first coupler 125 and the second coupler 127 separated from each other by a height may be disposed in the first coupler 125 and the second coupler 127 on each of the side panels 145 of the inner case 120. In this structure, when the inner case 120 is mounted on the sink cabinet body, the first bracket 126 and the second bracket 128 each may protrude toward a front of the inner case 120 according to the asymmetrical structure of the first coupler 125 and the second coupler 127.

When the first bracket 126 and the second bracket 128 are coupled to the side panel 124 of the inner case 120, the first bracket 126 and the second bracket 128 of the inner case 120 are pushed into the first guide rail and the second guide rail of the sink cabinet body 100 to mount the inner case 120 to the sink cabinet body 100.

The common use of components of the sink cabinet apparatus according to the present disclosure is described below in detail.

Figure 11:
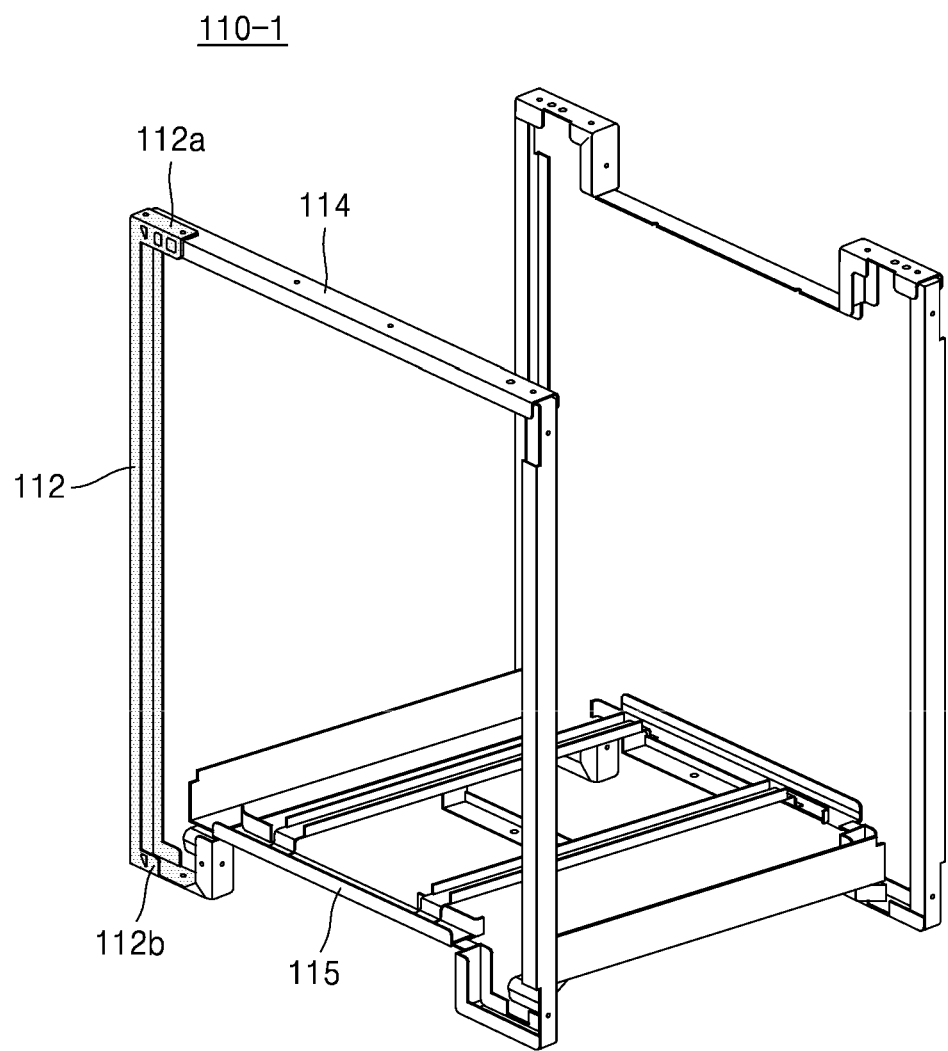
FIG. 11 is a perspective view showing a frame assembly structure according to a first embodiment of the present disclosure.
Figure 12:
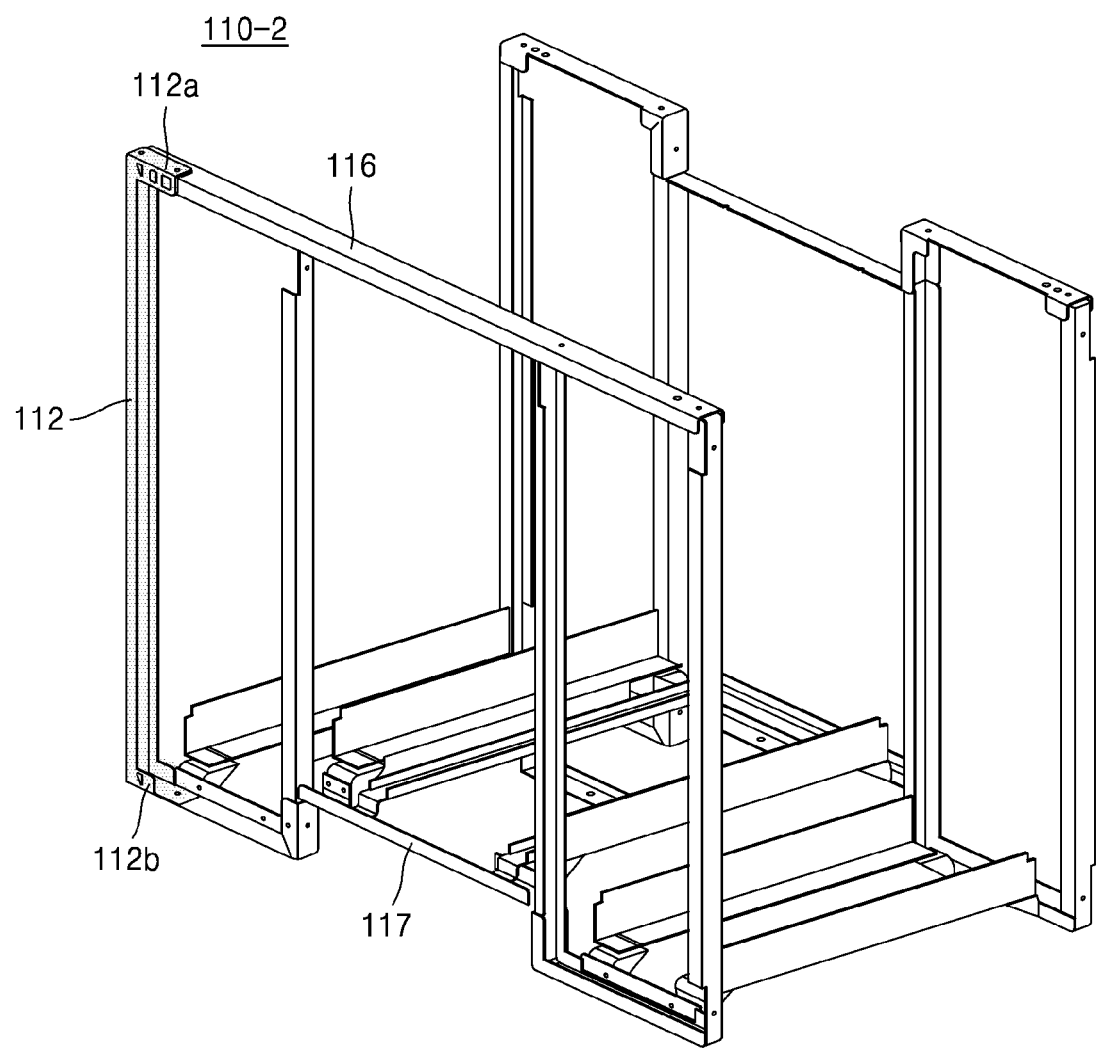
FIG. 12 is a perspective view showing a frame assembly structure according to a second embodiment of the present disclosure.

FIG. 11 is a perspective view showing a frame assembly structure according to a first embodiment of the present disclosure. FIG. 12 is a perspective view showing a frame assembly structure according to a second embodiment of the present disclosure.

According to the present disclosure, the sink cabinet apparatus includes modularized components assembled to a frame that forms a skeleton.

The frame includes a front frame, a rear frame, and a bottom frame.

The front frame and the rear frame each have an independently closed loop shape. The bottom frame is a straight frame and includes a front end and a rear end coupled to the front frame and the rear frame, respectively. As a result, the coupled bottom frame, front frame, and rear frame form a plurality of boxes.

A wash basin is coupled to the upper surface of the sink cabinet apparatus. The wash basin is made of a plate made of ceramic or synthetic resin. Therefore, as the wash basin itself has sufficient strength, the structural strength of the upper portion may be obtained by coupling the front frame and the rear frame to the wash basin.

Referring to FIGS. 11 and 12, it can be seen that front frames 110-1 and 110-2 include a longitudinal member 112 and horizontal members 114 and 115 assembled. FIG. 3 shows the frame of the sink cabinet apparatus 10-1 in FIG. 1 and FIG. 4 shows the frame of the sink cabinet apparatus 10-2 in FIG. 2.

As shown, when the horizontal members and the longitudinal member are assembled to form each of the front frame and the rear frame, even if a width of the sink cabinet apparatus is changed, the longitudinal members 112 may use a common component.

In this case, the longitudinal member 112 is integrated with an upper bending portion 112a and a lower bending portion 112b, the upper bending portion 112a is preferably coupled to be overlapped with the horizontal members 114 and 116 and the lower bending portion 1216 is preferably coupled to be overlapped with the horizontal members 115 and 117.

In this case, the sizes of the horizontal members 114 and 116 corresponding to the dedicated components may be reduced to increase the length of the upper bending portion 112a and the sizes of the horizontal members 115 and 117 corresponding to the dedicated components may be reduced to increase the length of the lower bending portion 112b.

Figure 13:
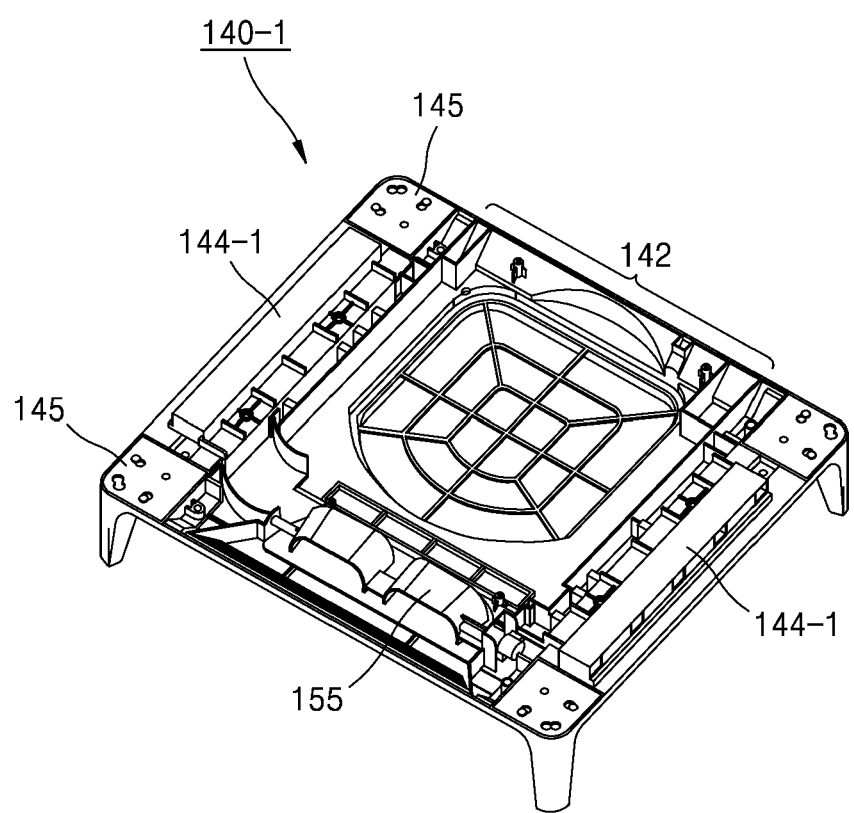
FIG. 13 is a perspective view showing a base plate of a sink cabinet apparatus according to a first embodiment of the present disclosure.
Figure 14:
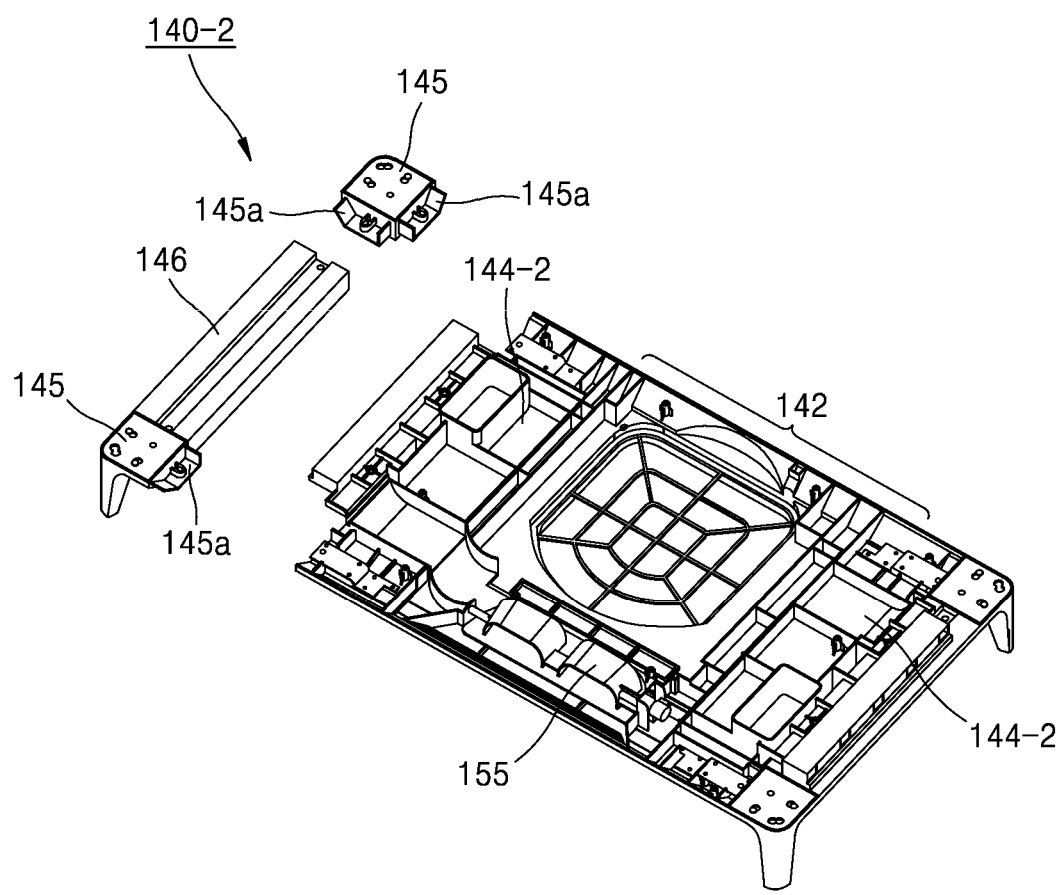
FIG. 14 is a perspective view showing a base plate of a sink cabinet apparatus according to a second embodiment of the present disclosure.

FIG. 13 is a perspective view showing a base plate of a sink cabinet apparatus according to a first embodiment of the present disclosure. FIG. 14 is a perspective view showing a base plate of a sink cabinet apparatus according to a second embodiment of the present disclosure.

Base plates 140-1 and 140-2 support the bottom surface and function to support the sink cabinet apparatus.

The base plates 140-1 and 140-2 each have a size corresponding to the widths W1 and W2 and the depth D of the sink cabinet apparatus.

The base plate 140-1 in FIG. 13 includes a center plate 142, side plates 144-1, and support legs 145. The base plate 140-2 in FIG. 6 includes a center plate 142, side plates 144-2, and support legs 145.

The base plate 140-1 having the size as shown in FIG. 13 and the base plate 140-2 having the size as shown in FIG. 6 may use other components except the side plate in common.

The central plate 142 disposed at a center has a size corresponding to a size of a dryer 150 described below and the size of the central plate 142 corresponds to a size of a blowing fan.

The same side plates are coupled to both sides of the central plate 142. For example, the side plates may be coupled to both sides of the central plate 142 in the same manner. As the width of the base plate is changed, only the side plates 144-1 and 144-2 are changed and other components may be used in common.

A length extending in the depth (D) direction of the center plate 142 corresponds to a length extending in the depth direction of the side plate.

In addition, when the size of the side plate is changed, the length extending in the depth direction of the side plate is not changed and only the length extending in the width direction thereof is changed.

In addition, the side plates 144-1 and 144-2 are each preferably commonly used on the left side and the right side. To this end, each of the side plates 144-1 and 144-2 preferably has a symmetrical shape in a forward and rearward direction.

Meanwhile, four support legs 145 are disposed and the same components may be preferably used. To this end, the support legs 145 may be diagonally symmetrical. As shown, the support leg 145 has an approximately square planar shape and preferably defines a coupling protrusion 145a on a surface facing an inside of each of the side plates 144-1 and 144-2.

The coupling protrusion 145a is fitted to each of the side plates 144-1 and 144-2. In addition, the base plate 140-2 having the size in FIG. 6 may further include a support bar 146 connecting the support legs 145 disposed at a front portion and a rear portion.

As shown in FIG. 14, the support legs 145 are coupled to both ends of the support bar 146, thereby improving the structural strength of the support legs 145.

Reference numeral 155 not described in FIGS. 13 and 14 shows a switching vane that changes a flow path. The switching vane is described below with reference to FIGS. 15 to 18.

Figure 15:
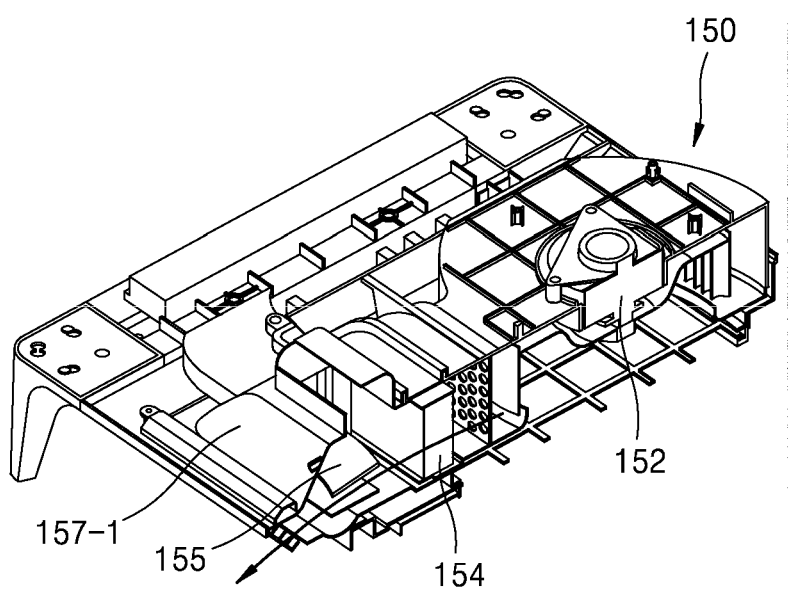
FIGS. 15 and 16 are cross-sectional views showing changing of a flow path of sink cabinet apparatus according to a first embodiment of the present disclosure.
Figure 16:
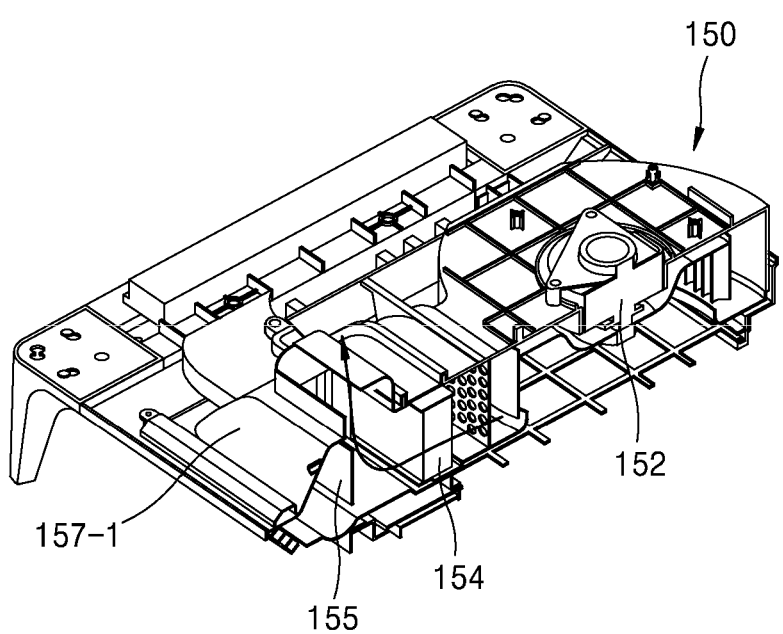

FIGS. 15 and 16 are cross-sectional views showing changing of a flow path of a sink cabinet apparatus according a first embodiment of the present disclosure.

As shown, a dryer 150 including a blowing fan 152 and a heater 154 may be disposed on a base plate of the sink cabinet apparatus.

A discharge outlet of the dryer 150 is covered with a flow path case 157-1. A switching vane 155 is disposed inside the flow path case 157-1. Further, the flow path case 157-1 includes a plurality of discharge outlets.

The dryer 150 may supply hot air to an outside of the sink cabinet apparatus or to an inside of the sink cabinet apparatus to dry an indoor space (or the floor) of a bathroom.

FIG. 7 shows hot air discharged toward the floor forward the sink cabinet apparatus and FIG. 8 shows hot air discharged toward an inside of a sink cabinet apparatus.

Changing a blowing direction is controlled by a position of a switching vane 155. The switching vane 155 is connected to an actuator such as a step motor and may have horizontal shape as shown in FIG. 7 or a vertical shape as shown in FIG. 8.

As shown in FIG. 15, when the switching vane 155 has the horizontal shape, heated air passes through an inside of the switching vane 155 and is discharged forward and downward. As shown in FIG. 16, when the switching vane 155 has the vertical shape, the hot air is blocked by the switching vane 155 and moves upward.

Figure 17:
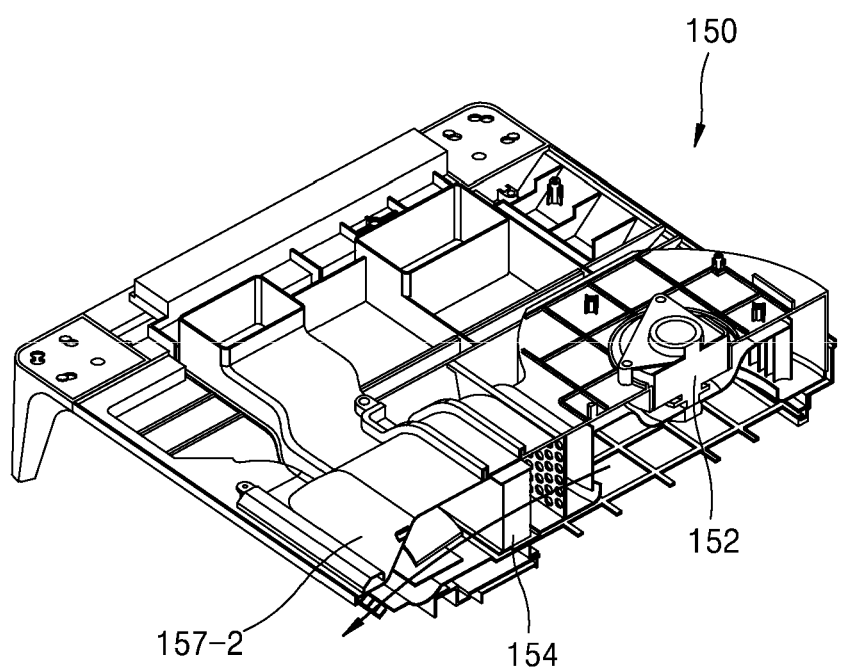
FIGS. 17 and 18 are cross-sectional views showing changing of a flow path of sink cabinet apparatuses according to a second embodiment of the present disclosure.
Figure 18:
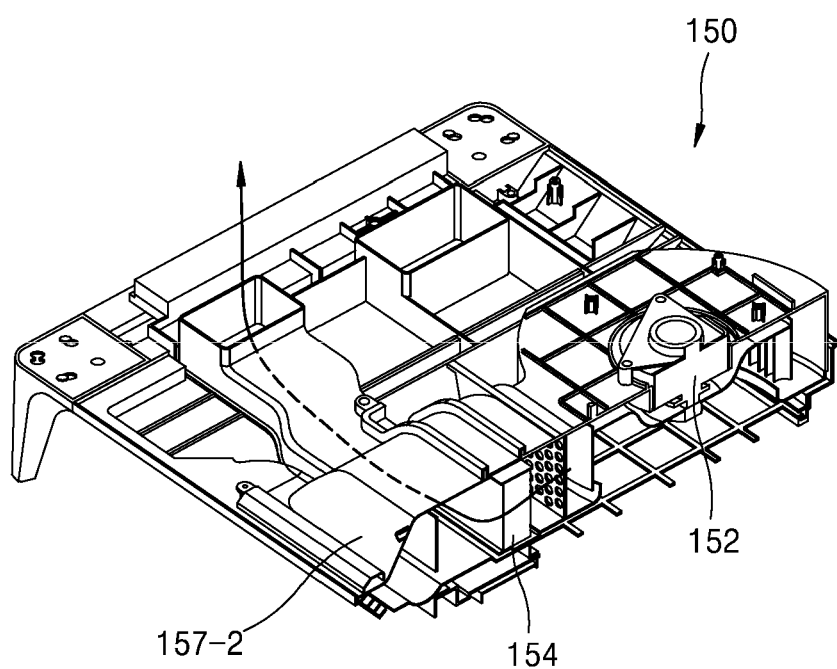

FIGS. 17 and 18 are cross-sectional views showing changing of a flow path of a sink cabinet apparatus according to a second embodiment of the present disclosure.

As shown, a dryer 150 may be disposed on a base plate of the sink cabinet apparatus. The dryer 150 includes a blowing fan 152 that generates air flow and a heater 154 that heats the air.

A discharge outlet of the dryer 150 is covered with a flow path case 157-2. A switching vane 155 is disposed inside the flow path case 157-2. Further, the flow path case 157-2 includes a plurality of discharge outlets. The flow path case in the previous embodiment is different from the flow path case in the present embodiment in that the flow path case in the previous embodiment defines discharge outlets to divide into an upper portion and a lower portion while the flow path case in the present embodiment defines a side discharge outlet.

The dryer 150 may supply hot air to an outside of the sink cabinet apparatus or supply the hot air to an inside (or a side) of the sink cabinet apparatus to dry an indoor space (or the floor surface) of a bathroom.

Hereinafter, a discharge outlet provided at a position to dry, by the dryer 150, the inner space of the bathroom is referred to as "a main discharge outlet" and a discharge outlet provided at another position is referred to as "an auxiliary discharge outlet".

Referring to FIG. 17, the hot air is discharged from the main discharge outlet disposed toward the floor forward the sink cabinet apparatus. Referring to FIG. 18, the hot air is discharged from the auxiliary discharge outlet on the side disposed toward the inside of the sink cabinet apparatus.

Changing the blowing direction is controlled by the position of the switching vane 155. The switching vane 155 is connected to an actuator such as a step motor and may have a horizontal shape as shown in FIG. 17 or may have a vertical shape as shown in FIG. 18.

The flow path case includes the main discharge outlet and the auxiliary discharge outlet and the auxiliary discharge outlet is branched from the main discharge outlet. When the switching vane is provided at a point after a point at which the auxiliary discharge outlet is branched, discharge from the auxiliary discharge outlet is performed by closing the main discharge outlet due to the vertical shape of the switching vane 155.

As shown in FIG. 17, when the switching vane 155 has the horizontal shape, the heated air passes through the inside of the switching vane 155 and is discharged forward and downward.

As shown in FIG. 18, when the switching vane 155 has the vertical shape, the hot air is blocked by the switching vane 155 and is moved to a side.

As described above, as the first embodiment in FIGS. 15 and 16 and the second embodiment in FIGS. 17 and 18 have different directions of changing flow paths, the flow path cases 157-1 and 157-2 use different components from each other, but the switching vanes 155 disposed in the flow path case may use a common component.

A modular rail according to an embodiment of the present disclosure is described below.

Figure 19:
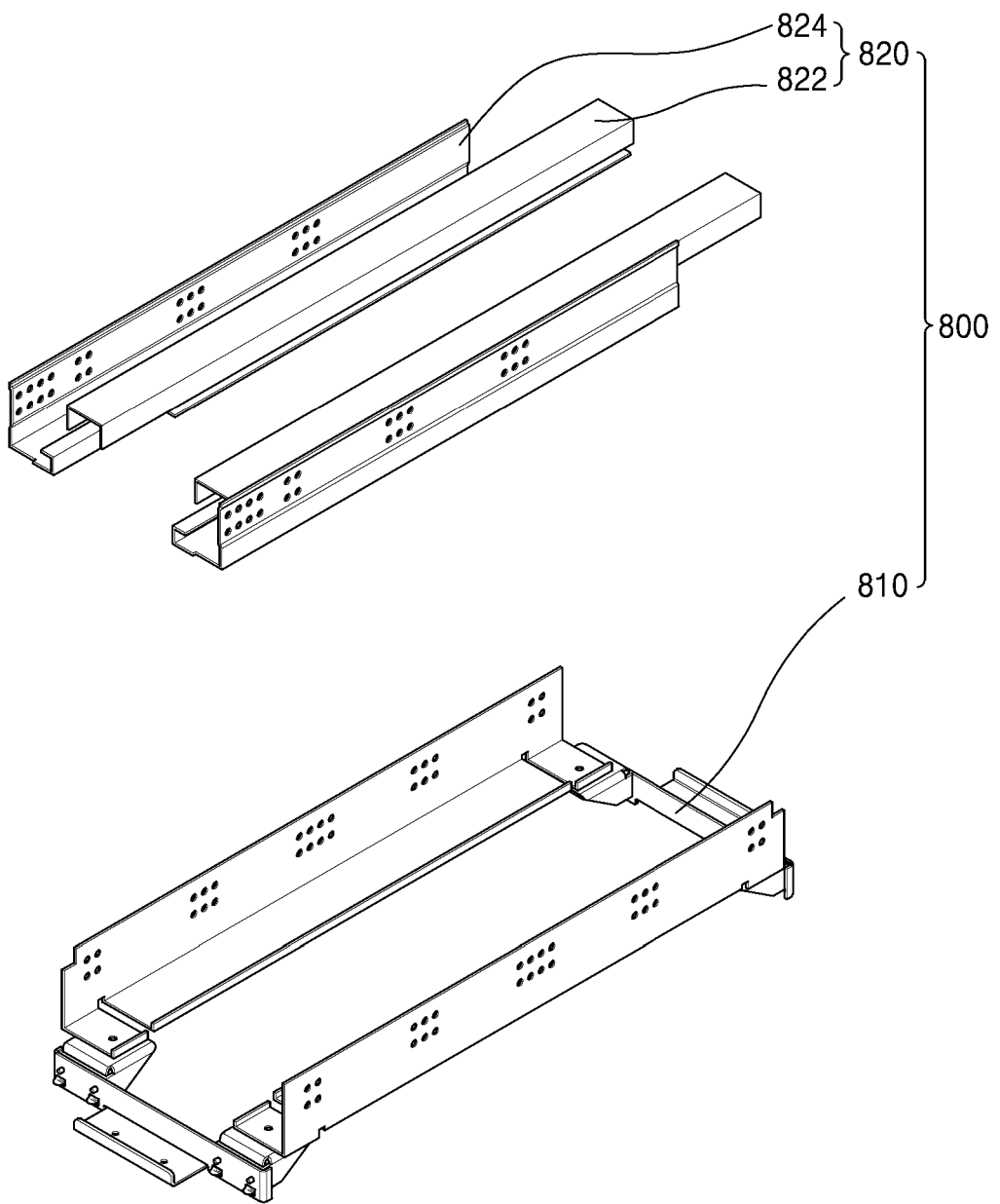
FIG. 19 is a perspective view showing separated rail set and bracket of a modular rail according to an embodiment of the present disclosure.
Figure 20:
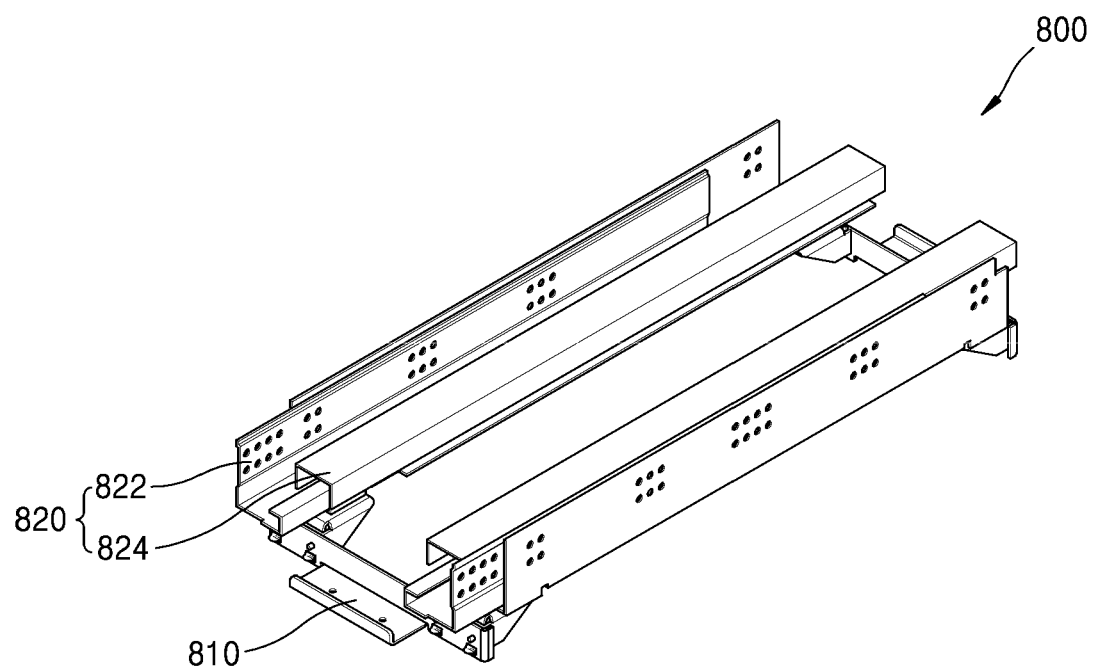
FIG. 20 is a perspective view showing a modular rail according to an embodiment of the present disclosure.

FIG. 19 is a perspective view showing separated rail set and bracket of a modular rail according to an embodiment of the present disclosure and FIG. 20 is a perspective view showing a modular rail according to an embodiment of the present disclosure.

As shown, the modular rail according to an embodiment of the present disclosure includes a pair of rail sets and brackets.

Products may be accommodated and stored inside the cabinet and the cabinet defines an accommodation space inside a cabinet body 100.

The cabinet body 100 may include the upper wall, the left wall, the right wall, and the rear wall. The walls prevent exposure of the inside of the cabinet and prevents foreign objects such as dust from entering the inside.

As the lower portion is close to the floor and is not easily exposed to the outside, the wall may not be disposed at the lower portion, but the wall may be disposed at the lower portion to prevent the foreign objects entering from downward.

Products may be accommodated directly in the accommodation space inside the cabinet and objects may also be accommodated using drawers that are retracted in or pulled out from the accommodation space for convenience of use.

The accommodation space may be configured as a space closed by the wall of the cabinet body 100 and may define an opening through which the objects may be accommodated or drawers may be retracted in and pulled out, at a front side.

The skeleton of the cabinet body 100 may be formed by the frame 110. The frame 110 supports the body of the cabinet and may maintain a shape of the cabinet.

The drawer may be retracted into the frame 110 that forms the skeleton of the cabinet or may be pulled out from the frame 110.

When the drawer is retracted in or pulled out from the frame 110, friction may occur on a contact surface between the drawer and the frame 110. When a rail set 820 is disposed between the drawer and the frame 110, the friction occurring between the drawer and the frame 110 may be reduced because the drawer may slide inside the frame 110.

Therefore, the rail set 820 is preferably disposed between the drawer and the frame 110 to easily retract and pull out the drawers.

The rail set 820 includes a drawer fixing rail 822 disposed on the drawer and a bracket fixing rail 822 disposed on the accommodation space.

The drawer fixing rail 822 may be disposed at the lower portion of the drawer to support the drawer below the drawer.

The drawer fixing rail 822 and the bracket fixing rail 822 are coupled to each other and the drawer fixing rail 822 and the bracket fixing rail 822 slide within a limited displacement to change a length of the rail set 802.

Although not shown in the drawing, the drawer fixing rail 822 may define a coupling hole through which the drawer fixing rail 822 is coupled to the drawer. The drawer disposed on the drawer fixing rail 822 may slide into the frame 110 and may be retracted in and pulled out.

Various types of rail sets 820 may be provided and may be coupled to the drawer in various manners. The rail set 820 is preferably coupled under the drawer to withstand a load of the drawer.

In addition, when the rail set 820 is coupled to the lower surface of the drawer, the rail set 820 may not be exposed to a side, thereby improving appearance qualities.

In consideration of the above, as one embodiment of the installation and the type of the drawer, the rail set 820 may be coupled to the lower surface of the drawer and may include a damping under rail with a damper.

Figure 21:
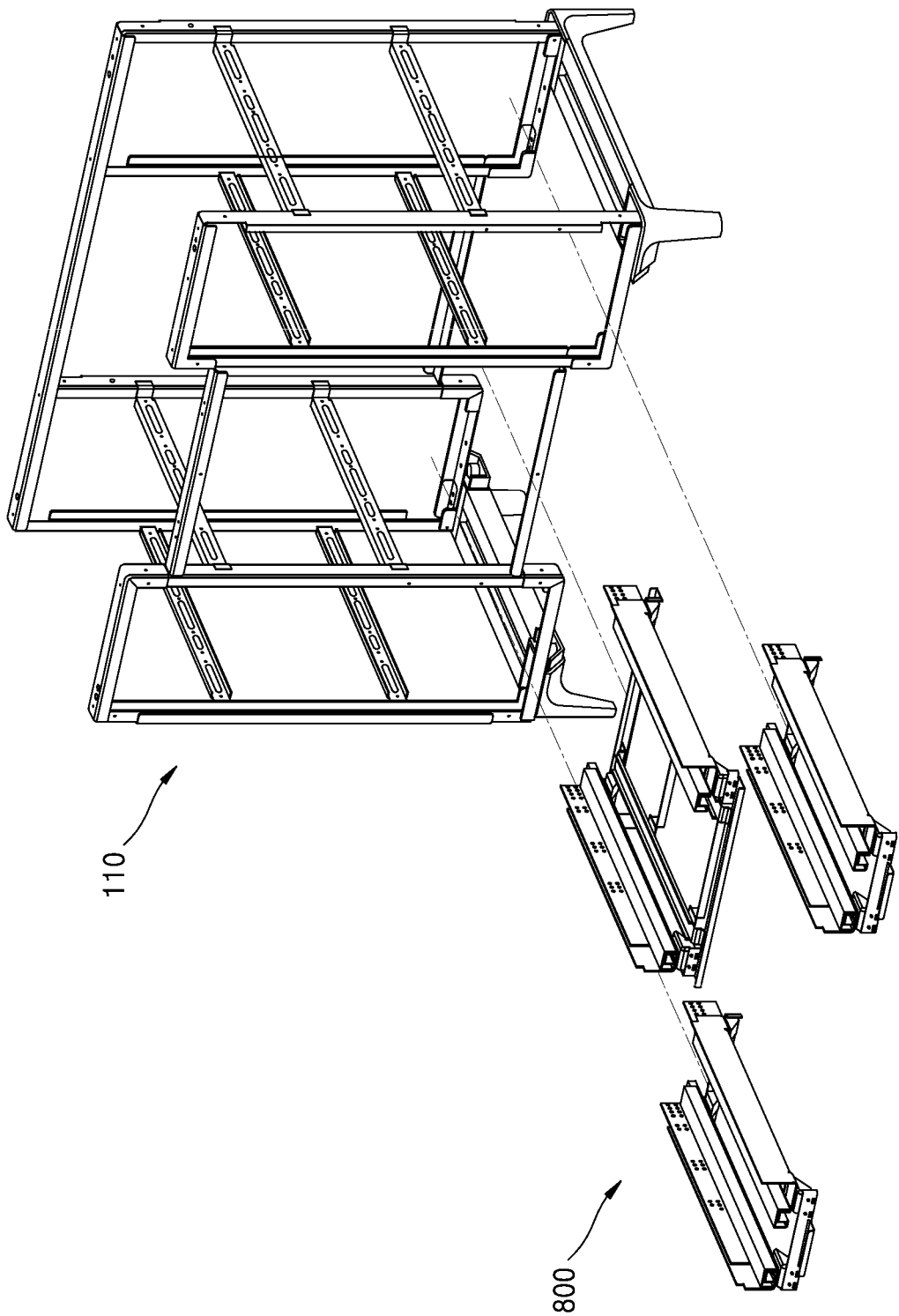
FIG. 21 shows separated modular rail and frame according to an embodiment of the present disclosure.
Figure 22:
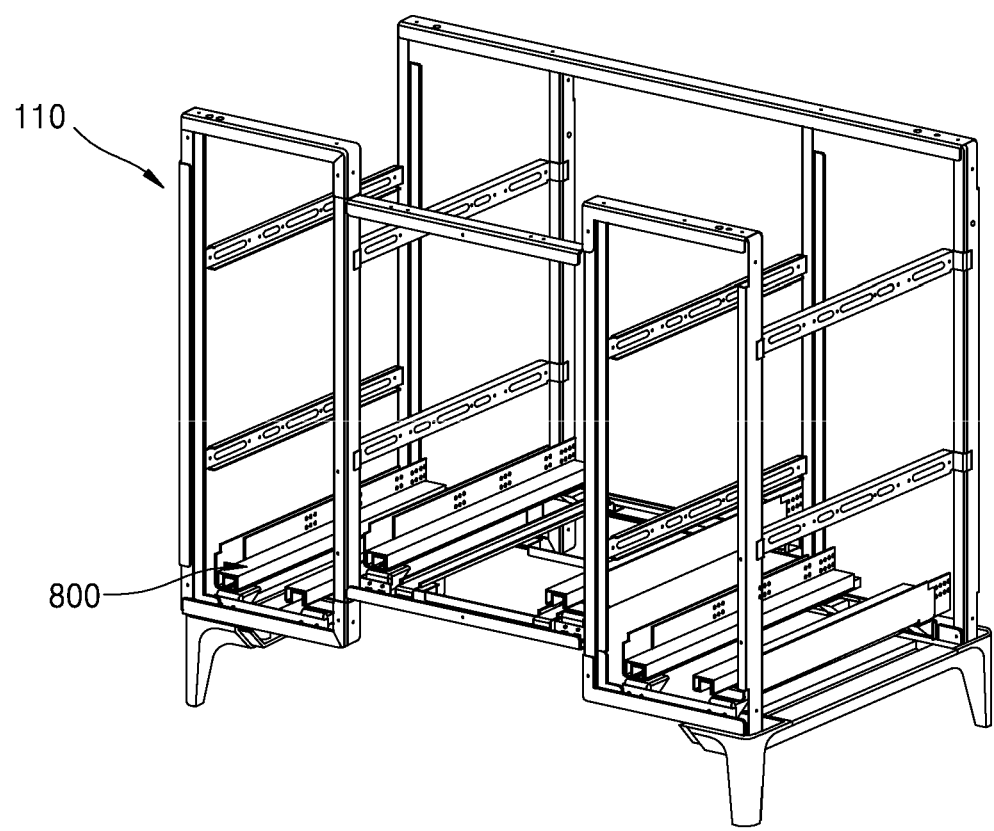
FIG. 22 shows a modular rail disposed on a frame according to an embodiment of the present disclosure.

FIG. 21 shows separated modular rail and frame according to an embodiment of the present disclosure and FIG. 22 shows a modular rail disposed in a frame according to an embodiment of the present disclosure.

According to an embodiment of the present disclosure, as shown, a modular rail 800 includes a rail set 820 fixed to a bracket 810 to conveniently install the modularized rail in a frame 110.

When the rail set 820 is disposed in the frame 110, as horizontality and lateral tolerance influence movement of the drawer disposed on the rail set 820, the horizontality and an inclination of each of the disposed rail sets 820 and a coupling state of the rail set 820 may be checked when placing the pair of rail sets 820.

Meanwhile, in the modularized rail, the rail set 820 does not need to adjust the horizontality or the inclination of the rail set 820 to be disposed and the rail set 820 having adjusted horizontality and inclination may be disposed on the frame 110, thereby improving installation quality.

Therefore, a pair of rail sets 820 may be preferably configured as a module. In this configuration, the pair of rail sets 820 coupled to the drawer may be fixed to the bracket 810 and the bracket 810 fixed to the rail set 820 may be disposed in the frame 110 that forms skeleton of the cabinet.

The bracket 810 may be disposed on the frame 110 through various coupling methods using bolts or rivets.

A coupling method to facilitate uncoupling of the bracket 810 from the frame 110 may be preferably selected to easily remove the bracket 810 from the frame 110 to thereby repair the cabinet.

Accordingly, the bracket 810 may be preferably disposed on the frame 110 using the bolt to facilitate the assembly and the disassembly to thereby easily dispose the bracket 810 on the frame 110 and easily remove the bracket 810 from the frame 110.

As shown, the modular rail 800 according to an embodiment of the present disclosure may be disposed on the frame 110 to improve rigidity of the frame 110.

As the bracket 810 of the modular rail 800 has a standardized structure, when the modular rail 800 is disposed on the bottom surface of the frame 110, the modular rail 800 may function as a reinforcing member to reinforce the structure and the rigidity of the bottom frame 110.

For example, when the modular rail 800 is disposed on the frame 110, the bracket 810 supports the frame 100 to reinforce the structure and the rigidity of the frame 110.

Figure 23:
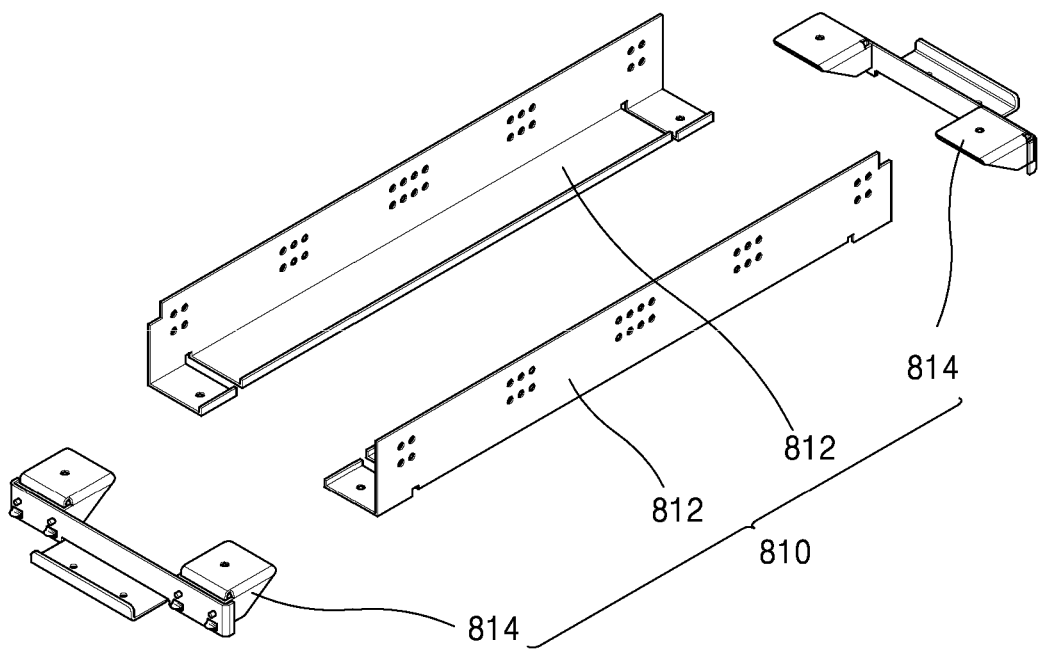
FIG. 23 shows a bracket separated from a modular rail according to an embodiment of the present disclosure.

FIG. 23 shows separated bracket of modular rail according to an embodiment of the present disclosure.

As shown, according to the embodiment of the present disclosure, a bracket 810 of a modular rail 800 includes a pair of rail fixing brackets 812 and a pair of frame fixing brackets 814.

A pair of rail sets 820 is fixed to the pair of rail fixing brackets 812, respectively. The pair of rail fixing brackets 812 may be spaced apart from each other by a distance to maintain a distance between the rail sets 820 and may be disposed in parallel.

The pair of frame fixing brackets 814 are provided at a position crossing the rail fixing brackets 812 and coupled to both ends of the rail fixing brackets 812 to adjust, by the frame fixing brackets 814, movement of the rail fixing brackets 812 in the width direction.

The pair of rail fixing brackets 812 and the pair of frame fixing brackets 814, which are coupled, may have a quadrangle shape.

Figure 24:
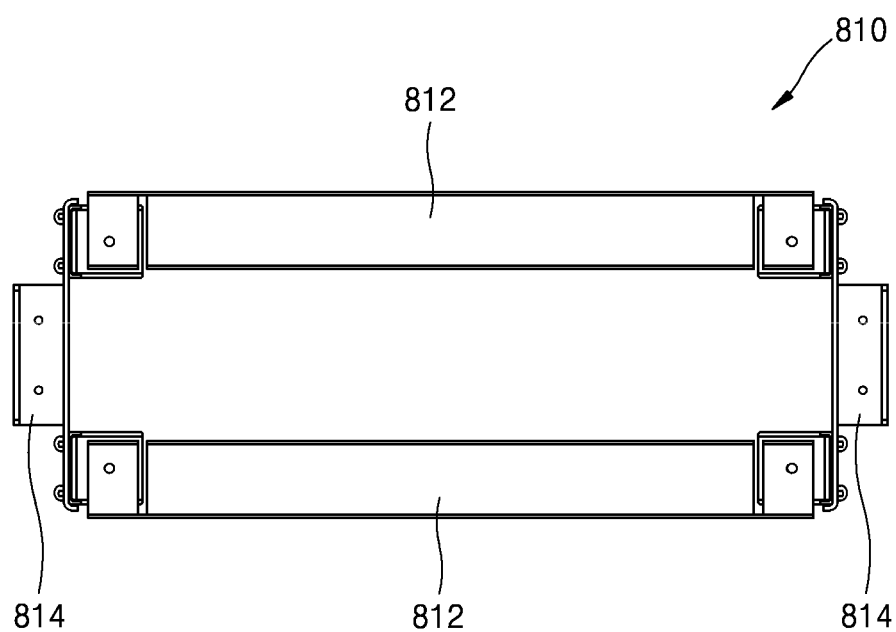
FIG. 24 is a plan view showing coupled rail fixing bracket and frame fixing bracket of a modular rail according to an embodiment of the present disclosure.
Figure 25:
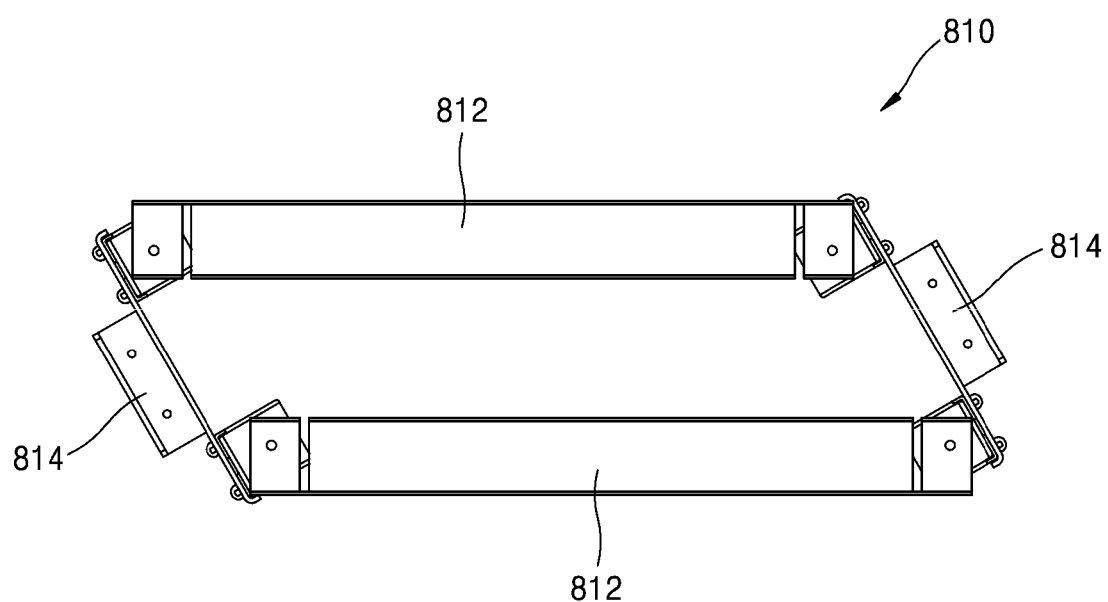
FIG. 25 shows a modular rail changed based on rotation of rail fixing brackets relative to frame fixing brackets according to an embodiment of the present disclosure.

FIG. 24 is a plan view showing coupled rail fixing brackets and frame fixing brackets of a modular rail according to an embodiment of the present disclosure. FIG. 25 shows a modular rail changed based on movement of rail fixing brackets relative to frame fixing brackets according to an embodiment of the present disclosure.

As shown, according to an embodiment of the present disclosure, a bracket 810 of a modular rail may include a rail fixing bracket 812 and a frame fixing bracket 814 coupled using a hinge.

The modular rail 800 includes the rail fixing bracket 812 and the frame fixing bracket 814 coupled using a hinge and the quadrangle shape of the module rail 200 including the rail fixing bracket 812 and the frame fixing bracket 814 may be changed.

As an embodiment of the present disclosure, the pair of rail fixing brackets 812 and the pair of frame fixing brackets 814 may have a rectangular shape.

Ends of each of the pair of rail fixing brackets 812 and each of the pair of frame fixing brackets 814 parallel to each other are coupled to each other using a hinge. The rectangle has vertexs corresponding to hinge coupling portions and sides configured as the rail fixing bracket 812 and the frame fixing bracket 814.

The rail fixing bracket 812 and the frame fixing bracket 814 are rotatable relative to each other about a hinge coupling portion.

Accordingly, the rectangle formed by the pair of rail fixing brackets 812 and the pair of frame fixing brackets 814 may be changed to a parallelogram.

As the shape of the rail fixing bracket 812 and the frame fixing bracket 814 that form the rectangle is changed to the parallelogram, a separation distance between the pair of rail fixing brackets 812 spaced in parallel may be less.

Accordingly, when the shape of the rectangular bracket 810 including the rail fixing brackets 812 and the frame fixing brackets 814 is changed to the parallelogram, a distance between the rail fixing brackets 812 may be reduced.

When the distance between the rail fixing brackets 812 is reduced, the modular rail 800 may be easily inserted into the frame 110. When the modular rail 800 is inserted into the frame 110, the modular rail 800 may be easily disposed in the frame 110.

Figure 26:
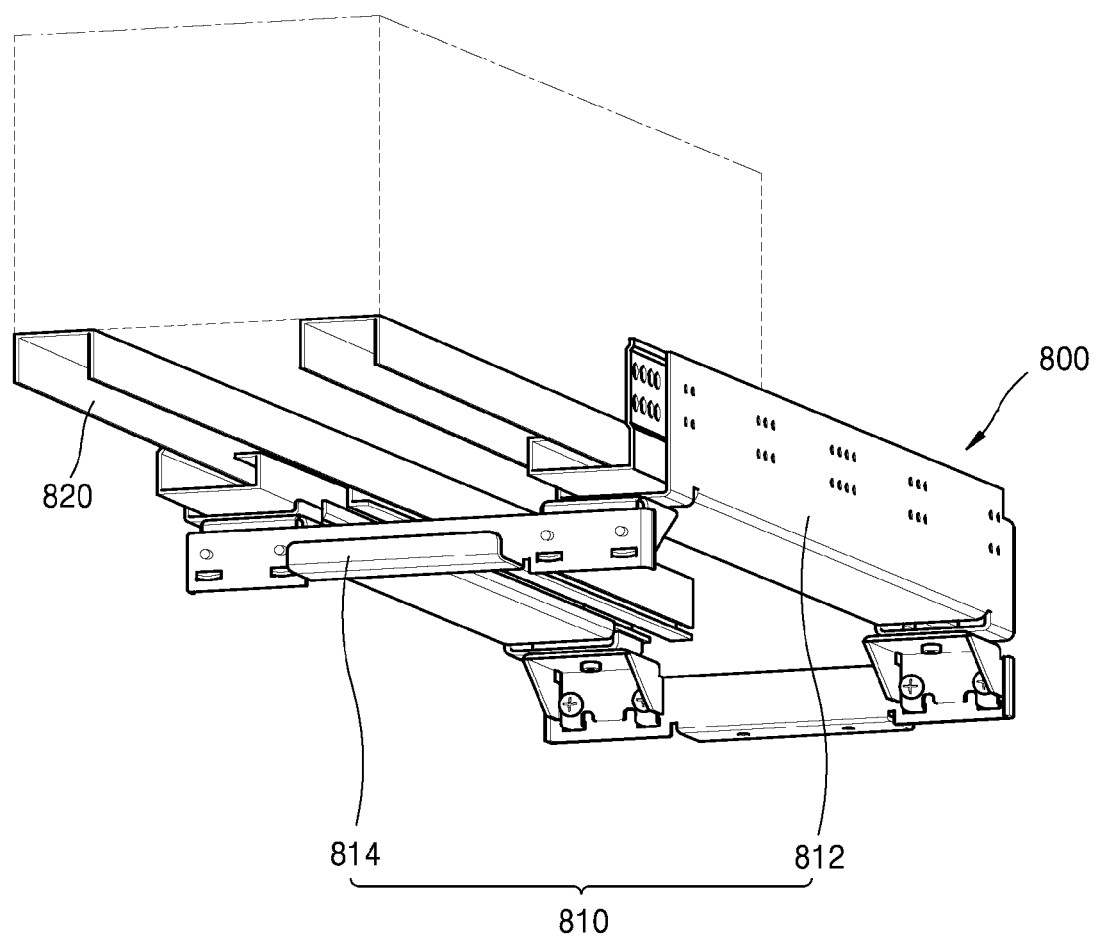
FIG. 26 shows assembled rail set, rail fixing bracket, and frame fixing bracket of a modular rail according to an embodiment of the present disclosure.

FIG. 26 shows assembled rail set, rail fixing bracket, and frame fixing bracket of a modular rail according to an embodiment of the present disclosure.

As shown, according to an embodiment of the present disclosure, in the case of the modular rail 800, a rail set 820 may be disposed on and fixed to a rail fixing bracket 812 and a frame fixing bracket 814 may be disposed under the rail fixing bracket 814.

The drawer coupled to the rail set 820 is slidably moved inward and outward the frame 110 to prevent occurrence of interference between the frame fixing bracket 814 and the drawer.

Figure 27:
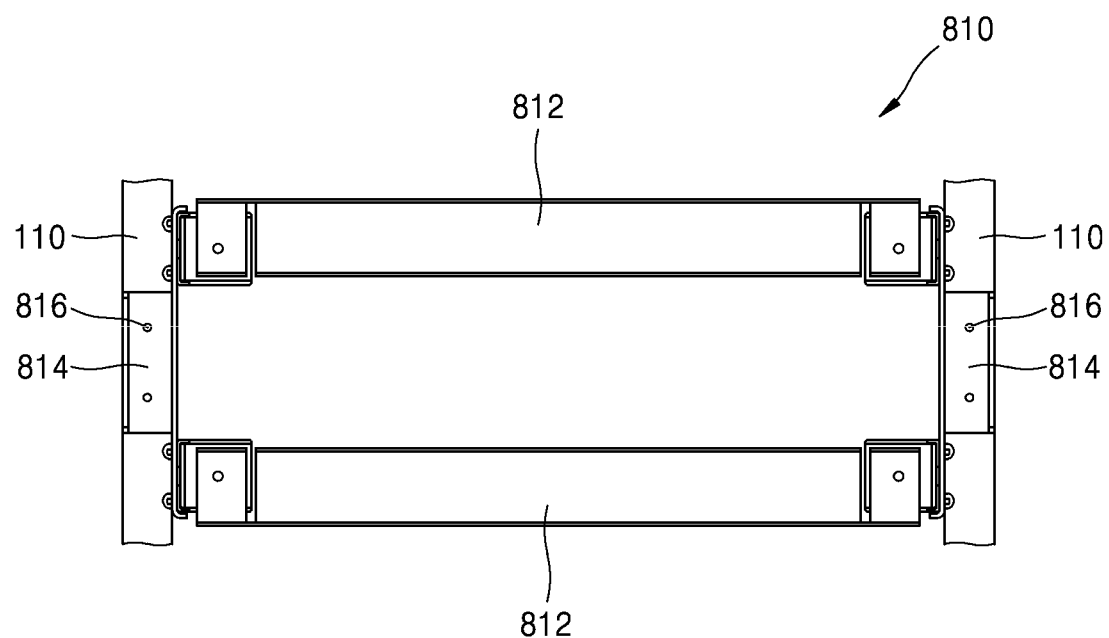
FIG. 27 shows fastening holes defined in a bracket of a modular rail according to an embodiment of the present disclosure.

FIG. 27 shows fastening holes 816 defined in a bracket 810 of a modular rail according to an embodiment of the present disclosure.

As shown, according to an embodiment of the present disclosure, a modular rail 800 includes the bracket 810 that defines the fastening holes 816.

The fastening hole 816 is a hole through which a fastening member such as a bolt may pass to couple the bracket 810 to the frame 100. A fastening hole corresponding to the fastening hole 816 defined in the bracket 810 may also be defined in the frame 110. The fastening member such as the bolt is inserted into the fastening hole 816 defined in each of the bracket 810 and the frame 110 and the bracket 810 is coupled to the frame 110, to install the bracket 810 on the frame 110.

A plurality of fastening holes 816 are preferably defined in each of the bracket 810 and the frame 110. The plurality of fastening holes 816 of the bracket 810 may correspond to the plurality of fastening holes 816 of the frame 110.

When the bracket 810 is stably disposed on the frame 110 without movement, the drawer may slide smoothly and stably when the drawer moves along the rail set 820. To this end, the bracket 810 may be preferably supported on the frame 110 by two or more points and may be stably coupled.

In some cases where the bracket 810 includes the rail fixing brackets 812 and the frame fixing brackets 814, a plurality of fastening holes 816 may be defined in the frame fixing bracket 814. The fastening member such as the bolt may be inserted into the plurality of fastening holes 810 defined in the frame fixing bracket 814 and the fastening hole 816 defined in the frame 110 and they are coupled to each other to dispose the bracket 810 on the frame 110.

Figure 28:
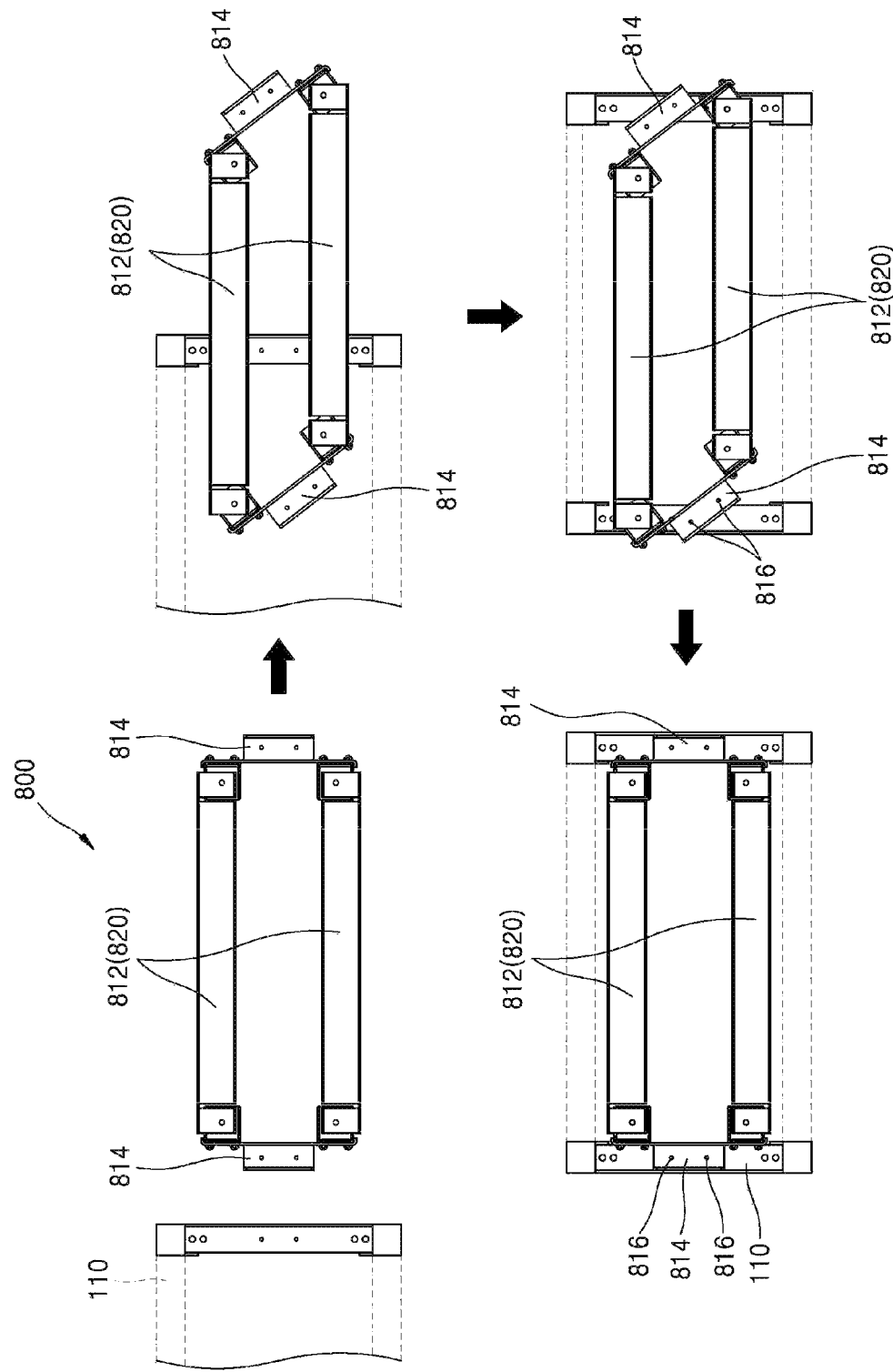
FIG. 28 shows a process in which a modular rail is disposed on a frame according to an embodiment of the present disclosure.

FIG. 28 shows a process in which a modular rail is disposed on a frame according to an embodiment of the present disclosure.

As shown, a modular rail 800 according to an embodiment of the present disclosure may be easily disposed on a frame 110 through the following process.

A rail set 820 is fixed to a bracket 810 having a rectangular shape to provide a modular rail 800. A rail fixing bracket 812 and a frame fixing bracket 814 of the bracket 810 are coupled to each other using a hinge to change the rectangular shape of the modular rail 800 to a parallelogram.

When the shape of the modular rail 800 is changed to the parallelogram, as a separation distance between a pair of rail fixing brackets 812 spaced in parallel decreases, the modular rail 800 is easily inserted into the installing frame 110.

When the modular rail 800 is inserted into the frame 110, the modular rail 800 is coupled to the frame 110 by corresponding a fastening hole 816 defined in the bracket 810 to a fastening hole defined in the frame 110.

The shape of the modular rail 800 is changed from the parallelogram shape back to the rectangle and the bracket 810 is coupled to the frame 110 through the remaining fastening holes 816 to dispose the bracket 810 on the frame 110.

Figure 29:
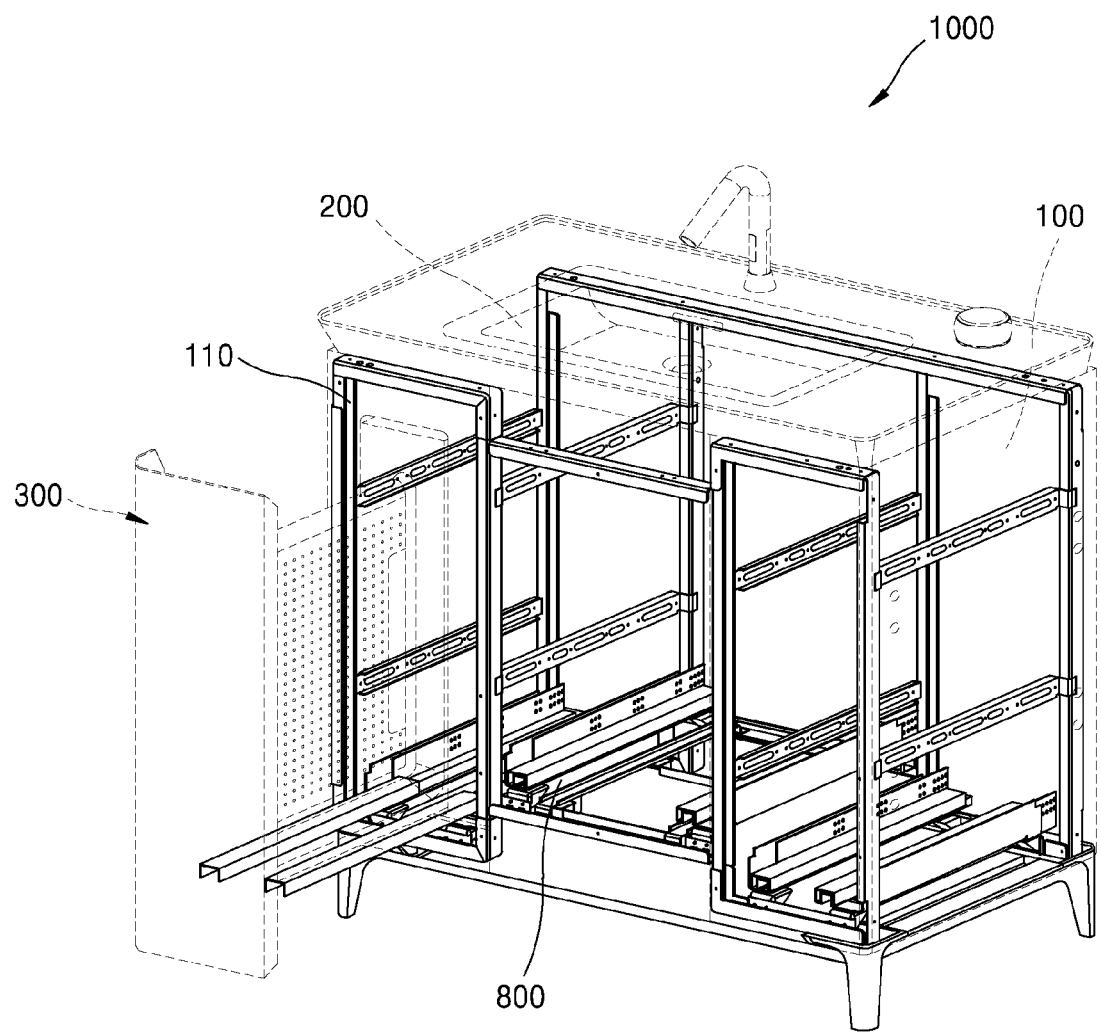
FIG. 29 shows a pulled-out drawer type towel management unit of a bathroom facility device including a modular rail according to an embodiment of the present disclosure.

FIG. 29 shows a pulled-out drawer type towel management unit including a modular rail of a bathroom facility device according to an embodiment of the present disclosure.

As shown, according to an embodiment of the present disclosure, the bathroom facility device is a sink cabinet apparatus and the sink cabinet apparatus includes a sink cabinet body 100, a wash basin 200 disposed on the top of the sink cabinet body 100, a drawer type towel management unit 300 retracted in and pulled out from the sink cabinet body 100, and a frame 100 that supports the sink cabinet apparatus 100.

The drawer type towel management unit 300 is coupled to a pair of rail sets 820, may slide, and the pair of rail sets 820 is fixed to a bracket 810. The bracket 810 is disposed in the frame 110 to support the drawer type towel management unit when sliding in the frame 110.

The sink cabinet apparatus is disposed on the floor of a bathroom space and is integrated with the wash basin 200 including a faucet.

In addition, the sink cabinet apparatus includes a cabinet body 100, a wash basin 200, and a drawer type towel management unit 300. In addition, the sink cabinet apparatus may further include a device such as a drawer type console.

The wash basin 200 includes a body of the wash basin 200, the faucet, and a pop-up valve disposed at the bottom of the body of the wash basin 200. The body of the wash basin 200 made of a light-transmitting material may further include a lamp below the body of the wash basin 200. The faucet of the wash basin 200 is connected to a water supply pipe and the pop-up valve is connected to a water discharge pipe.

The faucet of the wash basin 200 is connected to a water supply pipe and the water supply pipe may include a cold water pipe and a hot water pipe. A temperature of the discharged water may be adjusted based on operation of the valve. In addition, a heater may be built in the faucet to adjust the temperature of supplied water at the beginning of water supply.

An electronic valve of the faucet may be provided to manipulate the temperature of the water and an amount of water discharged through the faucet, which may be performed by an integrated operation switch.

Meanwhile, in the shown embodiment, the drawer type towel management unit 300 may be disposed on the left side of the sink cabinet apparatus but the arrangement position may be changed. In some cases where the sink cabinet apparatus has a greater lateral length, a plurality of drawer type towel management units 300 may be disposed and a drawer that only defines an accommodation space may be further included.

A sink cabinet apparatus including a drawer having a watertight structure according to an embodiment of the present disclosure is described below.

Figure 30:
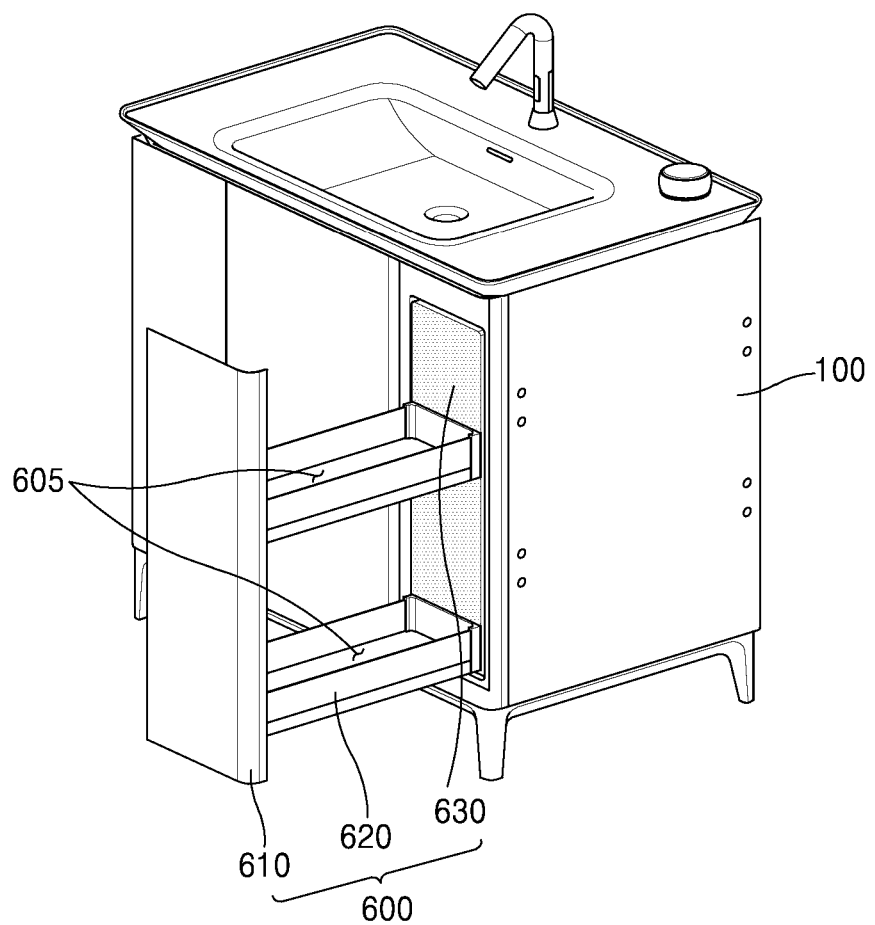
FIG. 30 is a perspective view showing a sink cabinet apparatus having a watertight structure of a drawer according to an embodiment of the present disclosure.

FIG. 30 is a perspective view showing a sink cabinet apparatus including a drawer having a watertight structure according to an embodiment of the present disclosure.

As shown, according to an embodiment of the present disclosure, a sink cabinet apparatus including the drawer having the watertight structure includes a cabinet body 100, a drawer 600, and a rail set 820.

The cabinet body 100 defines appearance of the sink cabinet apparatus and defines a drawer space 602 in which a drawer 600 may be retracted in and pulled out.

The cabinet body 100 may include the upper wall, the left wall, the right wall, and the rear wall. The walls prevent exposure of an inside of the cabinet and prevent foreign objects such as dust from entering inside.

As the lower portion is close to the floor and is not well exposed to the outside, the wall may not be disposed in the lower portion, but the wall may be disposed at the lower portion to prevent the foreign objects entering from downward.

Objects may be directly accommodated in the drawer space 602 and the objects may be accommodated using the drawer 600 retracted into or pulled out from the drawer space 602 for convenience of use.

When the object is accommodated using the drawer 600, friction may occur at a contact surface of the drawer 600 and the cabinet as the drawer 600 is retracted in or pulled out from the drawer space 602.

When the rail set 820 is disposed between the drawer 600 and the cabinet, the drawer 600 may slide to reduce the friction occurring between the drawer 600 and the cabinet.

Therefore, the rail set 820 is preferably disposed between the drawer 600 and the cabinet to facilitate the retraction into and the pulling out from the drawer 600.

The rail set 820 includes a drawer fixing rail disposed on the drawer 600 and a cabinet fixing rail disposed on the drawer space 602.

The drawer fixing rail may be disposed under the drawer 600 to support, by the drawer fixing rail, the drawer 600 under the drawer 600.

The drawer fixing rail may be disposed at both sides of the drawer 600 under the drawer 600 and may be preferably disposed under the drawer 600 to prevent visual exposure of the drawer type fixing rail to the user.

The drawer fixing rail and the cabinet fixing rail are coupled and the drawer fixing rail and the cabinet fixing rail slide relative to each other within a limited displacement to thereby change a length of the rail set 820.

The drawer 600 disposed on the drawer fixing rail may slide into and be retracted into and pulled out from the drawer space 602.

The drawer 600 includes a front plate 610, a lower supporter 620, and a rear plate 630 (A direction of pulling out the drawer may be referred to as "a forward direction" and a direction of retracting the drawer may be referred to as "a rearward direction").

The drawer space 602 is closed by the wall of the cabinet body 100 and may define an opening at a front surface to accommodate objects or retract and pull out the drawer 600.

The front plate 610 may block the opening of the drawer space 602 and may close the drawer space 602. The front plate 610 is disposed on a front surface of the drawer 600 and an area thereof is preferably greater than or same as an area of the opening of the accommodation space 602.

When the drawer 600 is not in use, the front plate 610 closes the opening of the drawer space 602 to prevent foreign objects such as dust from entering the drawer space 602 and movement of the products accommodated in the drawer space 602 to outside. The front plate 610 closes the inside of the drawer space 602 to improve appearance quality.

The lower supporter 620 may fix and support the front plate 610 and the rear plate 630 and a drawer fixing rail may be disposed. The lower supporter 620 may also define the accommodation space 605 to accommodate the objects.

As shown, the drawer 600 may define a plurality of accommodation spaces 605 as well as the accommodation space defined on the lower supporter 620 according to the size. The plurality of accommodation spaces 605 disposed along the vertical direction may stably fix and support the front plate 610 and the rear plate 630.

In addition, as shown, when the rear plate 630 is disposed, the rail set 820 and the rear plate may support the rear side of the drawer when the drawer 600 is completely pulled out, to further retract the drawer 600 forward.

When the drawer 600 is further pulled out forward, the rear portion of the accommodation space 605 may be exposed to outside to conveniently accommodate objects or taken the objects out of the accommodation space 605.

The rear plate 630 may form a rear portion of the drawer 600. The rear plate may preferably has a shape corresponding to that of the wall disposed at a rear side and the rear plate 630 contacts the wall disposed at the rear portion of the cabinet when the drawer 600 is retracted.

Figure 31:
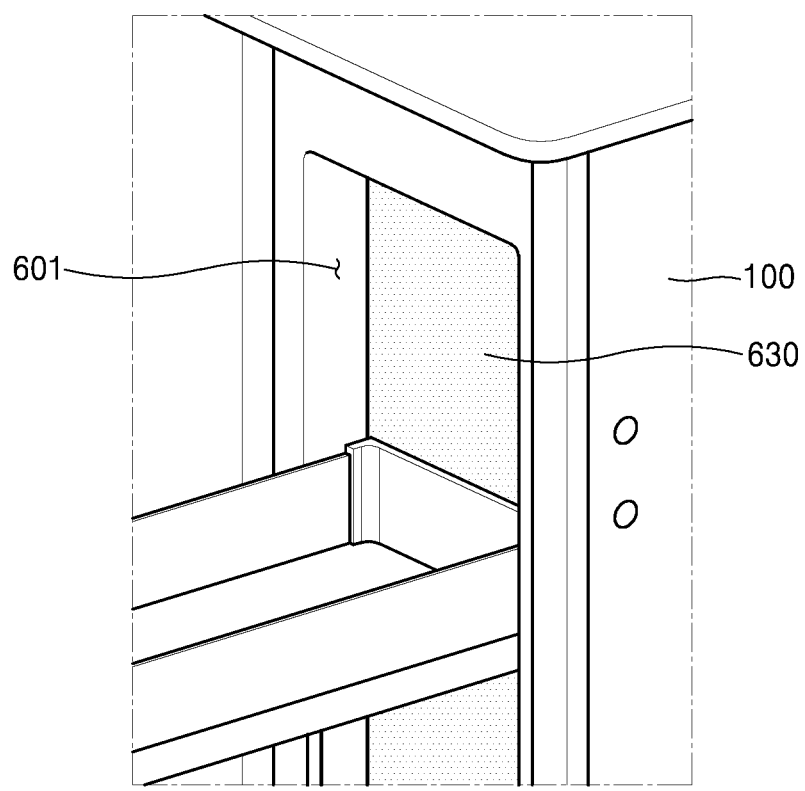
FIG. 31 shows an opening of a drawer space opened as a drawer is pulled out.
Figure 32:
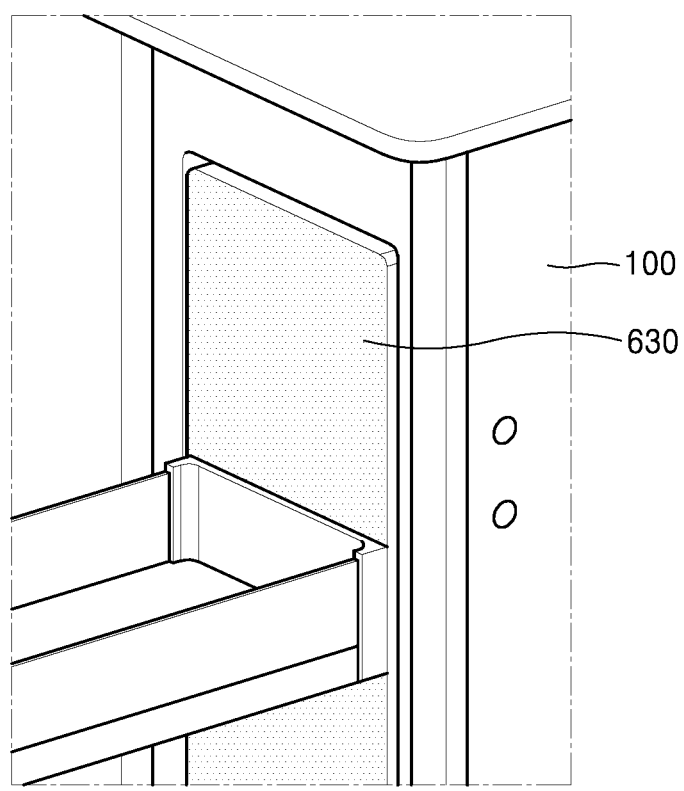
FIG. 32 shows an opening of a drawer space blocked by a rear plate.

FIG. 31 shows an opening of a drawer space opened when a drawer is pulled out and FIG. 32 shows an opening of a drawer space blocked by a rear plate.

When a drawer 600 is pulled out from a drawer space 602, an opening of a drawer space 602 is spaced apart from a front plate 610 and the drawer 600 is exposed to outside to open the opening of the drawer space 602.

When the opening of the drawer space 602 is opened, foreign objects such as dust may be introduced into the drawer space 602. In addition, the objects accommodated in the drawer 600 may be moved to a rear portion of the drawer 600 and may enter the drawer space 602 from which the drawer 600 is retracted.

When the drawer 600 is difficult to be separated from the cabinet, it may be difficult to remove objects introduced into the drawer space 602 from which the drawer 600 is pulled out.

A sensitive device may also be mounted inside the cabinet.

Therefore, the products or the foreign objects may be preferably prevented in advance from being introduced into the drawer space 602.

In some cases where the drawer 600 includes the rear plate 630 at the rear portion, the rear plate 630 closes the opening of the drawer space 602 to prevent introduction of the products or the foreign objects into the drawer space 602 when the drawer 600 is pulled out.

In addition, when the drawer 600 is pulled out, the rear plate 630 disposed at the rear portion of the drawer 600 may cover the inside of the drawer space 602 where wires or components are disposed, thereby improving the appearance quality.

As shown, according to an embodiment of the present disclosure, when the drawer 600 is pulled out from the drawer space 602, an upper surface, a left surface, and a right surface of the rear plate 630 contact those of the opening of the drawer space 602 and the rear plate 630 may be inserted into the opening of the drawer space 602.

When the rear plate 630 is inserted into the opening of the drawer space 602, the opening of the drawer space 602 is blocked, thereby preventing foreign objects from being introduced into the drawer space 602 and closing the inside of the drawer 600.

Meanwhile, the rail is disposed under the drawer 600 and is close to the floor, there is relatively less concern about foreign objects entering the lower portion of the opening of the drawer space 602 compared to other portions.

In consideration of the above, when the opening of the drawer space 602 is blocked by the rear plate 630, the rear plate 630 may not contact the lower surface of the opening of the drawer space 602.

Figure 33:
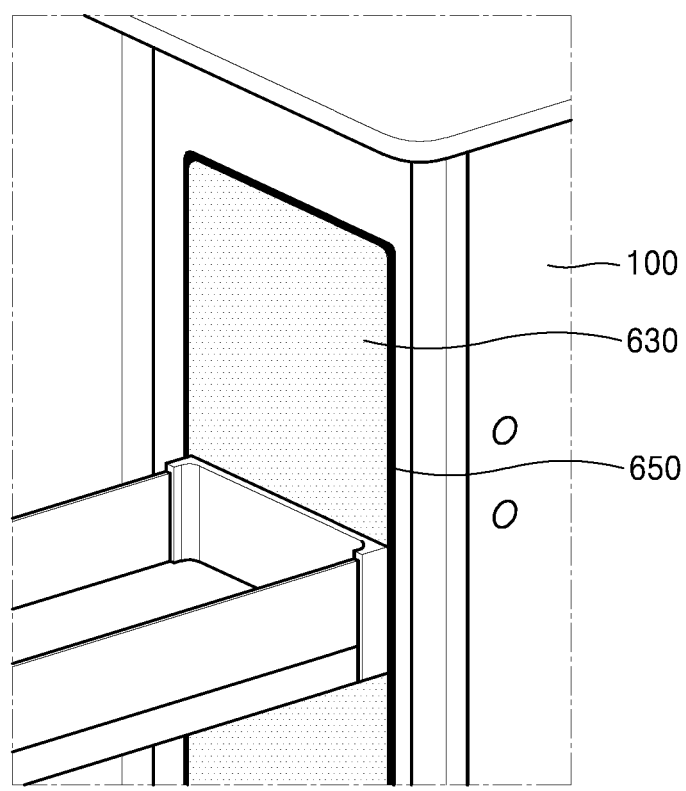
FIG. 33 shows a packing member disposed between a rear plate and an opening of a drawer space to improve water tightness.

FIG. 33 shows a packing member disposed between a rear plate and an opening of a drawer space to improve water tightness.

A drawer 600 may accommodate a variety of products and the accommodated products may vary depending on where the cabinet is disposed.

In particular, in the case of a cabinet disposed in a bathroom, electronic products such as dryers, curling irons, and electric shavers may be accommodated in the drawer 600. Electric devices may also be disposed inside the cabinet.

The bathroom is a space where water is used, and when the water is introduced into the cabinet, there is a fear that electronic products accommodated in the drawer 600 or electric devices mounted in the drawer 600 may be damaged.

Therefore, it is preferable to prevent water from entering the cabinet when the drawer 600 is opened as well as when the drawer 600 is closed.

As shown, according to an embodiment of the present disclosure, the cabinet may include a packing member at the opening of the drawer space 602 to prevent the inflow of liquid between the side of the rear plate 630 and the inner side of the opening of the drawer space 602 when the drawer 600 is pulled out from the cabinet.

The packing member may be disposed on the front plate 610 or the rear plate 630 and the packing member disposed at the opening may prevent the inflow of the liquid when the drawer 600 is pulled out and retracted.

Figure 34:
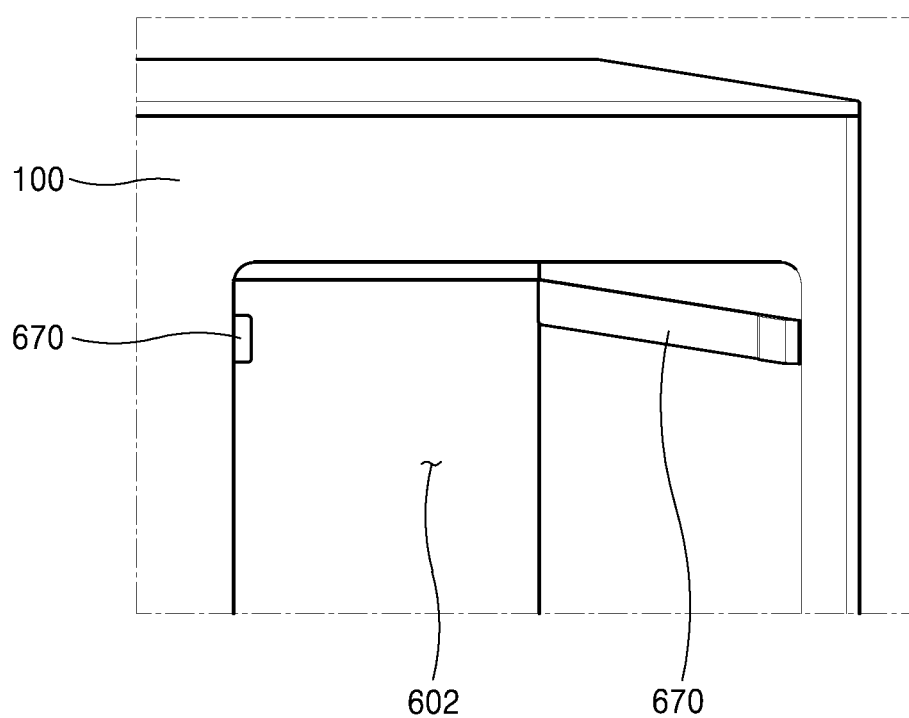
FIG. 34 shows a cabinet in which movement prevention guides are disposed.
Figure 35:
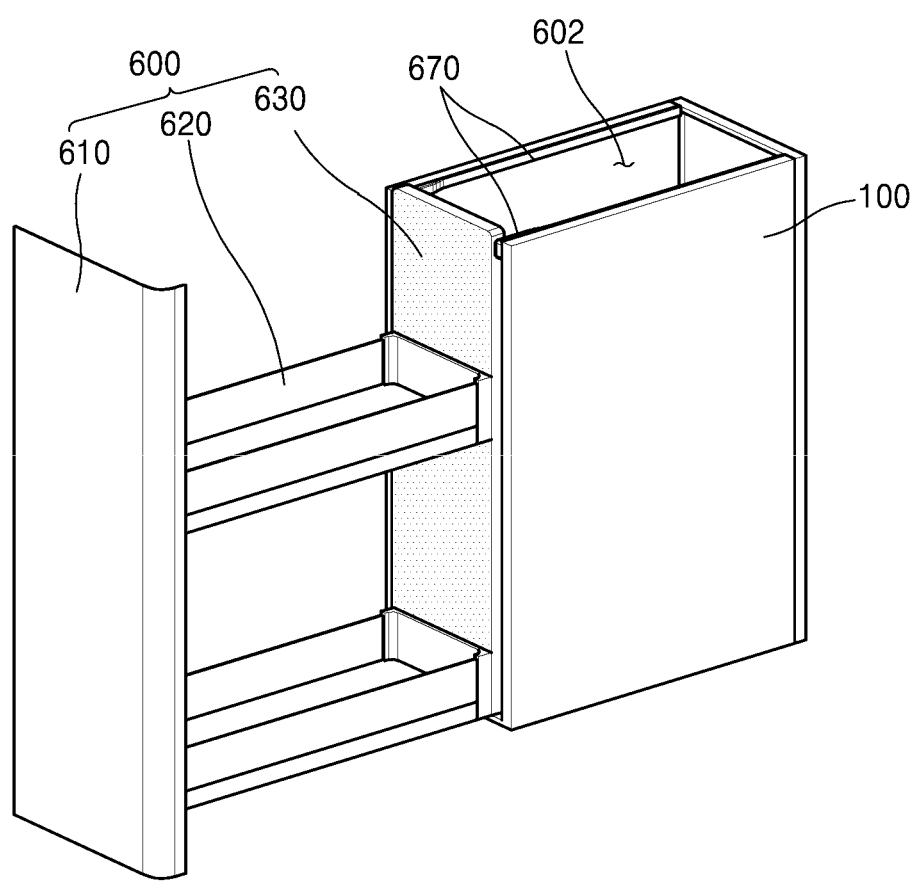
FIG. 35 shows a drawer supported by movement prevention guides.

FIG. 34 shows a cabinet including movement prevention guides according to an embodiment of the present disclosure and FIG. 35 shows a drawer supported by movement prevention guides.

A drawer 600 in which objects are accommodated is generally retracted into the cabinet and may be pulled out from the cabinet as necessary.

When the drawer 600 is retracted in or pulled out from the cabinet, a rail set 820 is disposed between the drawer 600 and the cabinet to reduce friction occurring on a contact surface between the drawer 600 and the cabinet.

A pair of rail sets 820 is disposed between the drawer 600 and the cabinet and stably supports both sides of the drawer 600 under the drawer 600 to prevent lateral swing of the drawer 600.

When the rail set 820 is only disposed under the drawer 600 having a vertical height greater than a lateral width, the lower portion of the drawer 600 is fixed, but the upper portion of the drawer 600 is not fixed.

As the upper portion of the drawer 600 is not fixed, a moment may be applied to the upper portion of the drawer 600 disposed away from the fixed portion of the drawer 600 in the process of retracting and pulling out the drawer 600.

When the drawer 600 is retracted in or pulled out, the moment is applied to the upper portion of the drawer 600 and the drawer 600 is swung laterally, thereby damaging the rail set 820 or damaging the friction portion between the drawer 600 and the cabinet.

A rail may be additionally disposed at an upper portion spaced apart from a rail disposed below the drawer 600 by a predetermined distance to support the swinging drawer 600.

A distance between the rail set 820 disposed at the lower portion and the rail set 820 disposed at the upper portion is preferably configured to prevent lateral swing of the drawer 600 and the friction occurring between the drawer 600 and the cabinet.

When the rails are disposed at the upper portion and the lower portion, the rail that withstands the main load is the rail disposed at the lower portion. In addition, the cost of manufacturing of the cabinet may be increased and the drawer 600 may be difficult to be disposed in and removed from the cabinet due to a large number of disposed rails.

As shown, according to the embodiment of the present disclosure, the cabinet may include a pair of movement prevention guides 670 disposed at both sides of the drawer space 602 and disposed at a deeper position.

A depth direction of the drawer space 602 refers to a direction from the opening of the drawer space 602 on the front side of the cabinet toward the rear wall.

The movement prevention guide 670 is disposed at an upper portion and may support the side of the drawer 600 to prevent the longitudinal drawer 600 from being laterally swung as the drawer 600 is retracted in or pulled out from the drawer space 602.

The movement prevention guide 670 is disposed in place of the rail disposed on the upper portion and the guide may be cheaper than the rail.

In addition, as the movement prevention guide 670 does not need to be additionally disposed in the drawer 600, the drawer 600 may be conveniently disposed in or removed from the cabinet.

The movement prevention guide 670 is preferably made of a material having excellent wear resistance and low friction to support the side of the drawer 600 retracted in or pulled out from the drawer space 602. For example, the movement prevention guide 670 may be made of poly oxy methylene (POM).

Figure 36:
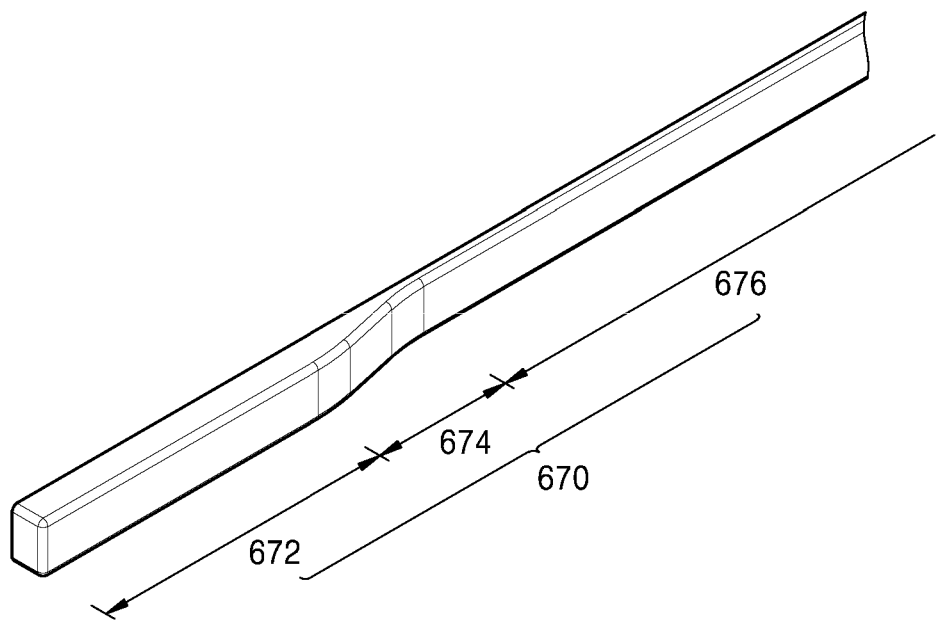
FIG. 36 shows a movement prevention guide.
Figure 37:
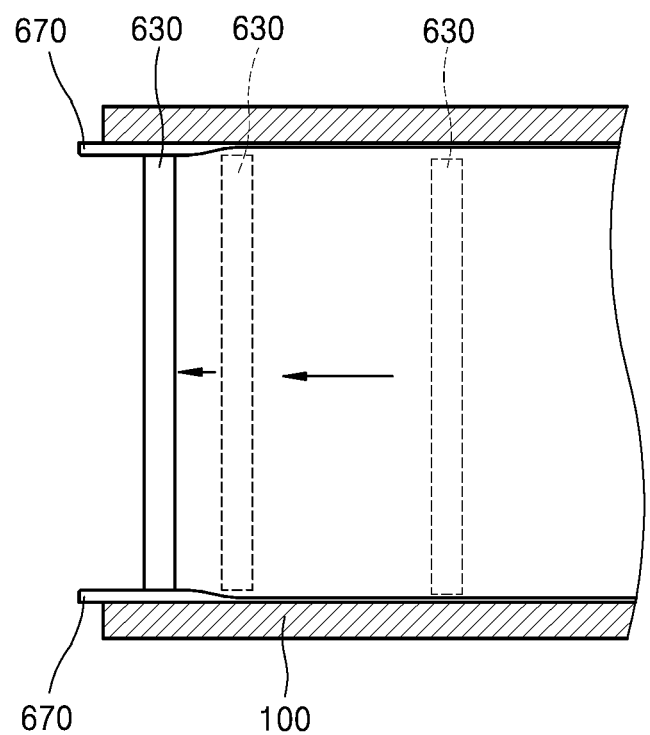
FIG. 37 is a top view showing movement prevention guides disposed at sides of a drawer space.

FIG. 36 shows a movement prevention guide according to an embodiment of the present disclosure and FIG. 37 shows a top surface of a disposed movement prevention guide according to an embodiment of the present disclosure.

While a drawer 600 is pulled out from a drawer space 602, a rear plate 630 slides without great friction, and when the drawer 600 is completely pulled out, the rear plate 630 is preferably fixed to prevent retraction of the drawer 600 into the drawer space 602 by its own weight.

Therefore, the movement prevention guide 670 may have different shapes in a section in which the rear panel 630 slides and a section in which the rear panel 630 is fixed.

For example, a gap is preferably defined between the rear plate 630 and the movement prevention guide 670 in the section where the rear plate 630 may slide. For example, the rear plate 630 is not spaced apart from and contacts the movement prevention guide 670 in the section in which the rear plate 630 may be fixed.

The rear plate 630 may slide with less friction with the movement prevention guide 670 at the portion where a gap is defined between the rear plate 630 and the movement prevention guide 670 and the rear plate 630 may be fixed at the portion in which the rear plate 630 contacts the movement prevention guide 670.

As shown, according to an embodiment of the present disclosure, the movement prevention guide 670 includes a stop member 672, a transition member 674, and a move member 676 along a depth direction and a separation distance between the stop members 672 defined by a pair of movement prevention guides 670 may be less than a separation distance between the move members 676.

Meanwhile, as a protruding distance of the stop member 672 is different from a protruding distance of the move member 676 in the drawer space 602, the rear plate 630 slides in the move member 676 and may be engaged with a border between the move member 676 and the stop member 672.

Therefore, as shown, the separation distance between the transition members 674 defined by the pair of movement prevention guides 670 is preferably increased toward a deeper side.

The transition member 674 is disposed between the stop member 672 and the move member 676 and the rear plate 630 that slides in the move member 676 is smoothly moved to the stop member 672 through the transition member 674.

Figure 38:
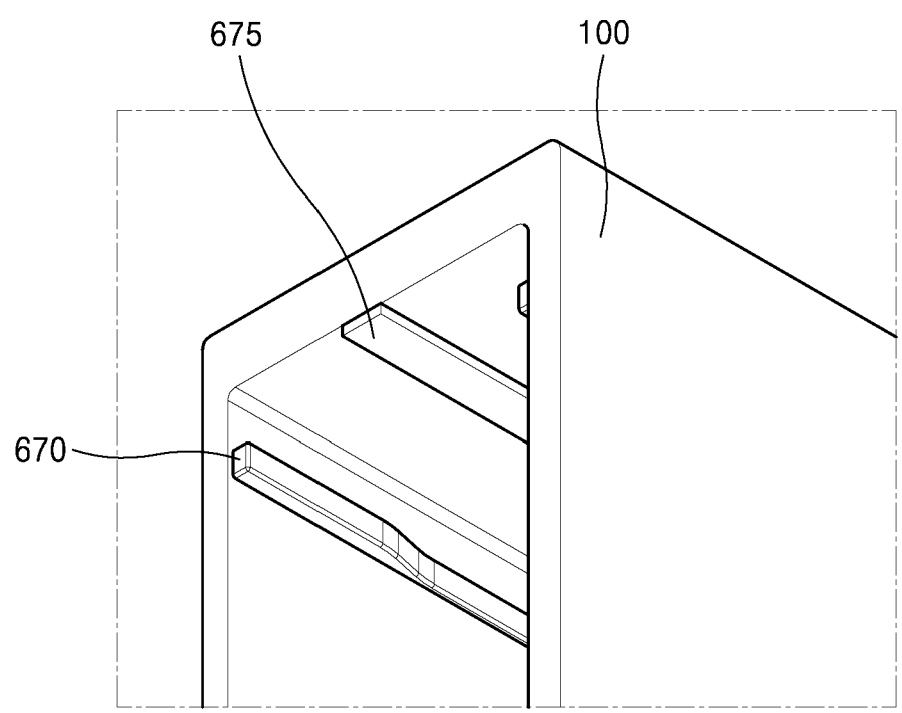
FIG. 38 shows a holding guide disposed at an upper portion of a drawer space.
Figure 39:
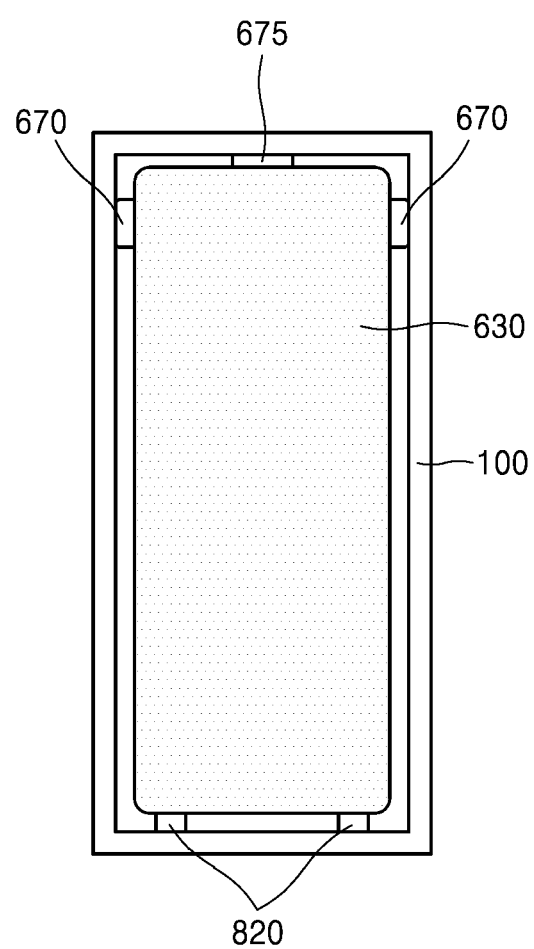
FIG. 39 shows a drawer supported by movement prevention guides and a holding guide.

FIG. 38 shows a holding guide disposed at an upper portion of a drawer space and FIG. 39 shows a drawer supported by movement prevention guides and a holding guide.

As a drawer 600 is pulled out by the weight of the drawer 600, a magnitude of downward moment applied to a front surface of the drawer 600 is increased. When the magnitude of downward moment applied to the front surface of the drawer 600 is increased, friction may be generated between the rear plate 630 and the upper portion of the drawer space 602.

The drawer 600 may be prevented from being retracted in and pulled out and may be damaged due to the friction generated between the rear plate 630 and the upper portion of the drawer space 602.

Therefore, when the drawer 600 fixed to the rail disposed below the drawer 600 and the movement prevention guides 670 that support the left side and the right side is pulled out, the upper portion of the rear plate 630 may be preferably supported.

As shown, according to an embodiment of the present disclosure, the cabinet device preferably further includes a holding guide 675 disposed at the upper portion of the drawer space 602 to support the upper surface of the rear plate 630 and disposed at a deeper position.

The holding guide 675 is preferably made of a material having excellent abrasion resistance and less friction to support only the upper end of the rear plate 630 of the drawer 600 retracted in or pulled out from the drawer space 602.

A sink cabinet apparatus having improved space efficiency according to an embodiment of the present disclosure is described below.

Figure 40:
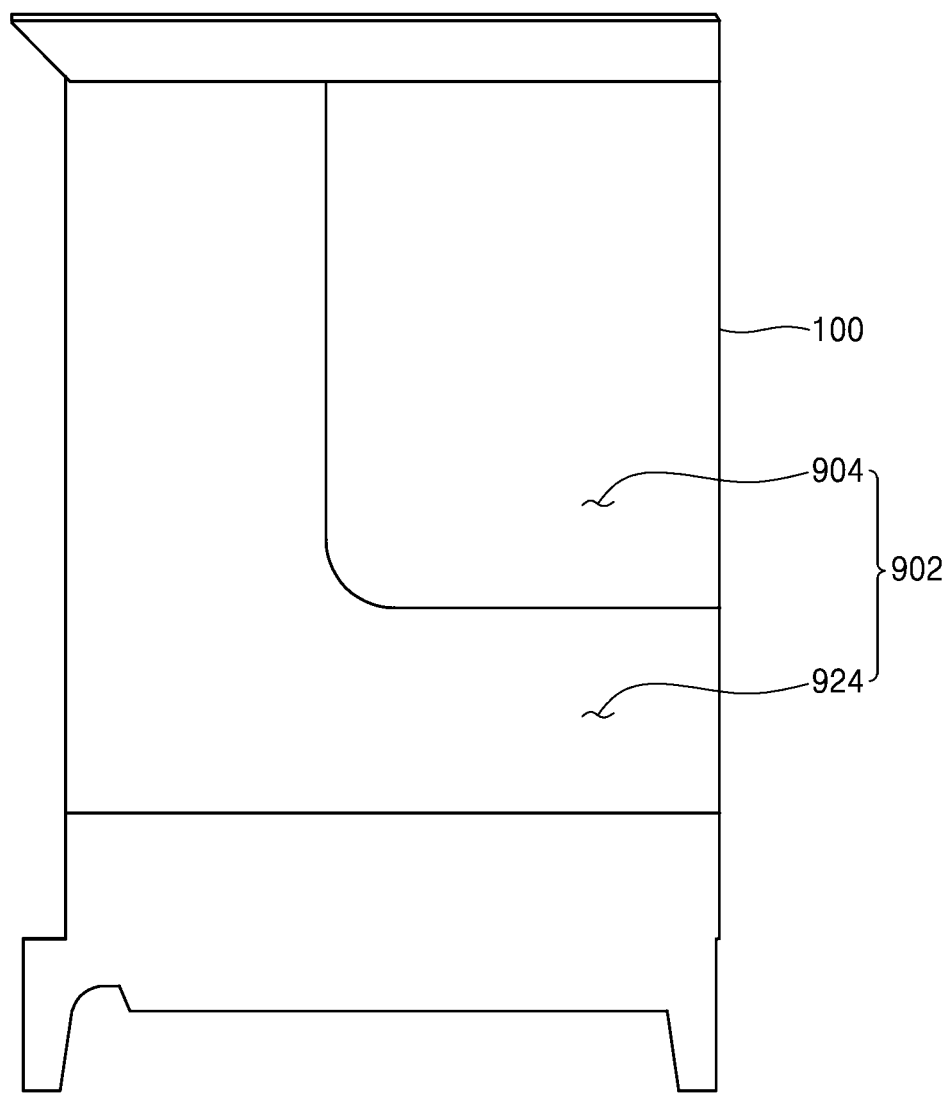
FIG. 40 shows a side cross-section of an inside of a cabinet in which a dead zone is disposed according to an embodiment of the present disclosure.
Figure 41:
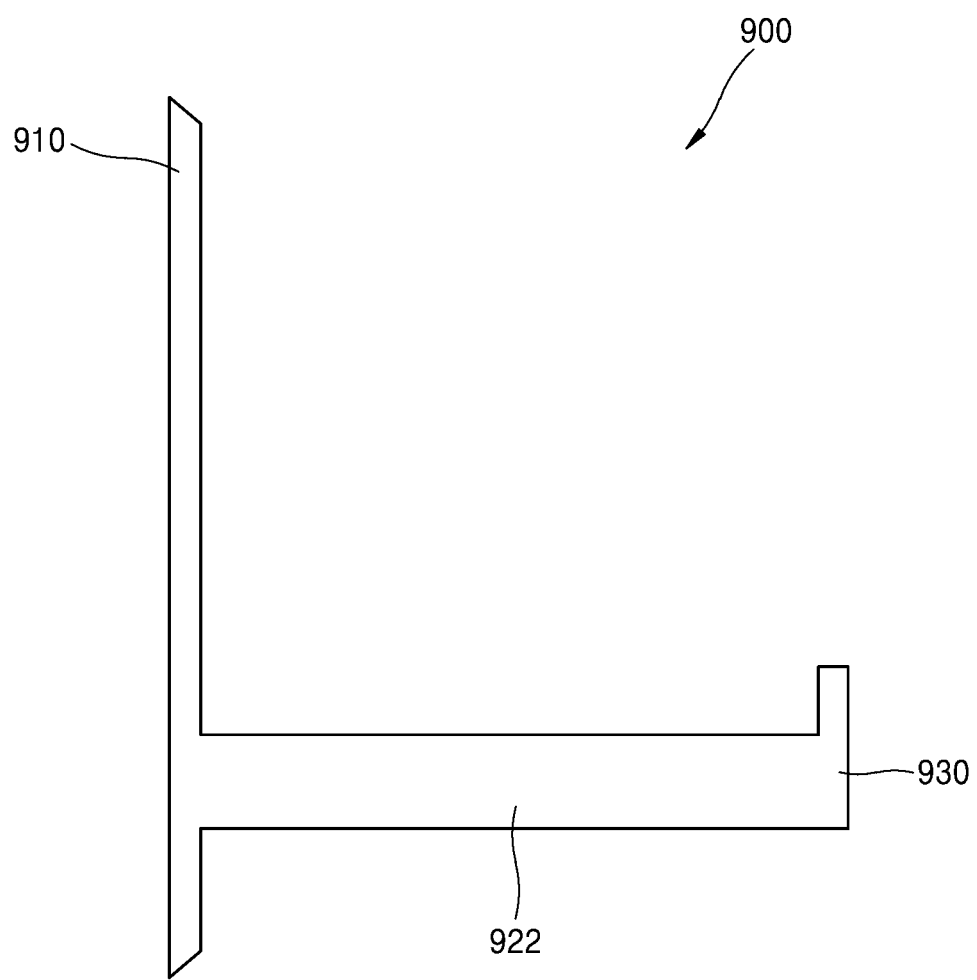
FIG. 41 shows a drawer according to an embodiment of the present disclosure.
Figure 42:
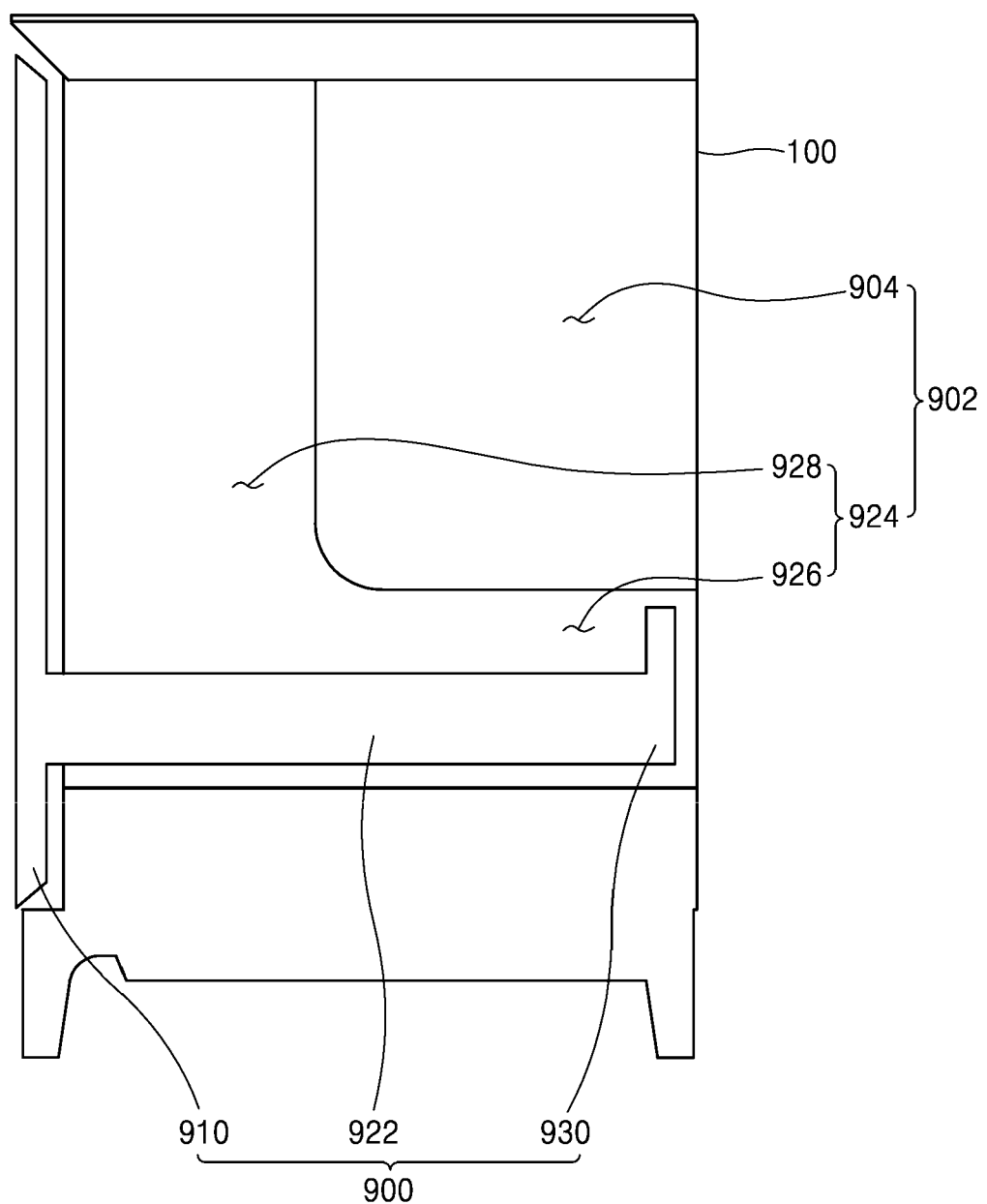
FIG. 42 shows a drawer in FIG. 41 retracted into the cabinet in FIG. 40.

FIG. 40 shows a side cross-section of an inside of a cabinet in which a dead zone is disposed according to an embodiment of the present disclosure. FIG. 41 shows a drawer according to an embodiment of the present disclosure. FIG. 42 shows the drawer in FIG. 41 retracted into the cabinet in FIG. 40.

According to an embodiment of the present disclosure, a sink cabinet apparatus includes a cabinet body 100 that defines an accommodation space 902 and a drawer 900 that may be retracted in or pulled out from the accommodation space 902.

Products may be accommodated and stored in the accommodation space 902 and the accommodation space 902 may be disposed inside the cabinet body 100 that defines appearance of the cabinet.

The cabinet body 100 may include the upper wall, the left wall, the right wall, and the rear wall. The walls may prevent the inside of the cabinet from being exposed and prevent foreign objects such as dust from entering the accommodation space 902.

As the lower portion of the cabinet is close to the floor and is not well exposed to the outside, the wall may not be disposed at the lower portion. The wall may also be disposed at the lower portion to prevent the foreign objects such as the dust entering from downward.

The accommodation space 902 may be closed by the wall of the cabinet body 100 and may define an opening at a front surface to retract and pull out the accommodated objects or the drawer 900.

The products may be directly accommodated in the accommodation space 902 and may be preferably accommodated using a drawer 900 retracted into and pulled out from the accommodation space 902 for convenience of use.

When the objects are accommodated using the drawer 900, friction may occur on a contact surface between the drawer 900 and the cabinet as the drawer 900 is retracted in or pulled out from the accommodation space 902.

When the rail set is disposed between the drawer 900 and the cabinet, the drawer 900 may slide along the rail, thereby reducing the friction occurring between the drawer 900 and the cabinet.

Therefore, the rail set is preferably disposed between the drawer 900 and the cabinet to facilitate the retraction of and the pulling out of the drawer 900.

The drawer 900 includes a front plate 910, an accommodator 922, and a rear plate 930 and the accommodator 922 may define an accommodation space 924 to accommodate the objects.

The accommodator 922 may be disposed at a lower portion of the drawer 900 and may support the drawer 900, and may fix the front plate 910 and the rear plate 930. The rail set may be disposed under the accommodator 922 that supports the drawer 900.

The accommodator 922 preferably includes the lower wall, the left wall, and the right wall to support the objects accommodated in the accommodation space 924 and to prevent falling to the left side and the right side.

The front plate 910 may close the opening of the accommodation space 902 to close the accommodation space 902. The front plate 910 is disposed on a front surface of the drawer 900 and an area thereof is preferably equal to or greater than that of the opening of the accommodation space 902.

When the drawer 900 is not used, the front plate 910 may close the opening of the accommodation space 902 to prevent the foreign objects such as the dust from entering the accommodation space 902 and to prevent the objects accommodated in the accommodation space 924 falling to an outside of the accommodation space 902.

The front plate 901 also prevents exposure of the inside of the accommodation space 902 to improve appearance quality.

The rear plate 930 may form a rear portion of the drawer 900. When the drawer 900 is retracted, the rear plate preferably has a shape corresponding to that of the wall formed at the rear such that the rear plate 930 may contact the wall disposed at the rear portion of the cabinet.

Meanwhile, the sink cabinet apparatus of the present disclosure is seated on the floor. A height from the floor surface to the top of the cabinet is not greater. Therefore, the upper portion of the sink cabinet apparatus may be used in various ways.

For example, it may be used as a space where electronic devices or wash basin may be built in or various types of objects including electronic devices may be mounted.

Electronic devices disposed or embedded in the cabinet at the upper portion, mechanical devices including objects such as wash basins, electric portions, or pipes may be disposed in the accommodation space 902 in the cabinet to use the upper portion of the cabinet.

The space in which the pipe, the machinery, or the electric portions are disposed in the accommodation space 902 defines a dead zone 904 in which objects may not be accommodated or the drawer 900 may not be disposed.

As shown, according to the embodiment of the present disclosure, the dead zone 904 may be disposed at an upper rear portion of the accommodation space 902 inside the cabinet.

The dead zone 904 is preferably disposed at the upper rear portion of the accommodation space 902 in consideration of a distance from an object embedded at or supported on the upper portion of the cabinet or utilization of the accommodation space 902.

When the drawer 900 is retracted into and pulled out from the accommodation space 902 in which the dead zone 904 is disposed, interference may occur between the rear plate 930 and the dead zone 904.

If the interference does not occur between the rear plate 930 and the dead zone 904, the drawer 900 may be retracted to the rear wall of the accommodation space 902, thereby improving the utilization of the accommodation space 902.

Therefore, an upper end of the rear plate 930 is preferably disposed lower than a lower surface of the dead zone 904 to prevent the interference with the dead zone 904 when the drawer 900 is retracted and pulled out.

When the drawer 900 is retracted into the accommodation space 902 in which the dead zone 904 is disposed, the accommodation space 924 of the drawer 900 may include a first accommodation space 926 disposed below the dead zone 904, a dead zone 904, and a second accommodation space 928 disposed in front of the first accommodation space 926.

That is, as shown, according to an embodiment of the present disclosure, a side cross-section of the accommodation space 902 may be determined as the dead zone 904, the first accommodation space 926, and the second accommodation space 928.

A height of the first accommodation space 926 may be different from a height of the second accommodation space 928 depending on an area of the dead zone 904. Accordingly, objects accommodated in the first accommodation space 926 may be different from objects accommodated in the second accommodation space 928 and the objects may be accommodated differently.

Figure 43:
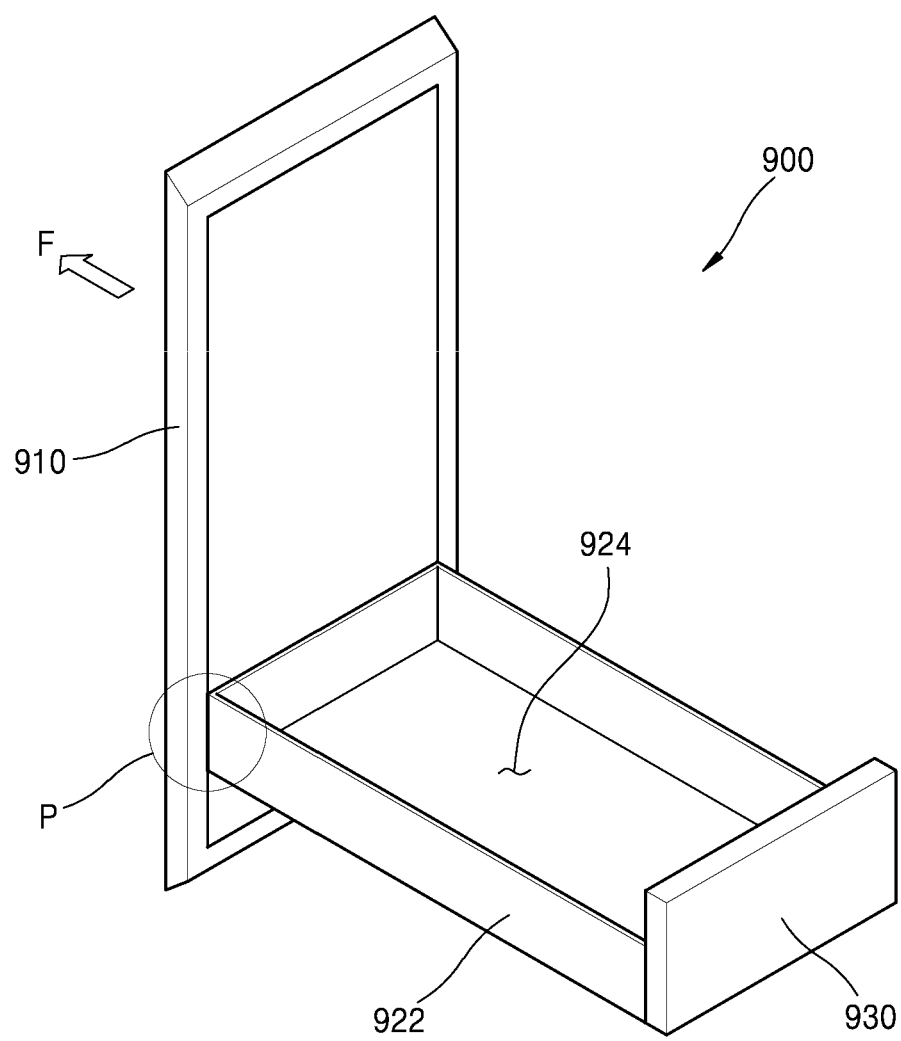
FIG. 43 shows a position of a drawer on which stress is concentrated according to an embodiment of the present disclosure.
Figure 44:
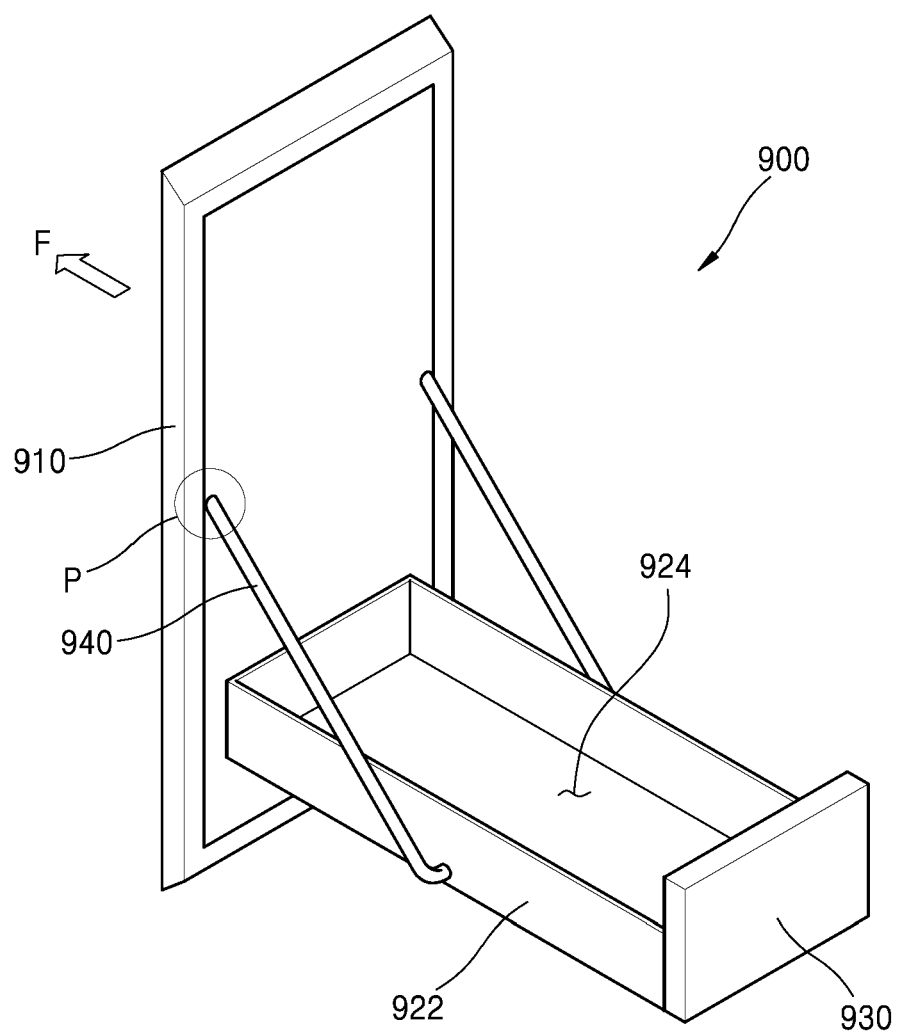
FIG. 44 shows a reinforcing pipe fixed to each of a front plate and an accommodator.
Figure 45:
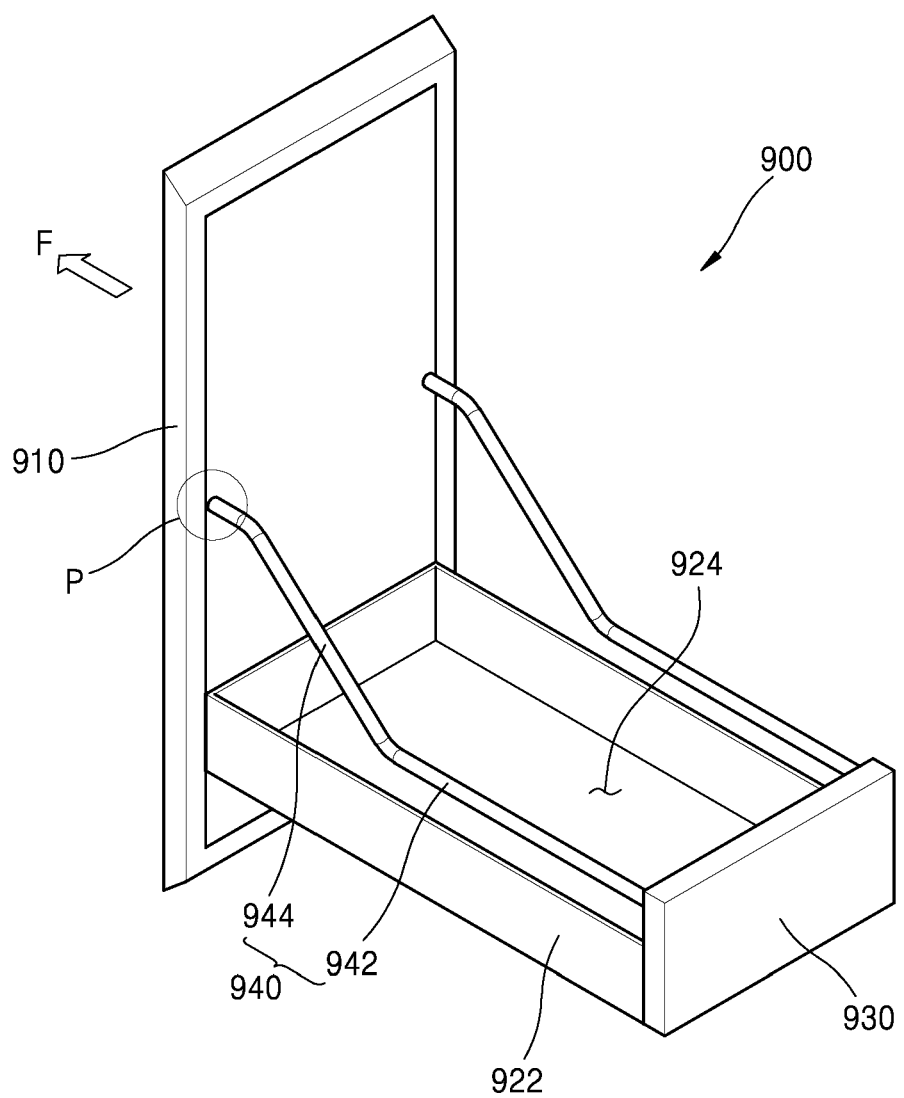
FIG. 45 shows a reinforcing pipe fixed to each of a front plate and a rear plate.

FIG. 43 shows stress concentrated on a drawer according to an embodiment of the present disclosure, FIG. 44 shows a reinforcing pipe fixed to each of a front plate and an accommodator, and FIG. 45 shows a reinforcing pipe fixed to each of a front plate and a rear plate.

According to the present disclosure, the sink cabinet is mounted on the floor surface and a height from the floor to the top of the cabinet is not high, a handle of a drawer 900 may be disposed at an upper portion of a front plate 910.

When the handle disposed at the upper portion of the front plate 910 is pulled out in a direction F of pulling out the drawer 900, a moment may be applied to the drawer 900.

As the accommodator 922 may be supported by a rail set, when a moment is applied to the drawer 900, a stress concentration portion P corresponds to a coupling portion between the accommodator 922 and the front plate 901.

In general, as the drawer 900 disposed on the rail set slides along the rail, a frictional force may not be greatly applied between the cabinet and the drawer 900. However, a large amount of stress may be concentrated on the coupling portion between the accommodator 922 and the front plate 910 when the drawer 900 is pulled out due to inertia acting when the stopped drawer 900 is pulled out and a damping function of the rail set.

As a distance between the handle disposed on the front plate 910 and the accommodator 922 coupled to the front plate 910 increases, a magnitude of the stress concentrated on the coupling portion between the accommodator 922 and the front plate 910 may increase.

Therefore, in the sink cabinet apparatus according to the embodiment of the present disclosure, a reinforcing pipe 940 may be disposed in the drawer 900 to prevent concentration of stress on the coupling portion between the accommodator 922 and the front plate 910.

The reinforcing pipe 940 may be fixed to each of the front plate 910 and the accommodator 922.

One end of the reinforcing pipe 940 may be fixed to the accommodator 922 and supported and the other end of the reinforcing pipe 940 may be fixed to the front plate 910.

The stress concentrated on the coupling portion between the accommodator 922 and the front plate 910 may be distributed to a fixed portion between the reinforcing pipe 940 and the front plate 910 due to the reinforcing pipe 940 disposed in the drawer 900.

The stress concentrated on the coupling portion between the accommodator 922 and the front plate 910 is dispersed, thereby preventing deformation or damage of the drawer 900 occurring when the drawer 900 is retracted in or pulled out.

In another embodiment of the reinforcing pipe 940 disposed in the drawer 900, the reinforcing pipe 940 may be fixed to each of the front plate 910 and the rear plate 930.

In this case, a portion of the reinforcing pipe 940 fixed to the rear plate 930 is preferably disposed lower than the lower surface of the dead zone 904.

Therefore, the reinforcing pipe 940 includes a rear portion 942 fixed to the rear plate 930 and disposed below the dead zone 904 and a front portion 944 extending from the rear portion 942 and fixed to the front plate 910.

For example, the reinforcing pipe 940 may include a rear portion 942 on the first accommodation space 926 and a front portion 944 under the second accommodation space 928.

As the rear portion 942 is disposed lower than the lower surface of the dead zone 904, interference may not occur between the reinforcing pipe 940 and the dead zone 904 during the retraction of and the pulling out of the drawer 900.

The reinforcing pipe 940 may function to fix and support the front plate 910 and may determine a size of the object that may be accommodated in the accommodator 922 or the accommodation shape of the products accommodated in the accommodator 922 when the drawer 900 is pulled out.

As the rear portion 942 of the reinforcing pipe 940 is disposed below the dead zone 904, when the drawer 900 is pulled out, a height from the bottom surface of the accommodator 922 to the lower surface of the dead zone 904 may be determined.

In some cases where the accommodated object does not protrude to an upper portion of the rear portion 942 when the objects are accommodated in the first accommodation space 926, the interference may not occur between the objects accommodated in the drawer 900 and the lower portion of the dead zone 904 when the drawer 900 in which the objects are accommodated is retracted and pulled out.

Meanwhile, as the distance between the handle disposed on the front plate 910 and the fixed portion between the reinforcing pipe 940 and the front plate 910 is greater, the magnitude of the stress concentrated on the fixing portion between the front plate 910 and the reinforcing pipe 940 may increase.

Therefore, the fixed portion between the front plate 910 and the reinforcing pipe 940 are preferably disposed at the upper portion of the front plate 910.

The reinforcing pipe 940 may have a circular cross section or may have a quadrangular cross section.

Figure 46:
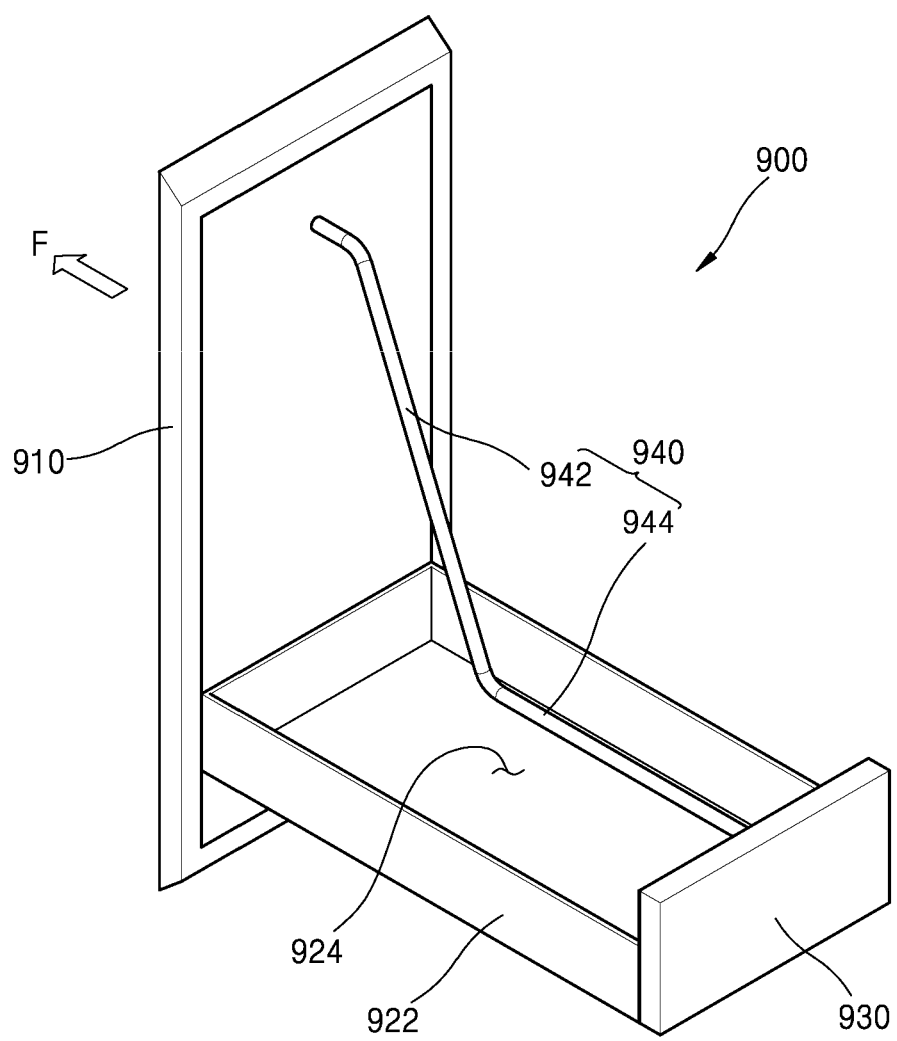
FIG. 46 shows a reinforcing pipe disposed at a central region of a drawer.
Figure 47:
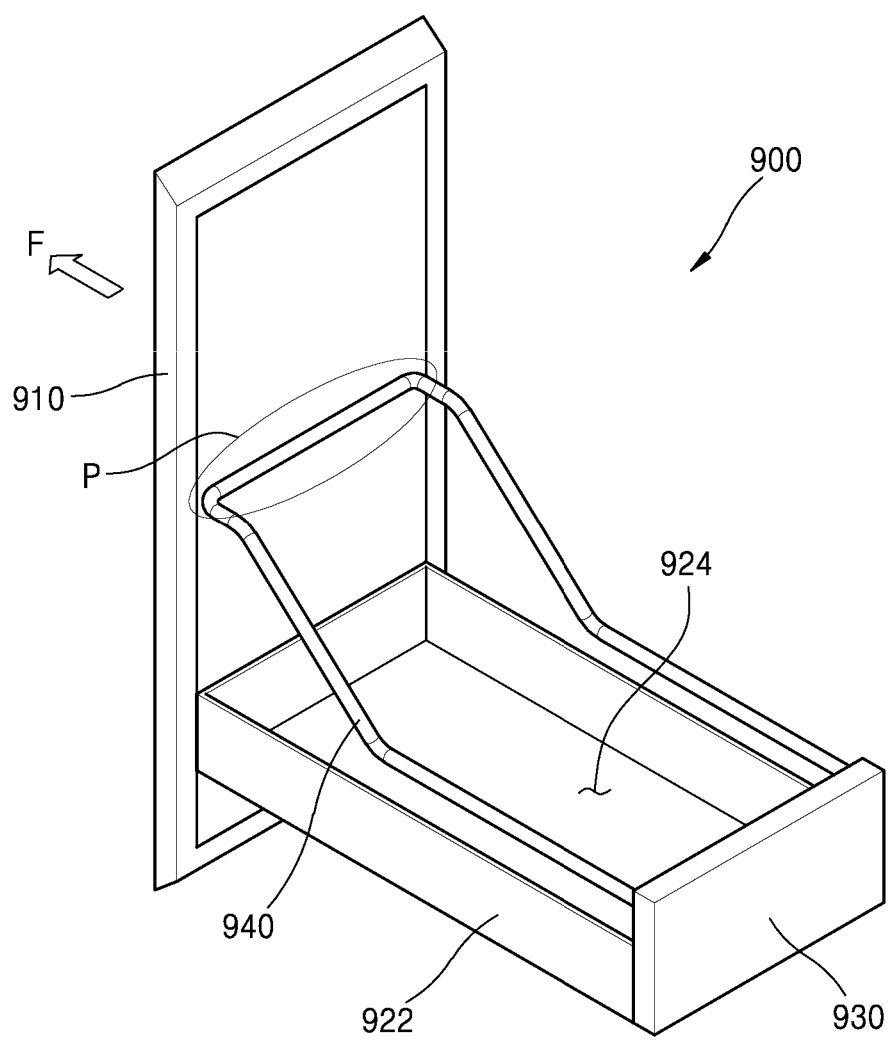
FIG. 47 shows a polygonal reinforcing pipe.

FIG. 46 shows a reinforcing pipe disposed at a center of a drawer and FIG. 47 shows a polygonal reinforcing pipe.

A pair of reinforcing pipes 940 may be disposed at both sides of the drawer 900. Alternatively, one reinforcing pipe 940 may disposed at the central region of the drawer 900. The reinforcing pipe 940 having a polygonal shape or a closed curve shape is also fixed to each of the front plate 910 and the rear plate 930 to distribute stress.

In addition, the reinforcing pipe 940 may have various structures and arrangements to distribute the stress concentrated on the front plate 910 according to the size and the shape of the drawer 900.

Figure 48:
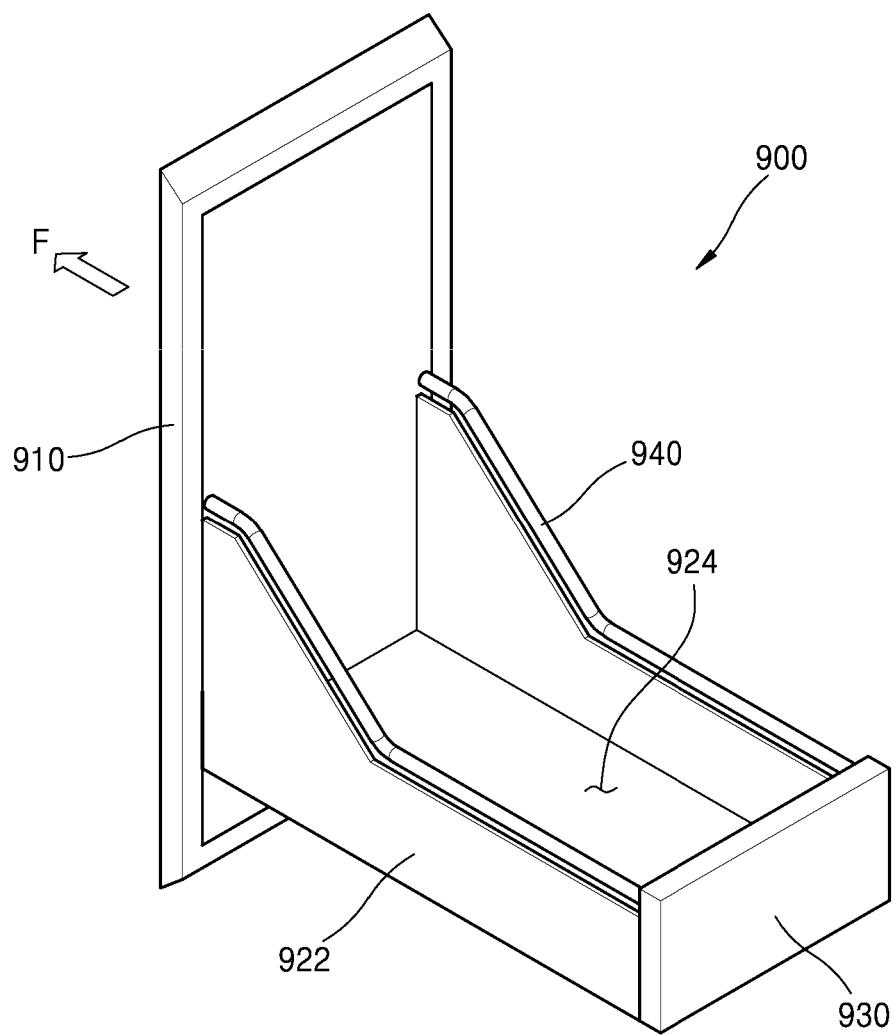
FIG. 48 shows side walls of an accommodator extending upward.

FIG. 48 shows a side wall of an accommodator extending upward.

A height of a first accommodation space 926 is different from a height of a second accommodation space 928 according to an area of the dead zone 904 and types of objects accommodated in the first accommodation space 926 may be different from types of objects accommodated in the second accommodations pace 928 and the objects may be accommodated differently.

The objects accommodated in the second accommodation space 928 may be higher or longer than the objects accommodated in the first accommodation space 926 and the objects may be accommodated at a height greater than the bottom surface of the accommodator 922.

Meanwhile, if the object accommodated in the accommodation space 924 is inclined laterally and contacts the inner wall of the cabinet, the drawer 900 may be difficult or may not be possible to be retracted in and pulled out.

Therefore, the side wall of the accommodator 922 preferably extends to the height at which the reinforcing pipe 940 is disposed.

The side wall of the accommodator 922 extending to the height at which the reinforcing pipe 940 is disposed may support the object accommodated in the accommodation space 924 to prevent contact the inner wall of the cabinet.

Figure 49:
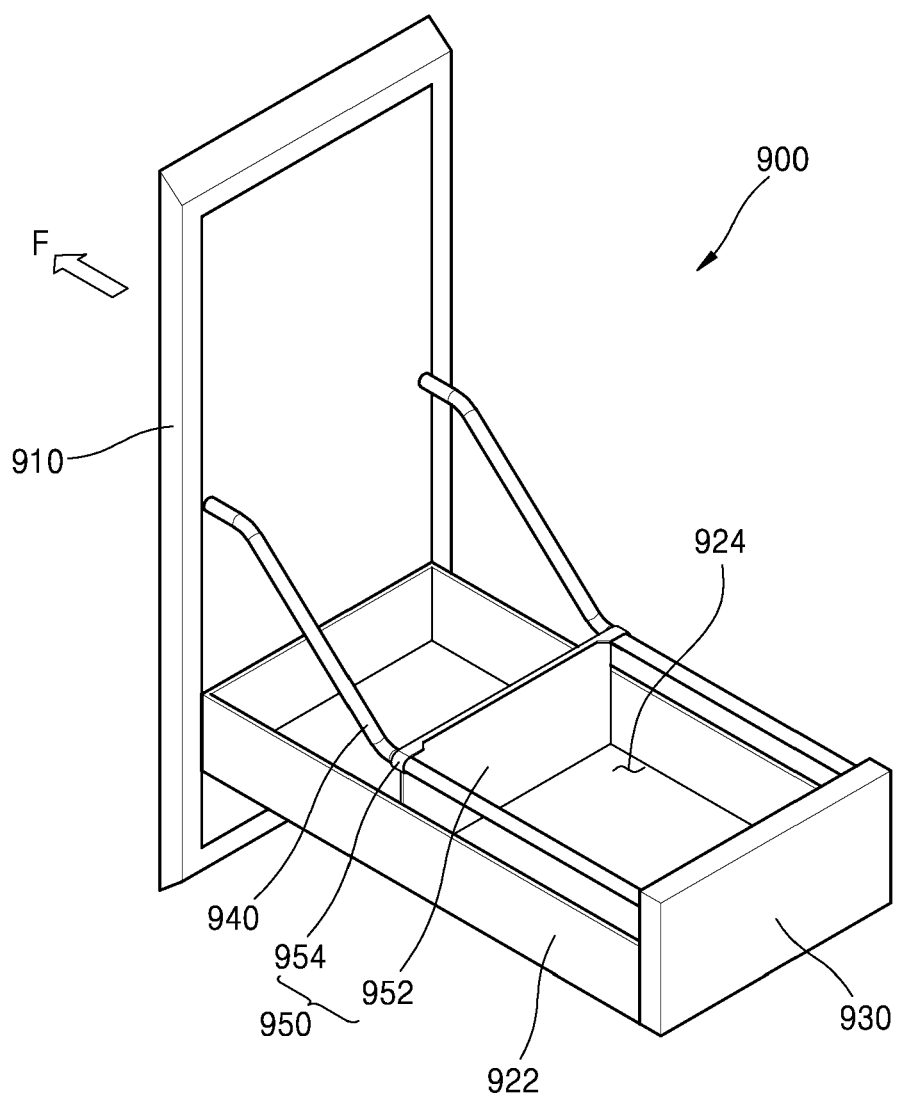
FIG. 49 shows a partition plate.
Figure 50:
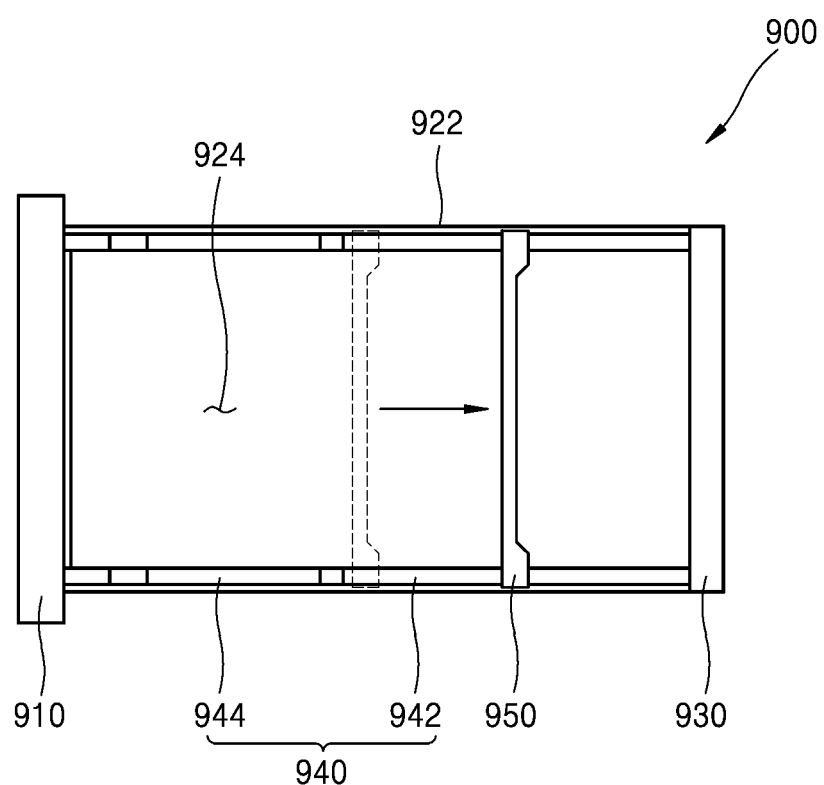
FIG. 50 shows a partition plate moved to change a partitioned accommodation space.

FIG. 49 shows a partition plate and FIG. 50 shows a partitioned accommodation space deformed by moving the partition plate.

An accommodator 922 may be partitioned by a partition plate 950. The accommodation space 924 is partitioned to thereby improve space utilization.

The partition plate 950 may include a plate 952 and a fixer 954 that partition the accommodator 922. The fixer 954 is disposed at an upper portion of the partition plate 950 and a reinforcing pipe 940 may be inserted into the fixer 954.

The fixer 954 may define opening at a side into which an the reinforcing pipe 940 fixed to the drawer 900 may be inserted. The reinforcing pipe 940 may be inserted into the fixer 954 to fix the partition plate 950 to the accommodator 922.

An inlet of the fixer 954 into which the reinforcing pipe 940 is inserted is smaller than an outer diameter of the reinforcing pipe 940 to prevent the reinforcing pipe 940 from being detached from the fixer 954.

When the inlet of the fixer 954 is less than the outer diameter of the reinforcing pipe 940, the inlet of the fixer 954 preferably has elasticity and the reinforcing pipe 940 may be inserted.

The partition plate 950 may be moved forward and rearward in the accommodation space 924 when the reinforcing pipe 940 is inserted into the fixer 954. When the partition plate 950 is moved, the area of the partitioned accommodation space 924 may be changed.

Therefore, the utilization of the accommodation space 924 may be improved. A plurality of partition plates 950 may be disposed and the size and a number of the accommodation spaces 924 may be changed to suit the user's convenience.

Figure 51:
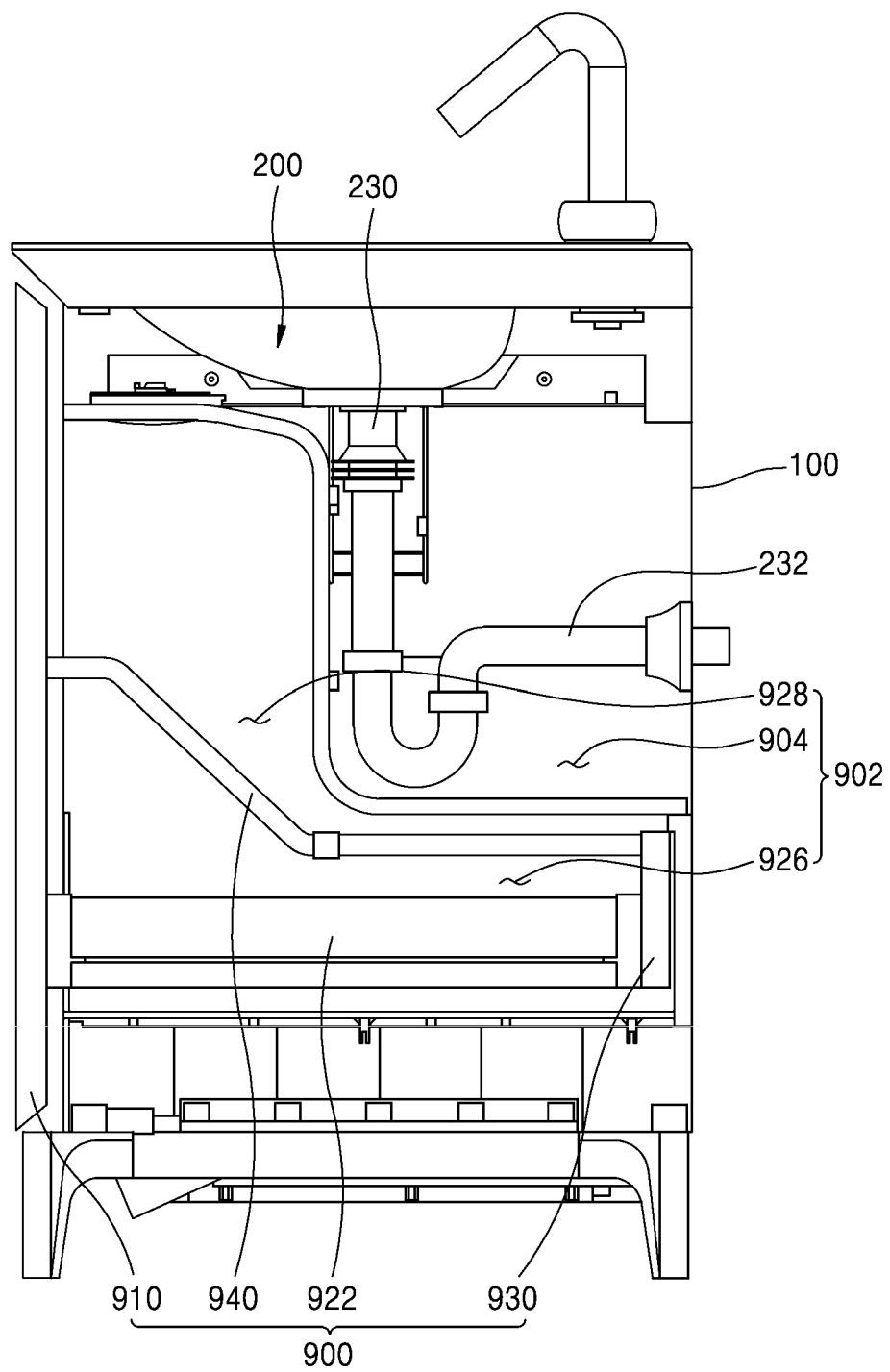
FIG. 51 shows a side cross-section of a pipe of a wash basin disposed in a dead zone.

FIG. 51 shows a side cross-section of a pipe of a wash basin disposed in a dead zone.

A sink cabinet apparatus may include a cabinet body 100, a wash basin 200, a drawer type towel management unit 300, a dead zone 904, and a drawer 900. A pop-up valve 230 is disposed under the wash basin and the pop-up valve 230 is connected to a drain pipe 232. An area where the pop-up valve 230 and the drain pipe 232 are disposed is the dead zone 904.

A pipe, a mechanical device, or an electric portion of an object embedded in or mounted on the upper portion may be disposed in the dead zone 904 for use of the cabinet.

The dead zone 904 is preferably closed by a partition wall and the accommodation space 902 may be divided into the dead zone 904 and the accommodation space 924.

When the dead zone 904 is physically separated from the accommodation space 924, water leaking from the pipe disposed inside the dead zone 904 may be prevented from falling into the accommodation space 924. Alternatively, wires disposed in the dead zone 904 may be prevented from being entangled with objects accommodated in the accommodation space 924.

Figure 52:
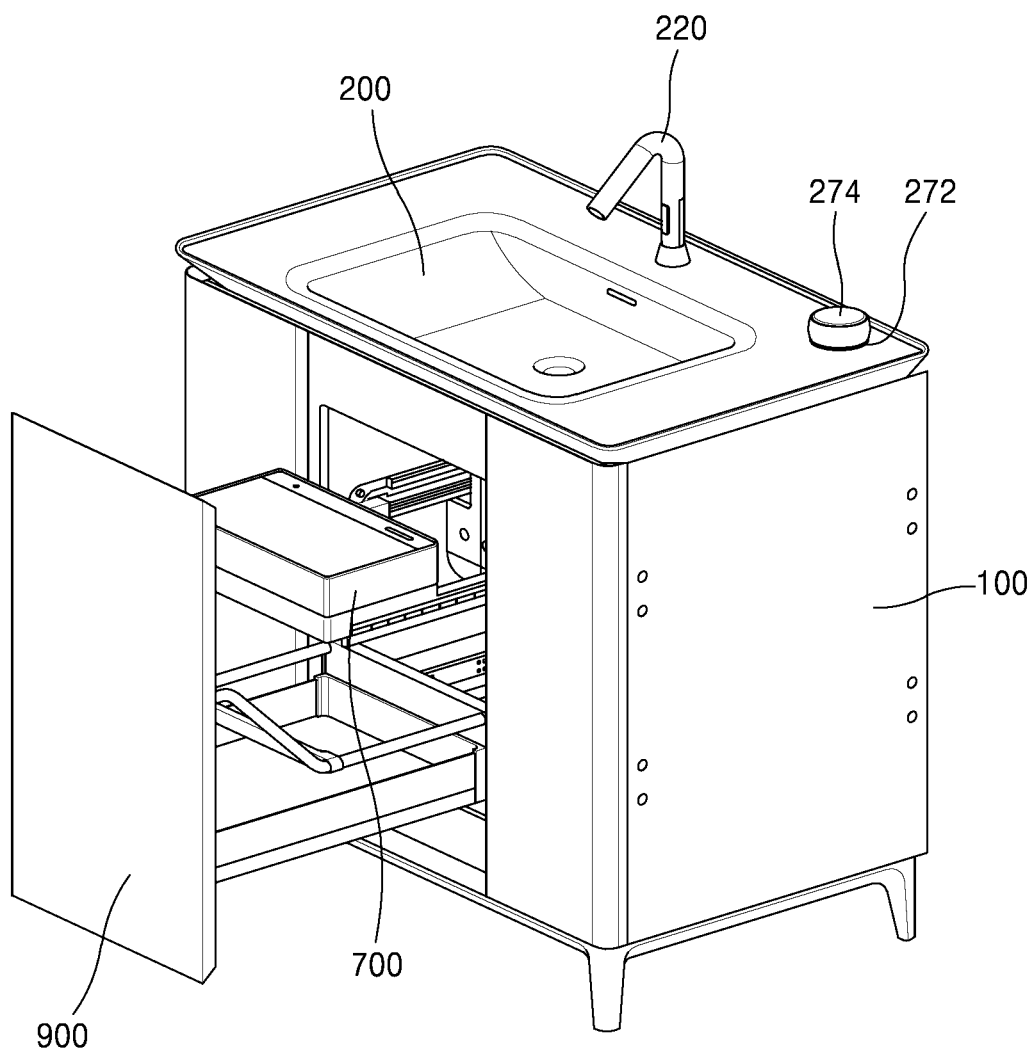
FIG. 52 is a perspective view showing a sink cabinet apparatus including an L-shaped drawer and a secret box.

FIG. 52 is a perspective view showing a sink cabinet apparatus including an L-shaped wash basin drawer 900 and a secret box 700.

A wash basin 200 may include an integrated operation switch 270 configured with a jog dial 272. The integrated operation switch 270 configured with the jog dial 272 including a dial display 274 may operate various types of bathroom devices disposed in the bathroom.

A lock state of the secret box 700 may also be released using the integrated operation switch 270.

For example, the dial display 274 displays an operation mode in which various types of bathroom devices may be operated and an unlock mode in which the lock state of the lock device may be released and a user may select the mode by turning the jog dial 272. When the unlock mode is selected, a number is displayed on the dial display 274 and the user may release the lock state of the secret box 700 by turning the jog dial 272.

Figure 53:
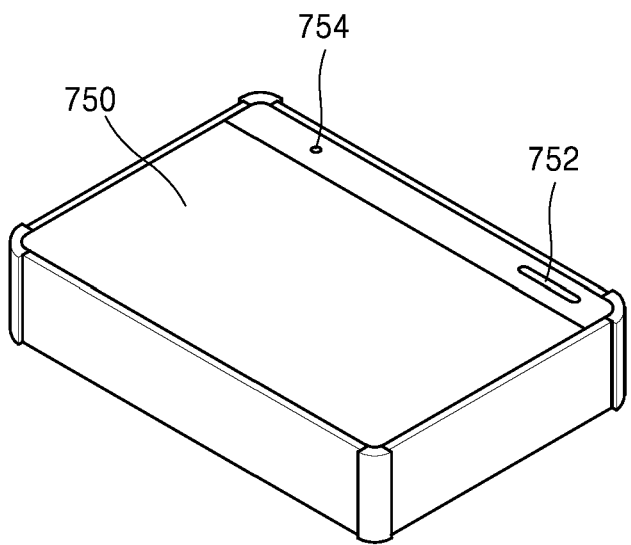
FIG. 53 shows a secret box according to an embodiment of the present disclosure.

FIG. 53 shows a secret box 700 according to an embodiment of the present disclosure.

As shown, the sink cabinet apparatus according to an embodiment of the present disclosure includes a sink cabinet body 100, a secret box 700, a sensor, a database, and a controller.

The controller may transmit and receive signals to and from the sensor, the lock device 770, and the database, to control the sink cabinet apparatus.

The secret box 700 has a drawer shape and is disposed at one side of the accommodation space 902 and may be retracted in or pulled out from the accommodation space. The secret box 700 may be opened in one direction to provide a secret space.

The drawer-shaped secret box 700 of the sink cabinet disposed on the floor may be pulled out forward through the opening of the drawer space. An opening direction of the secret box 700, which is pulled out forward, corresponds to an upward direction to facilitate accommodation of the objects or pulling out of the accommodated products, by the user.

The secret box 700 may include an additional secret door 750. The secret door 750 may open and close the secret space provided by the secret box body 720.

Products that may not be exposed to others, such as personal hygiene products or medicines, may be accommodated in the secret space.

Therefore, the secret box 700 includes a lock device (not shown) that may lock the secret door 750 to preferably prevent easier opening of the secret space by other people.

The lock device may restrict opening and closing of the secret space by other people, but may be opened and closed freely if the user desires.

The lock state of the lock device may be released based on user biometric information or a unlock signal input from the user.

The user biometric information may include a user's voice information, fingerprint information, iris information, or face information. In addition, the unlock signal may include an arrangement of numbers or a pattern sequence.

The sensor may identify the user biometric information or the unlock signal input from the user.

The user biometric information or the user's unlock information may also be stored in advance in the database.

When the user biometric information or the unlock signal identified by the sensor is identical to the user biometric information or the unlock signal previously stored in the database based on comparison between them, the lock state of the lock device may be released.

The sensor may include a numeric pad. The user may input an unlock signal consisting of an array of numbers by pressing a button on the number pad. The numeric pad may be disposed on a front surface of the secret door 750 to facilitate the user input.

Figure 54:
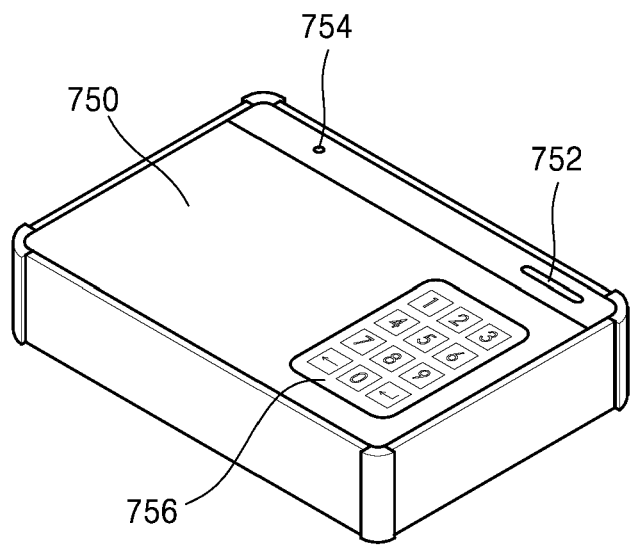
FIG. 54 shows a password input display displayed on a display of a secret box.
Figure 55:
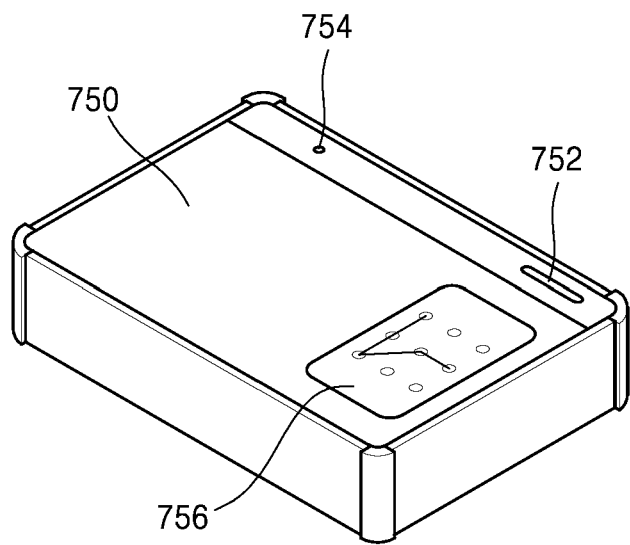
FIG. 55 shows a pattern input display displayed on a display of a secret box.

FIG. 54 shows a password input display displayed on a display 756 of a secret box 700 and FIG. 55 shows a pattern input display displayed on a display 756 of a secret box 700.

As shown, the secret box 700 according to an embodiment of the present disclosure may include a display 756.

The display 756 is preferably disposed on an upper surface of the secret box 700 to easily check, by the user, the contents displayed on the display 756. Therefore, the display 756 may be disposed on a secret door 750 on the upper portion of the secret box 700.

As shown in FIG. 54, the display 756 may display an array of numbers that allows a user to enter a password to unlock the lock device. The user may enter a password using the numeric pad displayed on the display 756.

Numbers may be arranged in an ascending order or a descending order, or randomly to prevent theft.

The user's touch may be preferably sensed to enter the password through the display 756 by the user. The surface of the display 756 may detect a position touched by the user in a capacitive or pressure-sensitive manner to determine a number provided at the position touched by the user.

As shown in FIG. 55, the display 756 may display dot matrix arranged by predetermined distance to input a pattern to unlock the lock device by the user.

As shown in FIG. 55, a 3×3 matrix of dots, that is, a total of nine dots may be displayed on the display 756, but the number thereof may not be limited. For example, a 4×5 matrix of dots, that is, a total of 20 dots may be displayed.

Meanwhile, the user biometric information stored in the database may include user voice information.

Accordingly, according to an embodiment of the present disclosure, the secret box 700 may include a microphone device 754 that may sense sound and a speaker device 752 that may output a sound source playing signal.

The user's voice may be input through the microphone device 754 and a sound source playing signal transmitted by the controller may be output through the speaker device 752.

The user may determine an operation state of the lock device based on the signal output through the speaker device 752. The user may be notified of a standby state of the device or the user may be notified of incorrect input of the user to thereby improve user convenience.

When the user's voice is input through the microphone device 754 of the secret box 700, the voice input by the user is compared with a user's voice stored previously in the database. If the input voice is identical to the stored voice, the locks state of the lock device may be released.

The voice information identified through the microphone device 754 may include linguistic information of the user. For example, it may correspond to an array of numbers spoken by the user or a specific word.

In addition, as characteristics of frequencies vary depending on the voice for each person, the voice information identified through the microphone device 754 may include voice frequency information unique to the user.

Figure 56:
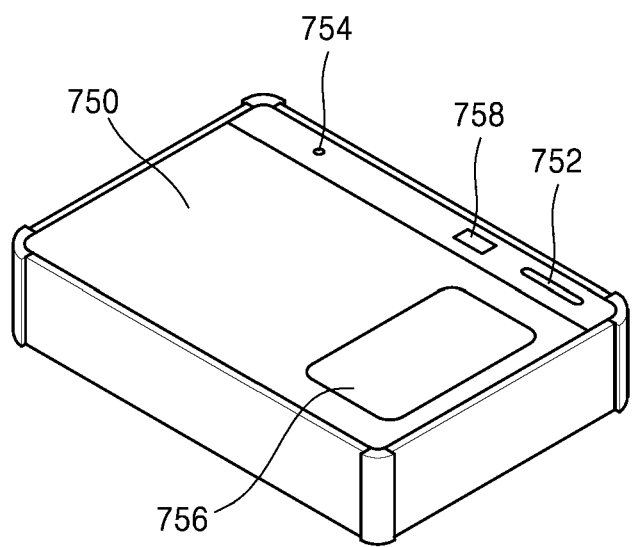
FIG. 56 shows a fingerprint recognition device of a secret box.

FIG. 56 shows a fingerprint recognition device 758 of a secret box 700.

As shown in FIG. 56, according to an embodiment of the present disclosure, the secret box 700 may include a fingerprint recognition device 758. For example, a sensor may include the fingerprint recognition device 758 that may detect a user's fingerprint and identify user biometric information.

The fingerprint recognition device 758 may be disposed on an upper surface of the secret box 700 and may allow the user's fingerprint to contact the fingerprint recognition device 758.

In this case, the user biometric information stored in the database may include user fingerprint information.

Meanwhile, the sensor may include a camera that may recognize a user's iris or face.

In this case, the user biometric information stored in the database may include user's iris information or user's face information.

One user biometric information or one user unlock signal may be recorded in the database for one user and a large number of user information may be recorded in the database for use by a large number of users.

The user may release the lock state of the lock device based on both the biometric information and the unlock signal.

The user biometric information and the unlock signal may be stored in the database, and when the sensor identifies at least one of the user biometric information or the unlock signal, the information stored in the database is compared with the identified information to determine the unlock state of the lock device.

Meanwhile, according to an embodiment of the present disclosure, the cabinet device may release the lock state of the lock device using a mobile device.

A mobile device may receive the user information from a transmitter mirroring with the mobile device and the cabinet apparatus may release the lock state of the lock device based on determination that the user information is identical to the user information stored in the database.

Figure 57:
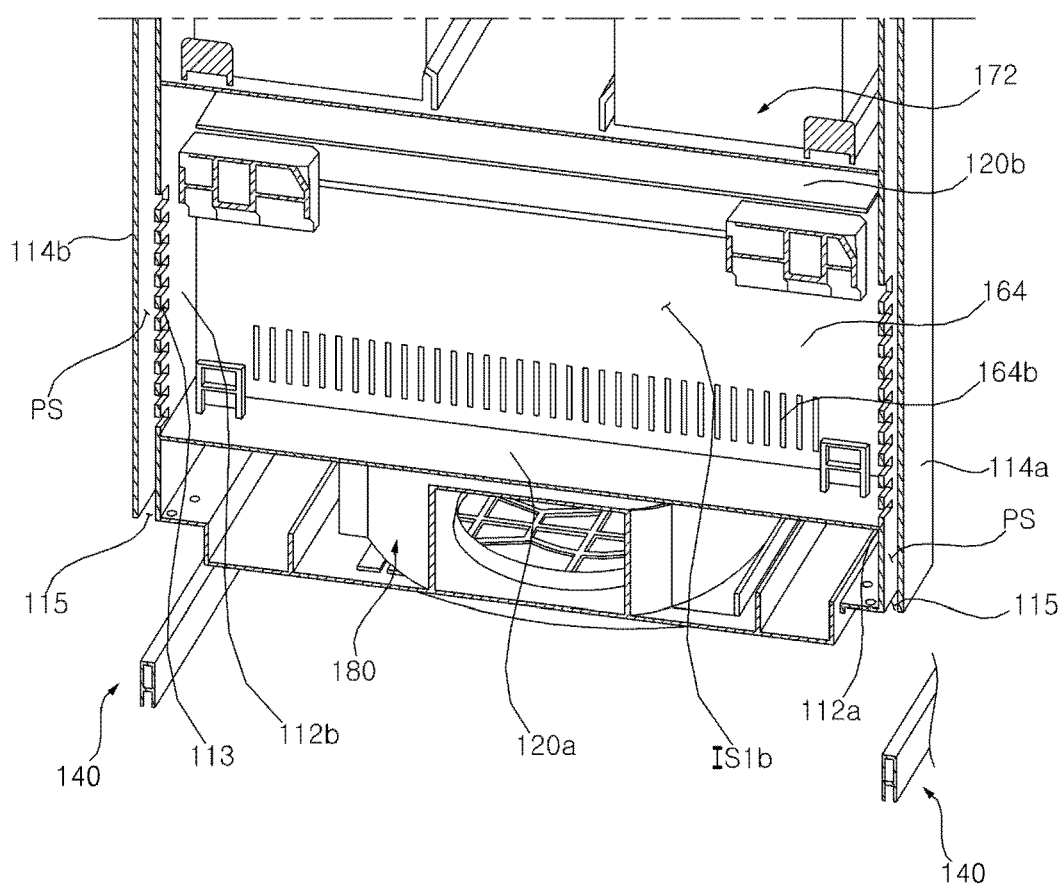
FIG. 57 is a perspective view showing a sink cabinet apparatus according to another embodiment of the present disclosure.
Figure 58:
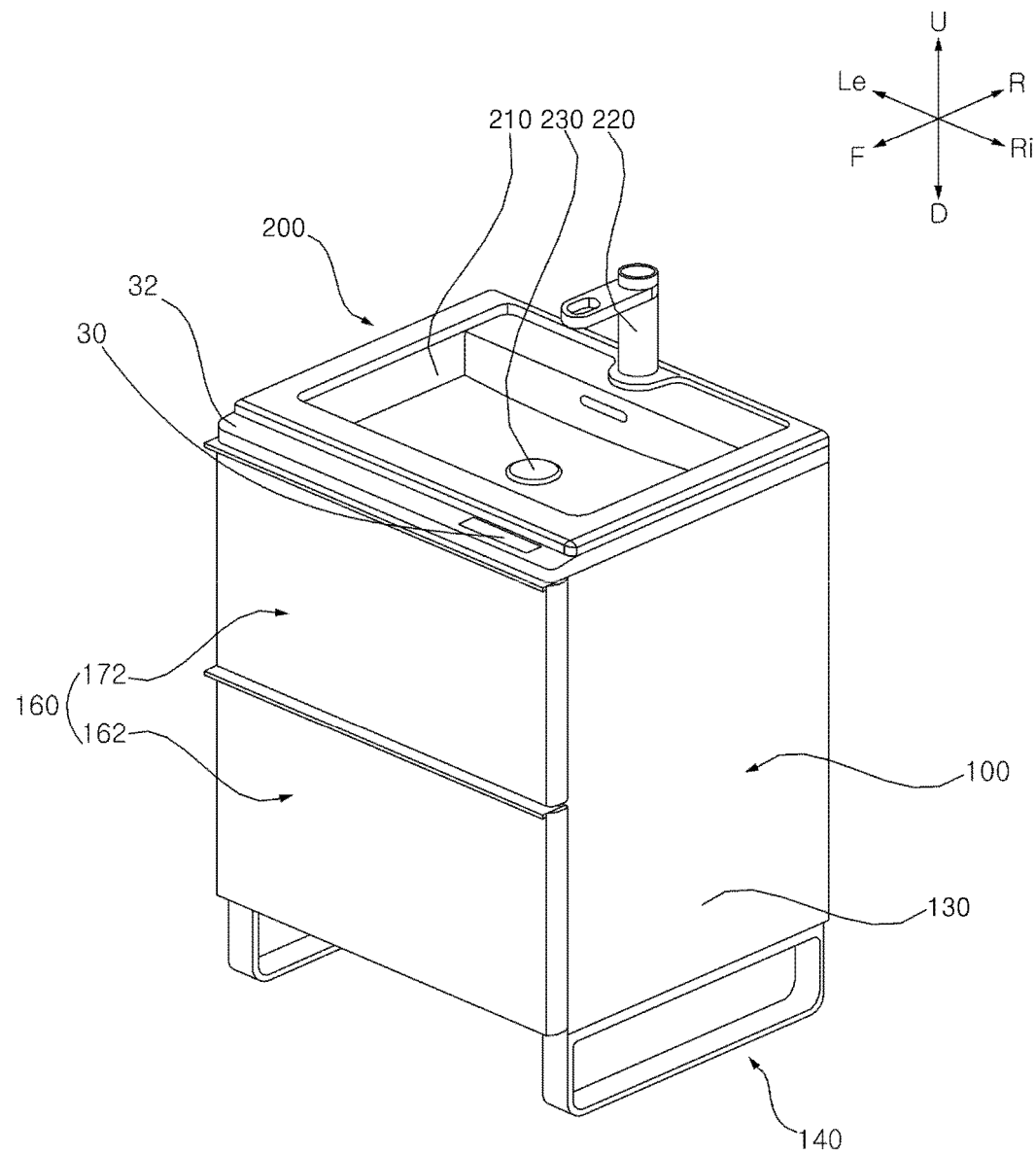
FIG. 58 is an exploded view showing some components of a sink cabinet apparatus according to another embodiment of the present disclosure.
Figure 59:
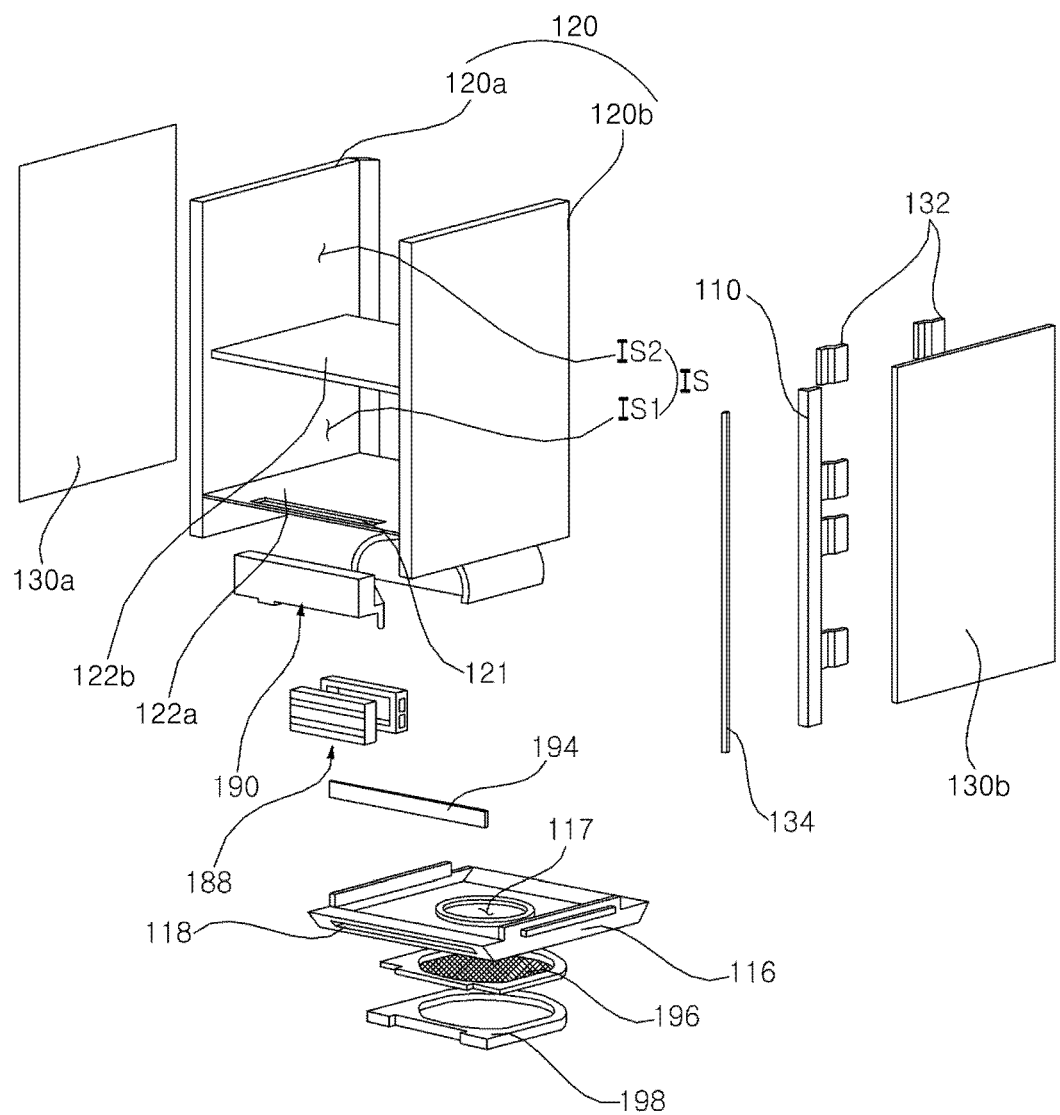
FIG. 59 is a plan view showing a sink cabinet apparatus according to another embodiment of the present disclosure.
Figure 60:
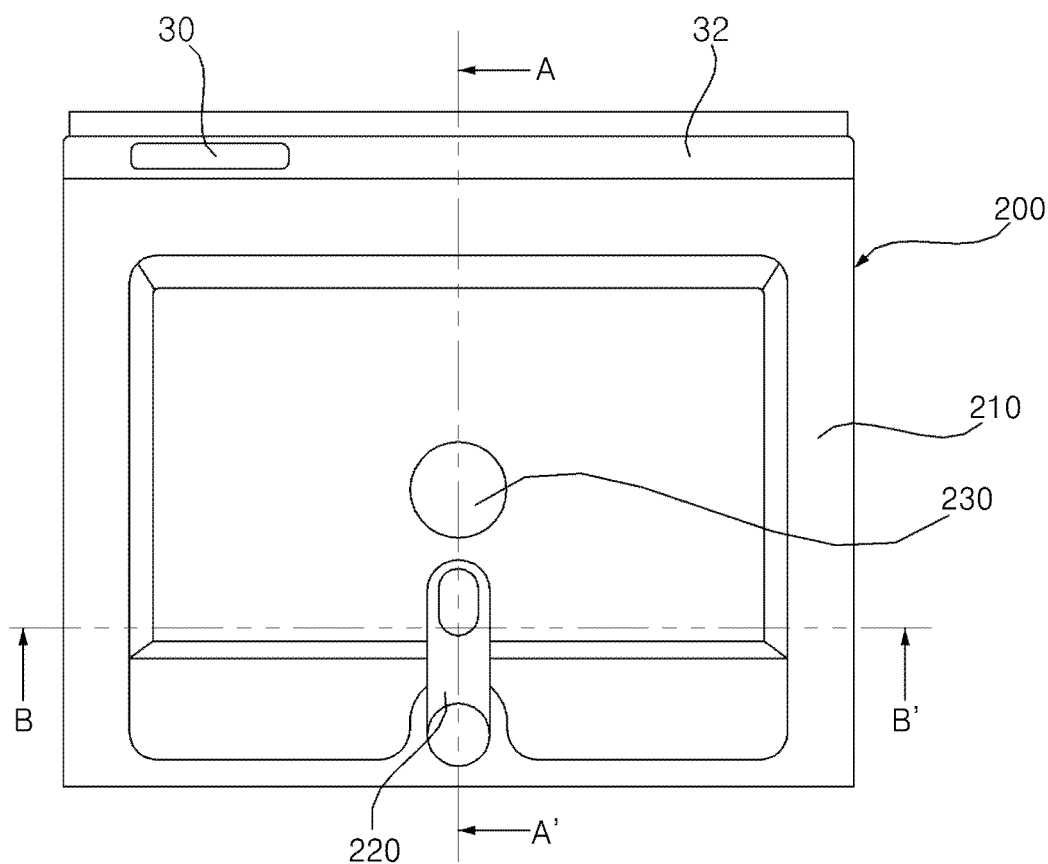
FIG. 60 shows a portion of a cross-section taken along line A-A' in FIG. 59.
Figure 61:
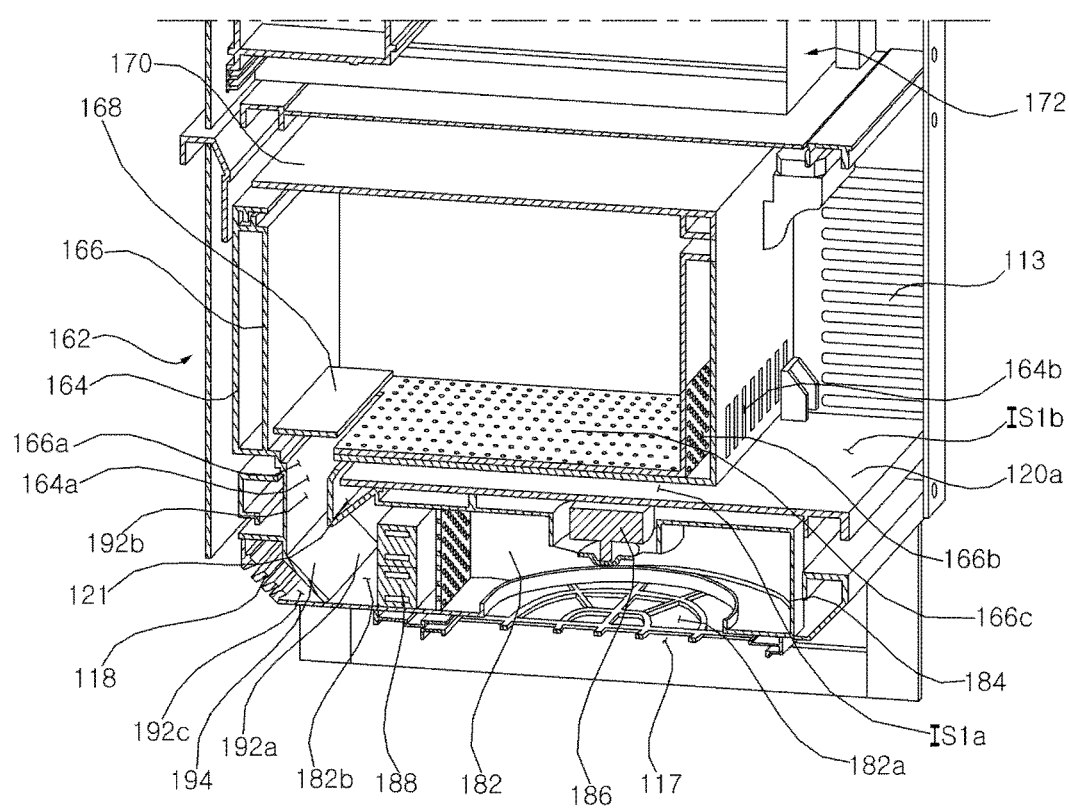
FIG. 61 shows a portion of a cross-section taken along line B-B' in FIG. 59.

FIG. 57 is a perspective view showing a sink cabinet apparatus according to another embodiment of the present disclosure. FIG. 58 is an exploded view showing some components of a sink cabinet apparatus according to another embodiment of the present disclosure. FIG. 59 is a plan view showing another embodiment of the present disclosure. FIG. 60 shows a portion of a cross section taken along line A-A' in FIG. 59. FIG. 61 shows a portion of a cross section taken along line B-B' in FIG. 59.

Indications of an upward direction (U), a downward direction (D), a leftward direction (Le), a rightward direction (Ri), a forward direction (F), and a rearward direction (R) shown in FIG. 57 are intended to facilitate the description of the present disclosure through embodiments and do not limit a range of directions.

According to the present disclosure, the sink cabinet apparatus includes a sink cabinet body 100 that supports the wash basin body 210 and defines an inner space IS below the wash basin body 210.

According to the present embodiment, the sink cabinet body 100 defines an inner space IS of the sink cabinet apparatus below the wash basin body 210 and defines an appearance.

According to the present embodiment, the sink cabinet body 100 defines an inner space IS in which a functional module 160 described below is disposed. The sink cabinet body 100 may define, at a side, a panel inlet hole 113 to communicate the inner space IS of the sink cabinet body 100 with the interior panel space IS defined inside the sink cabinet body 100.

According to the present embodiment, the sink cabinet body 100 may include a side panel that covers a side extending in the leftward direction (Le) and the rightward direction (Ri) of the sink cabinet apparatus. According to the present embodiment, the sink cabinet body 100 may further include a rear panel that covers a rear portion extended to the rearward direction of the sink cabinet apparatus 10 and a base panel 116 that covers a lower surface of a lower storage of the wash basin.

According to the present embodiment, the sink cabinet body 100 includes an inner case 120 that defines a space in which a functional module 160 or a blower device 180 described below is disposed below the wash basin body 210 and an exterior panel 130 spaced apart from the inner case 120 and defines appearance of the sink cabinet apparatus.

According to the present embodiment, the sink cabinet body 100 may further include partition panels 122a and 122b that partition an inner space IS in the sink cabinet body 100.

According to the present embodiment, the inner case 120 defines an inner space IS in which the functional module 160 is disposed inside the sink cabinet apparatus and defines an opening at a front portion. The functional module 160 is movable in a forward direction in the space defined by the inner case 120.

According to the present embodiment, at least two inner cases 120 are disposed to define the inner space IS. According to the present embodiment, the inner case 120 includes a first inner case 120a disposed on the left side (see the leftward direction (Le)) and a second inner case 120b disposed on the right side (see the rightward direction (Ri)) when viewed from the front. A space in which at least one functional module 160 is disposed is defined between the first inner case 120a and the second inner case 120b.

According to the present embodiment, the exterior panel 130 covers the inner case 120 from an outside of the inner case 120. According to the present embodiment, the exterior panel 130 defines a side appearance of the sink cabinet apparatus. According to this embodiment, the exterior panel 130 is spaced apart from the inner case 120. According to the present embodiment, the exterior panel 130 includes a first exterior panel 130a disposed outside the first inner case 120a and a second exterior panel 130b disposed outside the second inner case 120b.

The inner case 120 and the exterior panel 130 are spaced from each other by a predetermined distance. Accordingly, a panel inner space IS is defined between the inner case 120 and the exterior panel 130 to allow for air flow. The wash basin body 210 is disposed on the inner case 120 and the exterior panel 130 to close the upper portion of the panel inner space IS.

A frame 110 and a sealer 134 each are disposed at a front side (see the forward direction (F)) of the inner case 120 and the exterior panel 130 to close the front portion of the panel inner space IS. The frame 110 and the sealer 134 each are disposed at a rear side (see the rearward direction (R)) of the inner case 120 and the exterior panel 130 and an additional rear panel (not shown) is disposed to close the rear side of the panel inner space IS.

In addition, the sink cabinet apparatus has the wall surface and the wall surface is disposed at the rear portion (see the rearward direction (R)) of each of the inner case 120 and the exterior panel 130 to close the rear portion of the panel inner space IS.

The inner case 120 and the exterior panel 130 each are spaced apart from the floor by a predetermined distance by a height adjustor 140 described below. The panel inner space IS defines an opening at a lower portion. A panel discharge hole 115 may be disposed at a lower portion of each of the inner case 120 and the exterior panel 130 to discharge the air flowing through the panel inner space IS to outside.

The inner space IS between the inner cases 120 may include an insertion space IS1a into which the functional module 160 is inserted and a communication space IS1b provided at a rear side and communicating the inside of the functional module 160 with the panel inner space IS. The inside of the functional module 160 and the panel inner space IS may be connected to each other through the communication space IS1b. The air discharged by the blower device 180 and passing through the functional module 160 may be introduced to the panel inner space IS through the communication space IS1b.

According to the embodiment, the inner case 120 may define a panel inlet hole 113 to communicate the inner space IS with the interior panel space IS. According to the embodiment, the panel inlet hole 113 may be defined on each of surfaces facing each other and vertical to the first inner case 120a and the second inner case 120b.

According to the embodiment, the panel inlet hole 113 is provided at the rear lower side of the inner case 120. According to the embodiment, the panel inlet hole 113 is defined on a surface of the inner case 120 facing the communication space IS1b. The inner space IS defined between the inner case 120a and the second inner case 120b communicates with the panel inner space IS defined between the inner case 120 and the exterior panel 130 through the panel inlet hole 113.

According to this embodiment, the panel inlet hole 113 is defined at a rear side (see the rearward direction (R)) of the space where the first functional module 162 inserted into the inner space IS between the first inner case 120a and the second inner case 120b is disposed. The communication space IS1b defined at the rear side (see the downward direction (R)) of the space where the first functional module 162 is disposed communicates with the panel inner space IS between the inner case 120 and the exterior panel 130 through the panel inlet hole 113.

According to the embodiment, the sink cabinet apparatus may further include a frame 110 connecting the inner case 120 and the exterior panel 130, a bracket 132 that maintains a space between the inner case 120 and the exterior panel 130, and a sealer 134 that blocks a space between the inner case 120 and the exterior panel 130 and an outer space.

According to the embodiment, the sink cabinet apparatus may further include a height adjustor 140 that spaces the inner case 120 and the exterior panel 130 apart from the floor or the floor surface by a predetermined distance.

According to the embodiment, the partition panel is vertically coupled to the inner case 120. According to the embodiment, the partition panel is vertically connected to the first inner case 120a and the second inner case 120b. According to the embodiment, the partition panel is vertically coupled between two inner cases 120 to reinforce the rigidity of the sink cabinet body 100 that supports the wash basin body 210.

According to the embodiment, the partition panel may partition the inner space IS defined by the inner case 120. According to the embodiment, the partition panel may partition a space in which a plurality of functional modules 160 are disposed in the inner spaces IS formed by the inner case 120 or may partition into a space where the functional module 160 is disposed and a space where the blower device 180 is disposed.

According to the embodiment, the partition panel includes a first partition panel 122a that partitions into an area in which the blower device 180 is disposed and an area in which the functional module 160 is disposed and a second partition panel 122b that partitions areas where a plurality of functional modules 160 are disposed.

The first partition panel 122a divides into the area in which the blower device 180 is disposed and the area in which the functional module 160 is disposed. For example, the blower device 180 is disposed below the first partition panel 122a and the functional module is disposed above the first partition panel 122a.

According to the embodiment, the first partition panel 122a defines a communication hole 121 that is opened to flow the heated air discharged from the blower device 180 into the inner space IS in which the functional module 160 is disposed. The communication hole 121 is provided at a front portion of the first partition panel 122a.

The second partition panel 122b divides the area in which the first functional module 162 is disposed and the area in which the second functional module 172 is disposed, which are described below. The second partition panel 122b may partition the inner space IS between the inner cases 120 into a first inner space IS1 into which the first functional module 162 is inserted and a second inner space IS2 into which the second functional module 172 is inserted. According to the present embodiment, the second partition panel 122b may close between the first inner space IS1 and the second inner space IS2 to block the air flow between the first inner space IS1 and the second inner space IS2.

According to the embodiment, the base panel 116 covers the lower portion of the sink cabinet apparatus. The base panel 116 is disposed below the blower device 180. The base panel 116 defines a suction hole 117 through which external air flows into the blower device 180. The base panel 116 defines a discharge hole 118 into which the flowing air is discharged from the blower device 180 to outside.

The suction hole 117 may be provided at a position corresponding to that of a suction hole 182a of the blower device 180 described below. According to the present disclosure, the suction hole 117 of the base panel 116 is opened toward the bathroom floor. The discharge hole 118 of the base panel 116 may be provided at a position corresponding to that of a second discharge outlet 192c of the exhaust duct 190 described below. According to the present disclosure, the discharge hole 118 of the base panel 116 is opened forward and downward.

According to the embodiment, the blower device 180 flows air into the inner space IS defined between the inner cases 120. The blower device 180 operates a blowing fan 182 to discharge the air into the inner space IS. According to an embodiment of the present disclosure, the blower device 180 may discharge the air to dry the inside of the functional module 160 disposed in the inner space IS. According to an embodiment of the present disclosure, the blower device 180 communicates with the inner space IS defined between the inner cases 120.

According to the embodiment, the blower device 180 is disposed below (see the downward direction D) the first partition panel 122a. According to the embodiment, the blower device 180 is disposed on the base panel 116 (see the upward direction (U)). According to the embodiment, the blower device 180 is disposed between the first partition panel 122a and the base panel 116.

The blower device 180 may discharge the air into the inner space IS defined between the inner cases 120 from a space below the first partition panel 122a (see the downward direction (D)). The blower device 180 is spaced apart from the floor surface of the bathroom by a predetermined distance and defines a suction inlet 182 at a lower surface. The blower device 180 is spaced apart from the bathroom floor by a predetermined distance to suction the air through the suction inlet 182a on the lower surface.

According to the embodiment, the blower device 180 includes a blowing fan housing 184 that defines appearance, a blowing fan 182 disposed inside the blowing fan housing 184 to form air flow, a blowing fan motor 186 that operates the blowing fan 182, and a heater 188 that heats the air flowing by the blowing fan 182.

The blowing fan housing 184 may define a suction inlet 182a opened downward to allow outside air to flow into the inside and a discharge outlet 182b opened forward (see the forward direction F) to discharge the air flowing inside the blowing fan housing 184. A suction hole 117 of the base panel 116 is provided below the suction inlet 182a through which the air below the sink cabinet apparatus may be introduced into the blower device 180.

An exhaust duct 190 may be disposed in front of the discharge outlet of the blower device 180 to flow the air discharged by the blower device 180 into the inner space IS defined above the first partition panel 122a or below the sink cabinet apparatus.

The exhaust duct 190 may guide the air discharged from the blower device 180 to the inner space IS. The exhaust duct 190 may be disposed in front of the blower device 180 to communicate the blower device 180 with the inner space IS disposed above.

According to the embodiment, the exhaust duct 190 may be a two-way duct having two discharge outlets. According to the embodiment, the exhaust duct 190 may discharge the air discharged from the blower device 180 to an inner space IS or the bathroom floor outside the sink cabinet apparatus.

According to the embodiment, the exhaust duct 190 may include a duct housing 192 that defines one inlet and two discharge outlets and appearance, a vane 194 that adjusts a direction of air discharged from the inside of the duct housing 192, and a vane motor (not shown) that operates the vane 194.

According to the embodiment, the inlet 192a of the duct housing 192 is connected to the discharge outlet 182b of the blower device 180. The duct housing 192 defines a first discharge outlet 192b opened upward to communicate with the inner space IS and a second discharge outlet 192c opened forward and downward to communicate with the outside.

According to the embodiment, the vane 194 may selectively open and close the first discharge outlet 192*b* or the second discharge outlet 192*c* by driving a vane motor (not shown).

The heater 188 may use a positive temperature coefficient (PTC) heater that functions as a self-temperature sensing heating heater that may control a proper temperature according to set requirements when power is applied and may maintain the proper temperature without an additional control device.

According to the embodiment, the blower device 180 may include a filter 196 that filters foreign objects contained in air introduced from the outside. According to the embodiment, the filter 196 may be disposed at the suction inlet 182*a* of the blower device 180. According to the embodiment, the filter 196 may be mounted in the filter case 198 and inserted into the discharge hole 118 of the base panel 116.

According to the embodiment, the sink cabinet apparatus may include a functional module 160 inserted into the inner space IS defined between the inner cases 120. According to the embodiment, the functional module 160 may be an electrical or air-conditioning device that may be used in the bathroom. In addition, the functional module 160 may include a device that may be used functionally in the bathroom.

According to the embodiment, the sink cabinet apparatus may include two functional modules. According to the embodiment, the functional module 160 may include a first functional module 162 disposed below the second partition panel 122*b* and a second functional module 172 disposed on the second partition panel 122*b*.

According to the embodiment, each of the first functional module 162 and the second functional module 172 is movably disposed in the inner space IS defined by the inner case 120. According to the embodiment, each of the first functional module 162 and the second functional module 172 may be pulled out toward a front side from the inner space IS defined by the inner case 120.

According to the embodiment, the first functional module 162 may be an appliance drying module that dries the appliances used in the bathroom. According to the embodiment, the first functional module 162 may include a drawer 164 movably disposed in the inner space IS above the first partition panel 122*a*, having cavities, and that defines an opening at an upper side, an inner box 166 disposed in the drawer 164 and that defines a space where the appliances are dried, and a door 170 that opens and closes the opening at the upper portion of the drawer 164.

According to the embodiment, the drawer 164 may be inserted into the inner space IS defined by the inner case 120 or may be pulled out forward. The drawer 164 has an approximately rectangular parallelepiped shape and defines the opening at the upper portion.

According to the embodiment, the drawer 164 defines a drawer inlet 164*a* on a lower surface of the drawer 164, into which the air discharged by the blower device 180 is introduced. When the drawer 164 is inserted into the inner space IS, the communication hole 121 of the first partition panel 122*a* communicates with the drawer inlet 164*a* of the drawer 164.

According to the present disclosure, the drawer 164 defines a drawer discharge outlet 164*b* at a rear surface to discharge the air introduced through the blower device 180. The air introduced into the drawer 164 through the blower device 180 may be discharged to outside through the drawer discharge outlet 164*b*.

The drawer outlet 164*b* communicates the inside of the drawer with the inner space IS defined between the inner cases 120. The drawer discharge outlet 164*b* communicates the inside of the drawer with the communication space IS1*b* defined rearward the first functional module 162. A roller (not shown) may be disposed on an outer side of the drawer 164 to allow easier movement of the drawer 164 between the inner cases 120.

According to the embodiment, an inner box 166 is disposed inside the drawer 164 and defines a space to dry the appliances used in the bathroom. The inner box 166 may be inserted into the drawer 164 through the opening at the upper portion of the drawer 164 or may be pulled out from the inside of the drawer 164.

The inner box 166 defines cavities and an opening at the upper portion. An upper edge of the inner box 166 may correspond to an upper edge of the drawer 164. Therefore, when the inner box 166 is inserted into the drawer 164, the inner box 166 may be fixed in the drawer 164

A plurality of hollow holes 166*c* may be defined on the bottom surface of the inner box 166 through which the water falling from the appliance with water flows to the bottom surface of the drawer 164. When the inner box 166 is inserted into the drawer 164, the bottom surface of the inner box 166 may be spaced apart from the bottom surface of the drawer 164.

According to this embodiment, an inner box inlet 166*a* into which air flowing by the blower device 180 is introduced is defined on the lower surface of inner box 166. The inner box inlet 166*a* is provided at a position corresponding to that of the drawer inlet 164*a* when the inner box 166 is inserted into the drawer 164. Accordingly, air discharged from the blower device 180 may flow into the inner box 166.

According to the embodiment, the inner box 166 may include an inlet cover 168 that covers the inner box inlet 166*a*. The inlet cover 168 is a plate-shaped cover and has a size similar to that of the inner box inlet 166*a*. The inlet cover 168 prevents the appliance disposed in the inner box 166 from falling into the inner box inlet 166*a* defined in the inner box 166. The inlet cover 168 is disposed above and is spaced apart from the inner box inlet 166*a* by a predetermined distance.

According to the embodiment, an inner box outlet 166*b* is defined on a rear surface of the inner box 166 to discharge air introduced through the blower device 180. The air introduced into the inner box 166 through the blower device 180 may be discharged to the outside of the inner box 166 through the inner box outlet 166*b*.

When the inner box 166 is inserted into the drawer 164, the inner box outlet 166*b* is provided at a position corresponding to that of the drawer outlet 164*b*. Accordingly, the air flowing inside the inner box 166 may flow toward the outside of the inner box 166 through the inner box outlet 166*b* and the drawer outlet 164*b*.

According to the embodiment, the sink cabinet apparatus may include an input 30 that inputs a user command for operating the blower device 180 and the functional module 160. According to this embodiment, the input 30 is disposed at one side of the upper cover 32 disposed under the wash basin body 210.

The input 30 may include a button-type switch, a membrane switch, or a touch panel that receive an operation command for the functional module or the blower device 180 of the sink cabinet apparatus. As the input 30 may include a remote controller (not shown) that receives the operation and operation command for the functional module or the blower device 180 and displays operation information, the input 30 may include only a power button (not shown) to supply the power of the functional module or the blower device 80.

According to the present embodiment, in the case of the air flow in the space defined in the sink cabinet apparatus, the air outside the sink cabinet apparatus may be introduced into the sink cabinet apparatus based on the operation of the blower device 180. In particular, the air in the bathroom floor below the sink cabinet apparatus flows into the blower device to dry the bathroom floor below the sink cabinet apparatus due to the air flow.

The air flowing by the blower device 180 may be discharged forward and downward the sink cabinet apparatus or may flow into the inner space IS of the sink cabinet apparatus. The air flowing by the blower device 180 may be air heated by the heater 188. The air heated by the heater 188 may be used to dry the bathroom floor or the inner space IS of the sink cabinet apparatus.

The air flowing into the first discharge outlet 192b of the exhaust duct 190 of the air flowing by the blower device 180 may be used to dry the bathroom floor. The air discharged to the second discharge outlet 192c of the exhaust duct 190 of the air flowing by the blower device 180 may be used to dry the inner space IS of the sink cabinet apparatus. The air discharged to the second discharge outlet 192c of the exhaust duct 190 of the air flowing by the blower device 180 may also be used to dry the inner space IS and the bathroom floor below the both sides of the sink cabinet apparatus 10.

Specifically, the air discharged to the second discharge outlet 192c of the exhaust duct 190 of the air flowing by the blower device 180 flows into the first functional module 162 to dry the first functional module 162. The air flowing inside the first functional module 162 may flow into the communication space IS1b through an outlet (of the drawer/the inner box). The air flowing into the communication space IS1b flows into the panel inner space IS through the panel inlet hole 113 of the inner case 120 and is discharged to a space below the both sides of the sink cabinet apparatus 10, through which the panel discharge hole 115 opened downward from the panel inner space IS.

The air flowing by the blower device 180 flows through the functional module 160 and is discharged through the panel discharge hole 115, to dry the bathroom floor due to the air heated by the heater 188 at a position below the both sides of the sink cabinet apparatus 10.

Although the present disclosure has been described with reference to embodiments shown in figures, it should be understood that these embodiments are given by way of illustration only, and that various modifications and other equivalent embodiments can be made by a person having an ordinary skill in the art to which the present disclosure pertains. Therefore, the true technical protection scope of the present disclosure should be defined by claims below.

What is claimed is:

1. A sink cabinet apparatus, comprising:
    a wash basin comprising a faucet;
    a frame comprising a front frame supporting a lower portion of the wash basin and having a closed loop shape, a rear frame coupled to the wash basin and having a closed loop shape, and a bottom frame connecting the front frame and the rear frame;
    a base plate forming a bottom surface of the frame; and
    a dryer disposed above the base plate;
    wherein the front frame and the rear frame each has longitudinal members of the same shape on both sides thereof.

2. The sink cabinet apparatus of claim 1,
    wherein the longitudinal member has an upper bent portion and a lower ent portion bent in a transverse direction, and
    wherein each of the upper bent portion and the lower bent portion is overlapped with and coupled to a horizontal member.

3. The sink cabinet apparatus of claim 1,
    wherein the base plate includes:
        a central plate to place the dryer,
        side plates to couple to both sides of the central plate in a width direction, and
        a support leg to couple to an outer edge of the side plate.

4. The sink cabinet apparatus of claim 2, wherein the upper bent portions of the longitudinal members on both sides thereof are overlapped and coupled to a corresponding horizontal member, and
    wherein the lower bent portions of the longitudinal members on both sides thereof are overlapped and coupled to a corresponding horizontal member.

5. The sink cabinet apparatus of claim 3, wherein a length extending in a depth direction of the center plate corresponds to a length extending in the depth direction of the side plates.

6. The sink cabinet apparatus of claim 1, wherein the dryer includes a blowing fan for generating an air flow and a heater for heating the air, and
    wherein the blowing fan and the heater are disposed on the base plate.

7. The sink cabinet apparatus of claim 1, wherein a discharge outlet of the dryer is covered with a flow path case, and
    wherein the flow path case comprises a main discharge outlet configured to discharge hot air to the outside of the sink cabinet apparatus to dry an indoor space or a floor space of a room.

8. The sink cabinet apparatus of claim 7, wherein the flow path case comprises a plurality of discharge outlets, and
    wherein the sink cabinet apparatus comprises a switching vane disposed inside the flow path case for changing a blowing direction of the hot air, and an actuator for adjusting a direction of the switching vane.

9. The sink cabinet apparatus of claim 8, wherein the flow path case comprises an auxiliary discharge outlet configured to discharge hot air to the inside of the sink cabinet apparatus.

10. The sink cabinet apparatus of claim 9, wherein the auxiliary discharge outlet is branched from the main discharge outlet, and
    wherein the switching vane is provided at a point after a point at which the auxiliary discharge outlet is branched, such that discharge from the auxiliary discharge outlet is performed by closing the main discharge outlet by the switching vane.

* * * * *